US011179841B2

(12) United States Patent
Radovich et al.

(10) Patent No.: US 11,179,841 B2
(45) Date of Patent: Nov. 23, 2021

(54) BATTERY PACK INTERFACE

(71) Applicant: MILWAUKEE ELECTRIC TOOL CORPORATION, Brookfield, WI (US)

(72) Inventors: Kyle J. Radovich, West Bend, WI (US); Cameron R. Schulz, Milwaukee, WI (US); Mitchell Carlson, Lisbon, WI (US); John G. Marx, Hartford, WI (US); Paul Rossetto, Milwaukee, WI (US); David M. Schwalbach, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 469 days.

(21) Appl. No.: 15/845,063

(22) Filed: Dec. 18, 2017

(65) Prior Publication Data

US 2018/0169851 A1 Jun. 21, 2018

Related U.S. Application Data

(60) Provisional application No. 62/463,427, filed on Feb. 24, 2017, provisional application No. 62/435,443, filed on Dec. 16, 2016.

(51) Int. Cl.
*B25F 5/02* (2006.01)
*H02J 7/00* (2006.01)
(Continued)

(52) U.S. Cl.
CPC ............... *B25F 5/02* (2013.01); *B23B 45/02* (2013.01); *H01M 10/4257* (2013.01);
(Continued)

(58) Field of Classification Search
CPC .. H01R 13/53; H01R 13/7038; Y10S 439/911
See application file for complete search history.

(56) References Cited

U.S. PATENT DOCUMENTS 5,238,083 A 8/1993 Horie et al.
5,534,788 A 7/1996 Smith et al.
(Continued)

FOREIGN PATENT DOCUMENTS

AU 2009268165 1/2010
DE 1256763 12/1967
(Continued)

OTHER PUBLICATIONS

International Search Report and Written Opinion for Application No. PCT/US2018/040587 dated Jan. 18, 2019, 28 pages.
(Continued)

*Primary Examiner* — Tho D Ta
(74) *Attorney, Agent, or Firm* — Michael Best & Friedrich LLP

(57) ABSTRACT

An interface for a battery pack and an electrical combination. The interface may include a battery-receiving portion configured to receive a battery pack and including a cavity. The cavity is defined by a pair of sidewalls with rails defining a groove between the rails and a lower surface of the cavity. The rails are stepped or angled along a battery insertion axis and are configured to guide the sliding engagement of a battery pack within the battery-receiving portion.

20 Claims, 71 Drawing Sheets

(51) Int. Cl.
   *H01R 13/53*      (2006.01)
   *H01M 50/267*     (2021.01)
   *B23B 45/02*      (2006.01)
   *H01M 10/42*      (2006.01)
   *H01M 10/46*      (2006.01)
   *H01R 13/703*     (2006.01)

(52) U.S. Cl.
   CPC ......... *H01M 10/46* (2013.01); *H01M 50/267* (2021.01); *H01R 13/53* (2013.01); *H02J 7/007* (2013.01); *H02J 7/0021* (2013.01); *H02J 7/0044* (2013.01); *H02J 7/0045* (2013.01); *B23B 2260/024* (2013.01); *H01M 2220/30* (2013.01); *H01R 13/7038* (2013.01); *Y10S 439/911* (2013.01)

(56) References Cited

U.S. PATENT DOCUMENTS

| | | | |
|---|---|---|---|
| 5,553,675 | A | 9/1996 | Pitzen et al. |
| 5,578,391 | A * | 11/1996 | Meyers ............... H01M 2/1022 429/97 |
| 5,762,512 | A * | 6/1998 | Trant ................. H01M 2/1055 320/114 |
| 5,973,476 | A | 10/1999 | Irvin |
| 6,225,153 | B1 * | 5/2001 | Neblett ................. B60L 50/66 438/188 |
| 6,225,708 | B1 | 5/2001 | Furukawa et al. |
| 6,365,297 | B1 | 4/2002 | Wolczak et al. |
| 6,741,065 | B1 | 5/2004 | Ishii et al. |
| D535,250 | S | 1/2007 | Watson |
| 7,161,326 | B2 | 1/2007 | Kubota et al. |
| 7,323,846 | B2 | 1/2008 | Santana, Jr. |
| 7,397,219 | B2 | 7/2008 | Phillips et al. |
| 7,411,326 | B2 | 8/2008 | Achor et al. |
| 7,443,134 | B2 | 10/2008 | Phillips et al. |
| 7,463,007 | B2 | 12/2008 | Phillips et al. |
| 7,486,047 | B2 | 2/2009 | Phillips et al. |
| 7,489,108 | B2 | 2/2009 | Matsumoto et al. |
| D597,931 | S | 8/2009 | Aglassinger |
| 7,598,705 | B2 | 10/2009 | Watson et al. |
| 7,767,335 | B2 | 8/2010 | Sharrow et al. |
| D633,036 | S | 2/2011 | Murray |
| D640,196 | S | 6/2011 | Shuang et al. |
| 8,054,047 | B2 | 11/2011 | Chen et al. |
| 8,368,283 | B2 | 2/2013 | Kim et al. |
| D679,651 | S | 4/2013 | Stratford |
| D680,064 | S | 4/2013 | Tirone et al. |
| 8,450,975 | B2 | 5/2013 | Kim |
| D687,380 | S | 8/2013 | Tirone et al. |
| 8,564,245 | B2 | 10/2013 | Bosch et al. |
| D699,180 | S | 2/2014 | Sweere et al. |
| 8,752,645 | B2 | 6/2014 | Liebhard |
| 8,766,599 | B2 | 7/2014 | Kim |
| 8,852,775 | B2 | 10/2014 | McGuire et al. |
| 9,197,146 | B2 | 11/2015 | Mergener et al. |
| 9,444,082 | B2 | 9/2016 | Tsujimura et al. |
| D780,688 | S | 3/2017 | Elder |
| D812,555 | S | 3/2018 | Schoch |
| 9,923,249 | B2 | 3/2018 | Rejman et al. |
| 9,931,707 | B2 | 4/2018 | Balaster |
| D826,150 | S | 8/2018 | Cayon |
| D841,572 | S | 2/2019 | Gilpatrick et al. |
| D844,556 | S | 4/2019 | Irfan et al. |
| D844,558 | S | 4/2019 | Taniguchi et al. |
| 2003/0142490 | A1 | 7/2003 | Parsons et al. |
| 2005/0248320 | A1 | 11/2005 | Denning |
| 2006/0091858 | A1 | 5/2006 | Johnson et al. |
| 2009/0108806 | A1 | 4/2009 | Takano et al. |
| 2009/0202894 | A1 | 8/2009 | Bublitz |
| 2009/0242227 | A1 | 10/2009 | Hashimoto et al. |
| 2010/0225277 | A1 | 9/2010 | Ochi et al. |
| 2011/0163701 | A1 | 7/2011 | Carrier et al. |
| 2011/0309799 | A1 | 12/2011 | Firehammer |
| 2012/0013194 | A1 | 1/2012 | Yamanoue |
| 2013/0089764 | A1 | 4/2013 | Melnyk et al. |
| 2013/0106343 | A1 | 5/2013 | Cruise et al. |
| 2013/0324981 | A1 | 12/2013 | Smith et al. |
| 2013/0324982 | A1 | 12/2013 | Smith et al. |
| 2014/0015451 | A1 | 1/2014 | Funabashi et al. |
| 2014/0210419 | A1 | 7/2014 | Kim |
| 2014/0326477 | A1 | 11/2014 | Thorson et al. |
| 2015/0010782 | A1 | 1/2015 | Tanigaki et al. |
| 2015/0108949 | A1 | 4/2015 | Averitt |
| 2015/0228937 | A1 | 8/2015 | Spilker |
| 2015/0283964 | A1 | 10/2015 | Janarthanam |
| 2015/0288219 | A1 | 10/2015 | Lin et al. |
| 2015/0333301 | A1 | 11/2015 | Ota et al. |
| 2016/0020443 | A1 | 1/2016 | White et al. |
| 2016/0049815 | A1 | 2/2016 | Wu et al. |
| 2016/0126533 | A1 | 5/2016 | Velderman et al. |
| 2016/0164328 | A1 | 6/2016 | Kim |
| 2016/0204475 | A1 | 7/2016 | White et al. |
| 2016/0226290 | A1 | 8/2016 | Johnson et al. |
| 2016/0244009 | A1 | 8/2016 | Demmerle |
| 2017/0072553 | A1 | 3/2017 | Bakker |
| 2017/0104243 | A1 | 4/2017 | Velderman et al. |
| 2017/0194670 | A1 | 7/2017 | Kawano et al. |
| 2019/0081290 | A1 | 3/2019 | Fauteux et al. |
| 2020/0016734 | A1 | 1/2020 | Kelleher et al. |

FOREIGN PATENT DOCUMENTS

| | | |
|---|---|---|
| DE | 102008064037 | 6/2009 |
| DE | 102008017424 | 10/2009 |
| DE | 102011001107 | 1/2012 |
| EP | 2645525 | 10/2013 |
| EP | 3059781 A1 | 2/2016 |
| JP | 2005287240 A | 10/2005 |
| KR | 20060094231 | 8/2006 |
| KR | 20120016993 A | 2/2012 |
| KR | 1020120094529 A | 8/2012 |
| KR | 101686018 | 12/2016 |
| WO | 2008035811 A1 | 3/2008 |
| WO | 2012023707 | 12/2012 |
| WO | 2014125758 A1 | 8/2014 |

OTHER PUBLICATIONS

International Search Report and Written Opinion for Application No. PCT/US2017/066972 dated Apr. 16, 2018, 15 pages.
International Search Report and Written Opinion for Application No. PCT/US2017/066966 dated Jul. 30, 2018, 19 pages.
International Search Report and Written Opinion for Application No. PCT/US2018/024172 dated Jul. 13, 2018, 18 pages.
Co-pending U.S. Appl. No. 15/845,068, filed Dec. 18, 2017.
Co-pending U.S. Appl. No. 15/934,798, filed Mar. 23, 2018.
Co-pending U.S. Appl. No. 29/637,376, filed Feb. 16, 2018.
Co-pending U.S. Appl. No. 16/025,491, filed Jul. 2, 2018.
European Patent Office Extended Search Report for Application No. 17880519.8 dated Nov. 20, 2020 (12 pages).

* cited by examiner

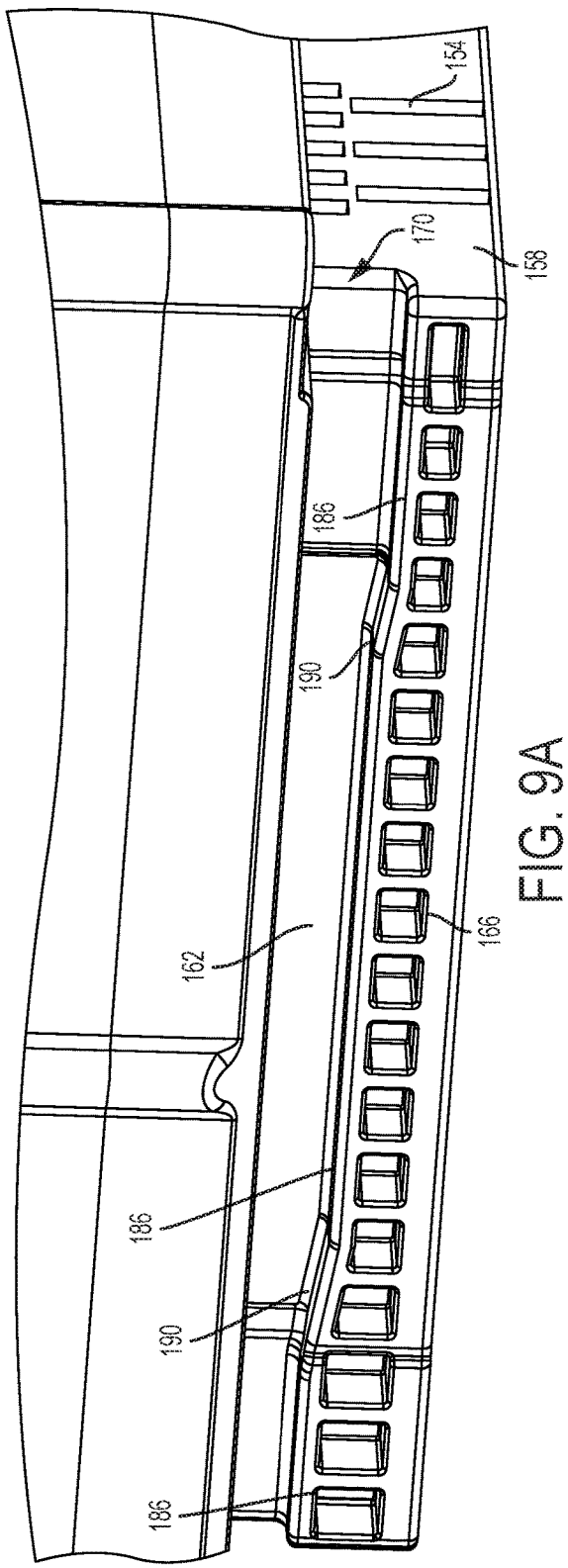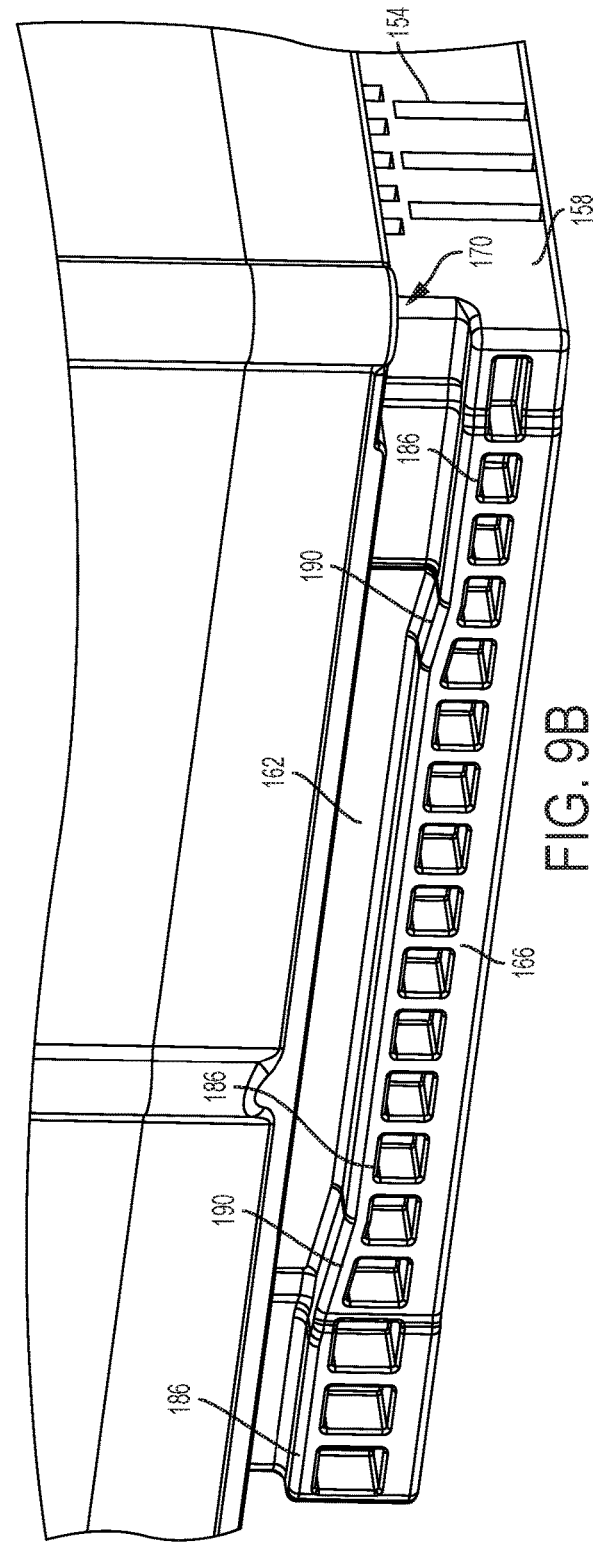

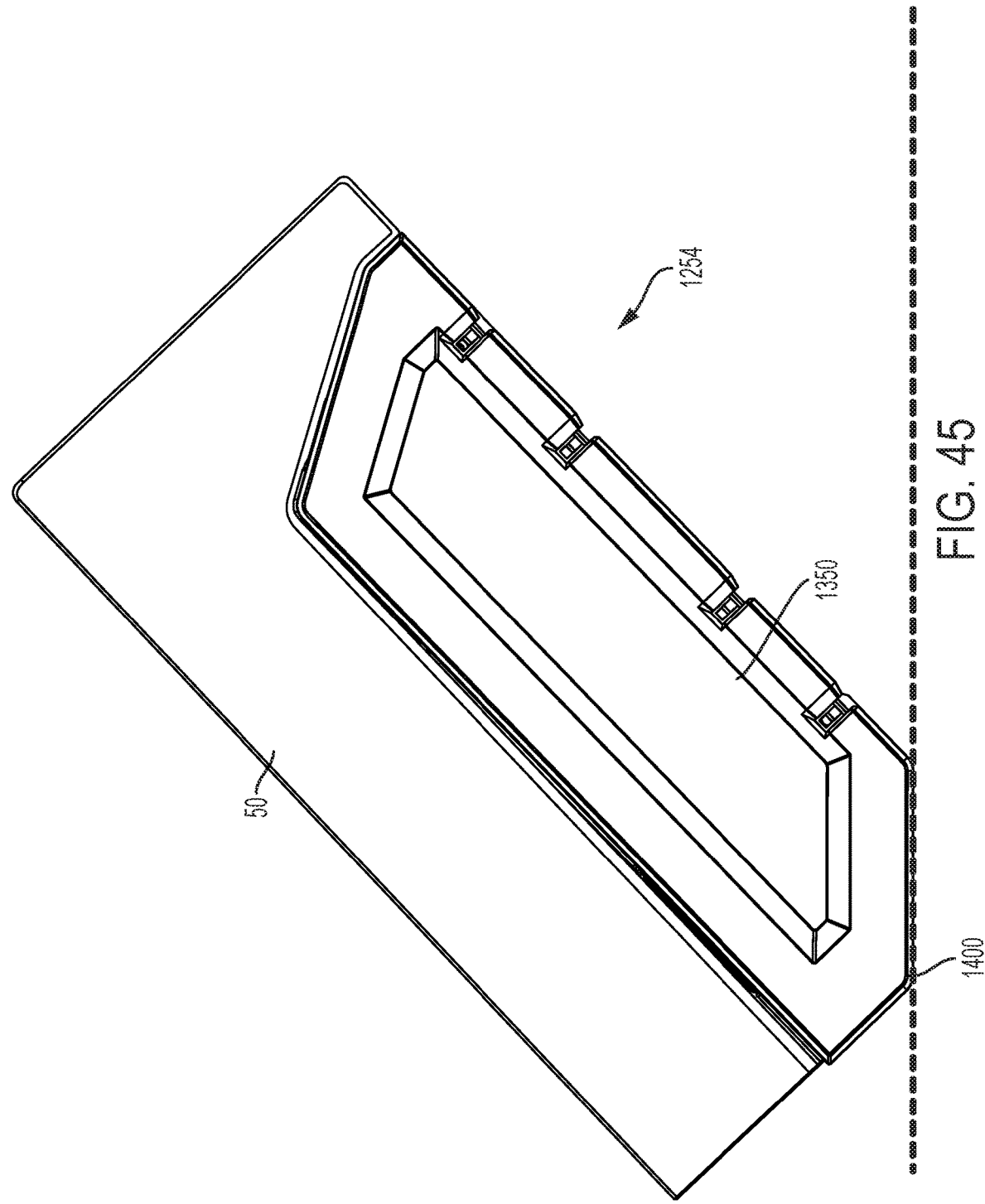

BATTERY PACK INTERFACE

CROSS-REFERENCE TO RELATED APPLICATIONS

This application claims the benefit of U.S. Provisional Patent Application No. 62/435,443, filed on Dec. 16, 2016, and of U.S. Provisional Patent Application No. 62/463,427, filed Feb. 24, 2017, the entire content of both of which are incorporated by reference.

FIELD

The present invention relates to battery packs and, more particularly, to an interface for a battery pack.

SUMMARY

In one independent aspect, an interface for an electrical combination may be provided. The electrical combination may include a battery pack and an electrical device, the interface being operable to connect the battery pack and the electrical device. The interface may generally include a body and a rail extending along an axis, the rail and the body defining a space therebetween, the space having a first dimension proximate a first axial location, a second dimension at a second axial location, and a third dimension at a third axial location, the first dimension, the second dimension, and the third dimension being different.

In some constructions, the first axial location may be proximate an insertion opening at one axial end, the first dimension being larger than the second dimension and the third dimension. The third axial location may be proximate an opposite axial end, the third dimension being smaller than the second dimension.

The body has a body surface extending along and substantially parallel to the axis, and the rail may have a stepped rail surface extending along the axis, the space being defined between the body surface and the rail surface. The rail surface may have a first rail surface portion proximate the first axial location, a second rail surface portion proximate the second axial location, and a third rail surface portion proximate the third axial location. The first rail surface portion, the second rail surface portion and the third rail surface portion may be substantially parallel to the axis. The rail surface may have a first angled portion connecting the first rail surface portion to the second rail surface portion and a second angled portion connecting the second rail surface portion to the third rail surface portion.

The rail may have a lateral dimension transverse to the axis and to the space, the rail having a first lateral dimension proximate the first axial location, a second lateral dimension proximate the second axial location, and a third lateral dimension proximate the third axial location, the first lateral dimension, the second lateral dimension, and the third lateral dimension being different. The interface may further include an electrical terminal.

In another independent aspect, an electrical combination may generally include an electrical device including a device housing providing a device support portion, and a circuit supported by the device housing; and a battery pack including a battery pack housing providing a pack support portion for engagement with the device support portion, a battery cell supported by the housing, power being transferrable between the battery cell and the circuit when the battery pack is connected to the device. One of the device support portion and the pack support portion may include a body and a rail extending along an axis, the rail and the body defining a space therebetween, the space having a first dimension proximate a first axial location, a second dimension at a second axial location, and a third dimension at a third axial location, the first dimension, the second dimension, and the third dimension being different, and the other of the device support portion and the pack support portion including a first portion positionable in the space at the first axial location, a second portion positionable in the space at the second location, and a third portion positionable in the space at the third location.

In some constructions, the first axial location may be proximate an insertion opening at one axial end, the first dimension being larger than the second dimension and the third dimension. The third axial location may be proximate an opposite axial end, the third dimension being smaller than the second dimension.

The body has a body surface extending along and substantially parallel to the axis, and the rail may have a stepped rail surface extending along the axis, the space being defined between the body surface and the rail surface. The rail surface may have a first rail surface portion proximate the first axial location, a second rail surface portion proximate the second axial location, and a third rail surface portion proximate the third axial location. The first rail surface portion, the second rail surface portion and the third rail surface portion may be substantially parallel to the axis. The rail surface may have a first angled portion connecting the first rail surface portion to the second rail surface portion and a second angled portion connecting the second rail surface portion to the third rail surface portion.

The rail may have a lateral dimension transverse to the axis and to the space, the rail having a first lateral dimension proximate the first axial location, a second lateral dimension proximate the second axial location, and a third lateral dimension proximate the third axial location, the first lateral dimension, the second lateral dimension, and the third lateral dimension being different. The electrical device may further include a device terminal, and the battery pack may further include a pack terminal electrically connectable to facilitate transfer of power between the electrical device and the battery pack.

In some constructions, the pack support portion may include the body and the rail defining the space therebetween, and the device support portion may include an axially-extending device rail providing the first portion, the second portion, and the third portion. The device support portion may include a device body, the device rail and the device body defining a second space therebetween, the second space having a fourth dimension proximate a first portion, a fifth dimension proximate the second portion, and a sixth dimension proximate the third portion, the fourth dimension, the fifth dimension and the sixth dimension being different.

The device rail may have a lateral dimension transverse to the axis and to the second space, the device rail having a fourth lateral dimension proximate the first portion, a fifth lateral dimension proximate the second portion, and a sixth lateral dimension proximate the third portion, the fourth lateral dimension, the fifth lateral dimension, and the sixth lateral dimension being different.

In yet another independent aspect, a latch mechanism for an electrical combination may be provided. The electrical combination may include a battery pack and an electrical device, the latch mechanism being operable to connect the battery pack and the electrical device. The latch assembly may generally include a latching member movable between a latched position, in which the latching member is engageable between the battery pack and the electrical device to inhibit relative movement, and an unlatched position, in which relative movement is permitted; and a switch operable with the latching member, the switch inhibiting power transfer between the battery pack and the electrical device when the latching member is between the latched position and the unlatched position.

The latching member may be engageable in a latching recess to inhibit relative movement between the battery pack and the electrical device, and the switch may be operable to inhibit power transfer before the latching member disengages the latching recess. In the latched position, the switch may be operable to facilitate power transfer.

The latching mechanism may further include an actuator engageable by a user to move the latching member between the latched position and the unlatched position. The actuator may be a primary actuator, and the latch mechanism may further include a secondary actuator operatively coupled to the primary actuator and movable between a first position, in which the secondary actuator inhibits operation of the primary actuator, and a second position, in which the secondary actuator allows operation of the primary actuator. The latching member may be formed of a first material, and the actuator may be formed of a different second material, the first material being harder than the second material. The latching member may include a protrusion engageable with and operating the switch to inhibit power transfer as the latching member moves toward the unlatching position.

In a further independent aspect, an electrical combination may generally include an electrical device including a device housing providing a device support portion, and a circuit supported by the device housing; a battery pack including a battery pack housing providing a pack support portion for engagement with the device support portion, a battery cell supported by the housing, power being transferrable between the battery cell and the circuit when the battery pack is connected to the device; and a latch mechanism including a latching member movable between a latched position, in which the latching member is engageable between the battery pack and the electrical device to inhibit relative movement, and an unlatched position, in which relative movement is permitted, and a switch operable with the latching member, the switch inhibiting power transfer between the battery pack and the electrical device when the latching member is between the latched position and the unlatched position.

The latching member may be engageable in a latching recess to inhibit relative movement between the battery pack and the electrical device, and the switch may be operable to inhibit power transfer before the latching member disengages the latching recess. The latching member may be supported on the device support portion, and the latching recess may be defined on the pack support portion. In the latched position, the switch may be operable to facilitate power transfer.

The latching mechanism may further include an actuator engageable by a user to move the latching member between the latched position and the unlatched position. The actuator may be a primary actuator, and the latch mechanism may further include a secondary actuator operatively coupled to the primary actuator and movable between a first position, in which the secondary actuator inhibits operation of the primary actuator, and a second position, in which the secondary actuator allows operation of the primary actuator. The latching member may be formed of a first material, and the actuator may be formed of a different second material, the first material being harder than the second material. The latching member may include a protrusion engageable with and operating the switch to inhibit power transfer as the latching member moves toward the unlatching position.

The electrical device may further include a device terminal, the battery pack may further include a pack terminal electrically connectable to facilitate transfer of power between the electrical device and the battery pack, and, when the battery pack is connected to the electrical device, the switch may inhibit power transfer between the battery pack and the electrical device before the device terminal and the pack terminal are electrically disconnected.

In another independent aspect, an ejector for an electrical combination may be provided. The electrical combination may include a battery pack and an electrical device. The ejector may generally include an ejection member engageable between the battery pack and the electrical device; a biasing member operable to bias the ejection member toward an ejecting position, in which a force is applied to disengage the battery pack and the electrical device; and a switch operable with the ejection member, the switch deactivating at least a portion of the device as the ejection member moves toward the ejecting position. The ejection member may be movable to a retracted position, opposite the ejecting position, the switch activating at least a portion of the device as the ejection member moves toward the retracted position.

In yet another independent aspect, an electrical combination may generally include an electrical device including a device housing providing a device support portion, and a circuit supported by the device housing; a battery pack including a battery pack housing providing a pack support portion for engagement with the device support portion, a battery cell supported by the housing, power being transferrable between the battery cell and the circuit when the battery pack is connected to the device; and an ejector. The ejector may include an ejection member engageable between the battery pack and the electrical device, a biasing member operable to bias the ejection member toward an ejecting position, in which a force is applied to disengage the battery pack and the electrical device, and a switch operable with the ejection member, the switch deactivating at least a portion of the device as the ejection member moves toward the ejecting position.

The ejection member may movable to a retracted position, opposite the ejecting position, the switch activating at least a portion of the device as the ejection member moves toward the retracted position. The electrical device may further include a device terminal, the battery pack may further include a pack terminal electrically connectable to facilitate transfer of power between the electrical device and the battery pack, and, when the battery pack is connected to the electrical device, the switch inhibits power transfer between the battery pack and the electrical device before the device terminal and the pack terminal are electrically disconnected.

The electrical device may include a first power tool including a first tool housing providing a first tool support portion, and a first motor supported by the first tool housing, the pack support portion being engageable with the first tool support portion, the battery cell being operable to power the first motor when the battery pack is connected to the first power tool, the biasing member having a first stiffness selected based on a characteristic of the first power tool. The electrical combination may further include a second power tool including a second tool housing providing a second tool support portion, and a second motor supported by the second tool housing, the pack support portion being engageable with the second tool support portion, the battery cell being operable to power the second motor when the battery pack is connected to the second power tool; and a second ejector including a second ejection member engageable between the battery pack and the second power tool, a second biasing member operable to bias the second ejection member toward an ejecting position, in which a force is applied to disengage the battery pack and the power tool, the second biasing member having a second stiffness selected based on a characteristic of the second power tool, the second stiffness being different than the first stiffness.

In a further independent aspect, a dual-action latch mechanism for an electrical combination may be provided. The electrical combination may include a battery pack and an electrical device, the latch mechanism being operable to connect the battery pack and the electrical device. The latch mechanism may generally include a primary actuator operatively coupled to a latching member movable between a latched position, in which the latching member is engageable between the battery pack and the electrical device to inhibit relative movement, and an unlatched position, in which relative movement is permitted; and a secondary actuator operatively coupled to the primary actuator and movable between a first position, in which the secondary actuator inhibits operation of the primary actuator, and a second position, in which the secondary actuator allows operation of the primary actuator.

The latch mechanism may further include the latching member; and a switch operable with the latching member, the switch inhibiting power transfer between the battery pack and the electrical device when the latching member is between the latched position and the unlatched position. The latching member may be engageable in a latching recess to inhibit relative movement between the battery pack and the electrical device, and the switch may be operable to inhibit power transfer before the latching member disengages the latching recess. In the latched position, the switch may be operable to facilitate power transfer.

The latching member may be formed of a first material, and the actuator may be formed of a different second material, the first material being harder than the second material. The latching member may include a protrusion engageable with and operating the switch to inhibit power transfer as the latching member moves toward the unlatching position.

In another independent aspect, an electrical combination may generally include an electrical device including a device housing providing a device support portion, and a circuit supported by the device housing; a battery pack including a battery pack housing providing a pack support portion for engagement with the device support portion, a battery cell supported by the housing, power being transferrable between the battery cell and the circuit when the battery pack is connected to the device; and a dual-action latch mechanism including a primary actuator operatively coupled to a latching member movable between a latched position, in which the latching member is engageable between the battery pack and the electrical device to inhibit relative movement, and an unlatched position, in which relative movement is permitted, and a secondary actuator operatively coupled to the primary actuator and movable between a first position, in which the secondary actuator inhibits operation of the primary actuator, and a second position, in which the secondary actuator allows operation of the primary actuator.

The latch mechanism may further include the latching member, and a switch operable with the latching member, the switch inhibiting power transfer between the battery pack and the electrical device when the latching member is between the latched position and the unlatched position. The latching member may be engageable in a latching recess to inhibit relative movement between the battery pack and the electrical device, and the switch may be operable to inhibit power transfer before the latching member disengages the latching recess. In the latched position, the switch may be operable to facilitate power transfer.

The latching member may be formed of a first material, and the actuator may be formed of a different second material, the first material being harder than the second material. The latching member may include a protrusion engageable with and operating the switch to inhibit power transfer as the latching member moves toward the unlatching position.

In yet another independent aspect, a battery pack may generally include a housing assembly providing a terminal block and a pack support portion engageable along an axis with a device support portion of an electrical device, the housing assembly defining a cavity, the housing assembly having a bottom wall opposite the pack support portion, a first end wall portion opposite the terminal block, connected to the pack support portion, and extending in a plane substantially perpendicular to the axis, and a second end wall connected between the bottom wall and the first end wall portion, the second end wall portion being oriented at an angle between 90 degrees and 180 degrees relative to the first end wall portion; a plurality of battery cells supported in the cavity; and a pack terminal supported by the terminal block and engageable with a device terminal of the electrical device. The second end wall portion may be oriented at an angle of between about 110 degrees and about 160 degrees. The second end wall portion may be oriented at an angle of about 135 degrees.

In a further independent aspect, a battery pack may generally include a housing including a support portion connectable to and supportable by an electrical device, the support portion defining a channel operable to receive a projection on the electrical device, the support portion including a plastic material molded to define the channel, and a metal material molded in the plastic material, the metal material defining a C-shaped portion around the channel; a plurality of battery cells supported by the housing; and a battery terminal electrically connected to the plurality of battery cells and connectable to a terminal of the electrical device.

In another independent aspect, a battery pack may generally include a housing including a support portion connectable to and supportable by an electrical device, the housing also including a bottom wall opposite the support portion; opposite side walls connected between the bottom wall and the support portion and opposite end walls connected between the bottom wall and the support portion and between the side walls, adjacent walls meeting at an edge; elastomeric material on at least one edge, the elastomeric material being thickest proximate the edge and thinning in a direction away from the edge; a plurality of battery cells supported by the housing; and a battery terminal electrically connected to the plurality of battery cells and connectable to a terminal of the electrical device.

In a yet another independent aspect, a shock absorption assembly may be provided for an interface between a battery pack and an electrical device. The assembly may include a housing assembly including a first housing portion having an outer surface and providing a support portion connectable to and operable to support the battery pack, a second housing portion at least partially around the first housing portion and having an inner surface in facing relationship to the outer surface; a post supported by one of the first housing portion and the second housing portion supporting a post, the other of the first housing portion and the second housing portion defining a recess aligned with the post; and a shock absorption member supported on the post and received in the recess.

Other independent features and independent aspects of the invention may become apparent by consideration of the following detailed description and accompanying drawings.

BRIEF DESCRIPTION OF THE DRAWINGS

FIG. 9A is a second enlarged perspective view of a portion of the battery pack shown in FIG. 7.

FIG. 9B is a third enlarged perspective view of a portion of the battery pack shown in FIG. 7.

FIG. 45 is a side view of a battery pack and a portion of an electrical device illustrating the battery pack impacting a surface.

DETAILED DESCRIPTION

Figure 1:
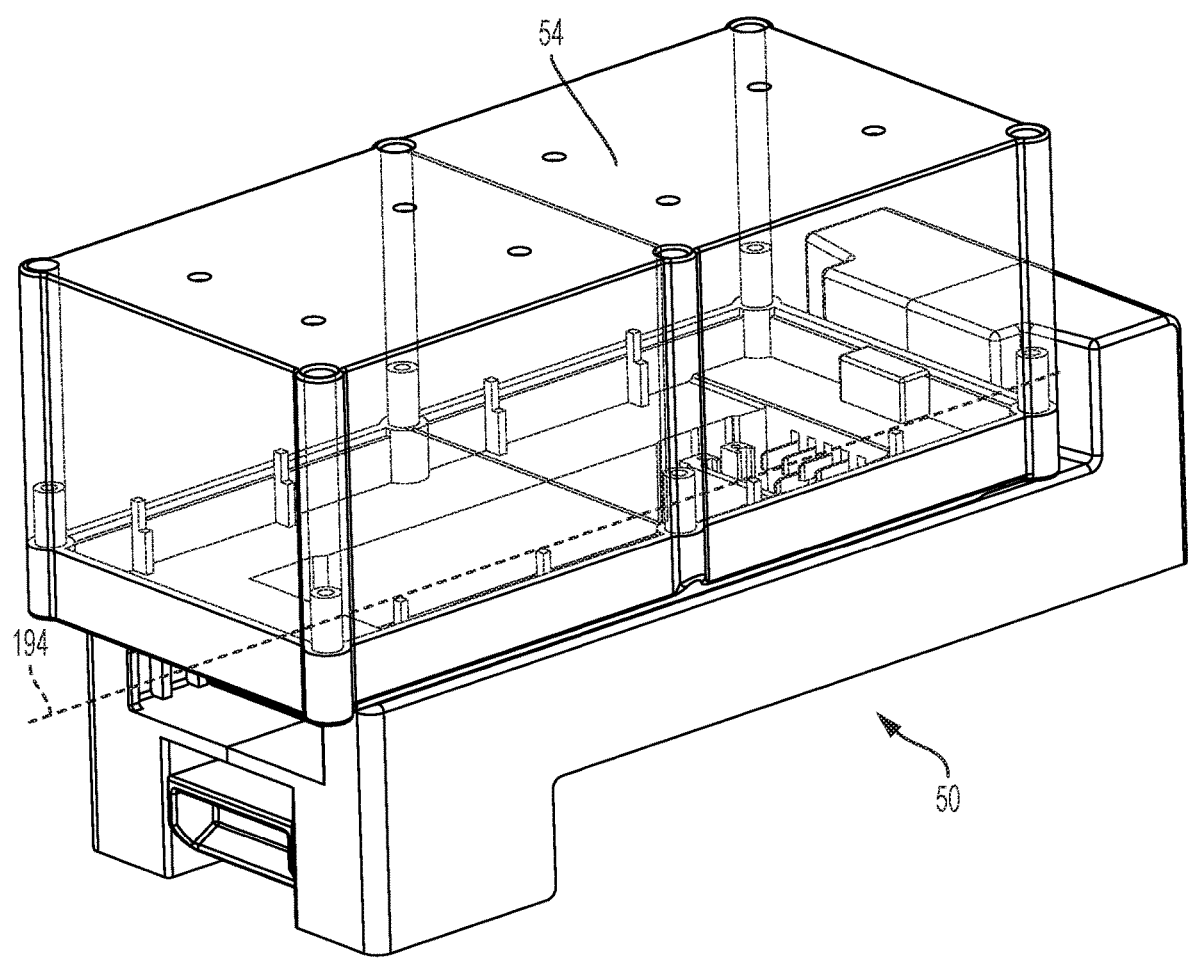
FIG. 1 is a perspective view of a battery pack coupled to a battery-receiving portion of an electrical device according to a first embodiment.

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways. Also, it is to be understood that the phraseology and terminology used herein is for the purpose of description and should not be regarded as limiting.

Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed.

Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

Many of the modules and logical structures described are capable of being implemented in software executed by a microprocessor or a similar device or of being implemented in hardware using a variety of components including, for example, application specific integrated circuits ("ASICs"). Terms like "controller" and "module" may include or refer to both hardware and/or software. Capitalized terms conform to common practices and help correlate the description with the coding examples, equations, and/or drawings. However, no specific meaning is implied or should be inferred simply due to the use of capitalization. Thus, the claims should not be limited to the specific examples or terminology or to any specific hardware or software implementation or combination of software or hardware.

FIGS. 1-13B illustrate a battery-receiving portion 50 of an electrical device (e.g., a power tool, an outdoor tool, a non-motorized device (e.g., a light, an audio device, etc.), a battery charger, etc.) configured to receive a battery pack 54 (e.g., a rechargeable lithium-ion battery pack). As will be described in greater detail below, an interface for the battery pack 54 (e.g., the illustrated battery-receiving portion 50 (see FIGS. 2-4)) includes stepped grooves 58 and a latching mechanism 66 to facilitate coupling of the battery pack 54 to the battery-receiving portion 50. In other embodiments (not shown), the grooves 58 may be substantially linear.

With reference to FIGS. 1-6, the battery-receiving portion 50 includes a cavity 70 defined by a lower surface 74, a pair of sidewalls 78, and an end wall 82 and having an open end 86 opposite the end wall 82. In addition, an upper end wall 90 extends above the end wall 82 proximate the cavity 70. Device contacts 94 are supported on the end wall 82 and are configured to mechanically and electrically interface with the battery pack 54 to transfer electrical power therebetween.

In the illustrated embodiment, at least a portion of the latching mechanism 66 protrudes from the lower surface 74 near the open end 86. The latching mechanism 66 is configured to engage the battery pack 54 to maintain engagement between the battery pack 54 and the battery-receiving portion 50. However, in other embodiments (not shown), the latching mechanism 66 may be disposed at various locations (e.g., on a sidewall 78, the end wall 82, the upper end wall 90, etc.) such that the latching mechanism 66 engages corresponding structure on the battery pack 54 to maintain engagement between the battery pack 54 and the battery-receiving portion 50.

Figure 2:
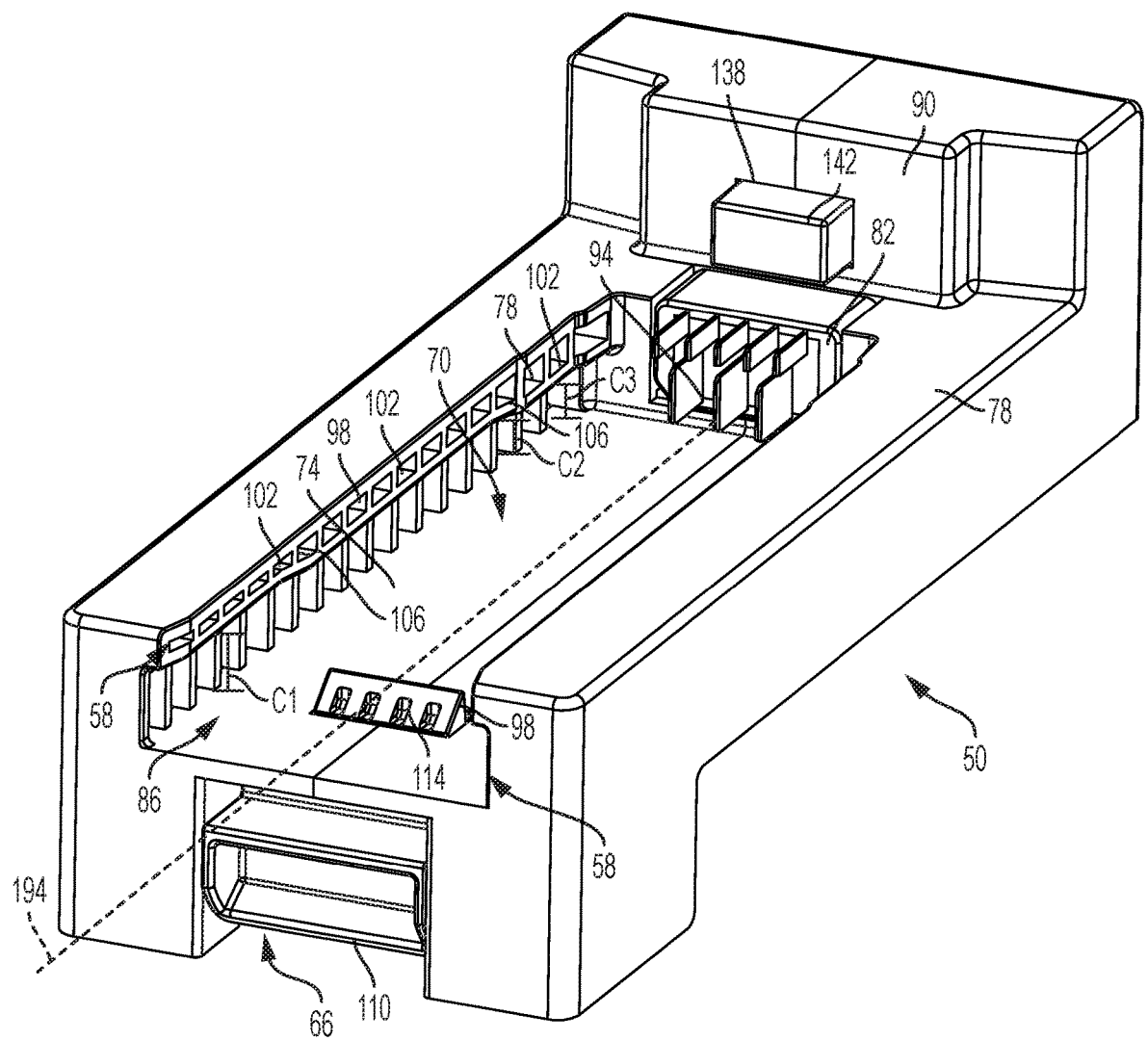
FIG. 2 is a perspective view of the battery-receiving portion shown in FIG. 1.
Figure 3:
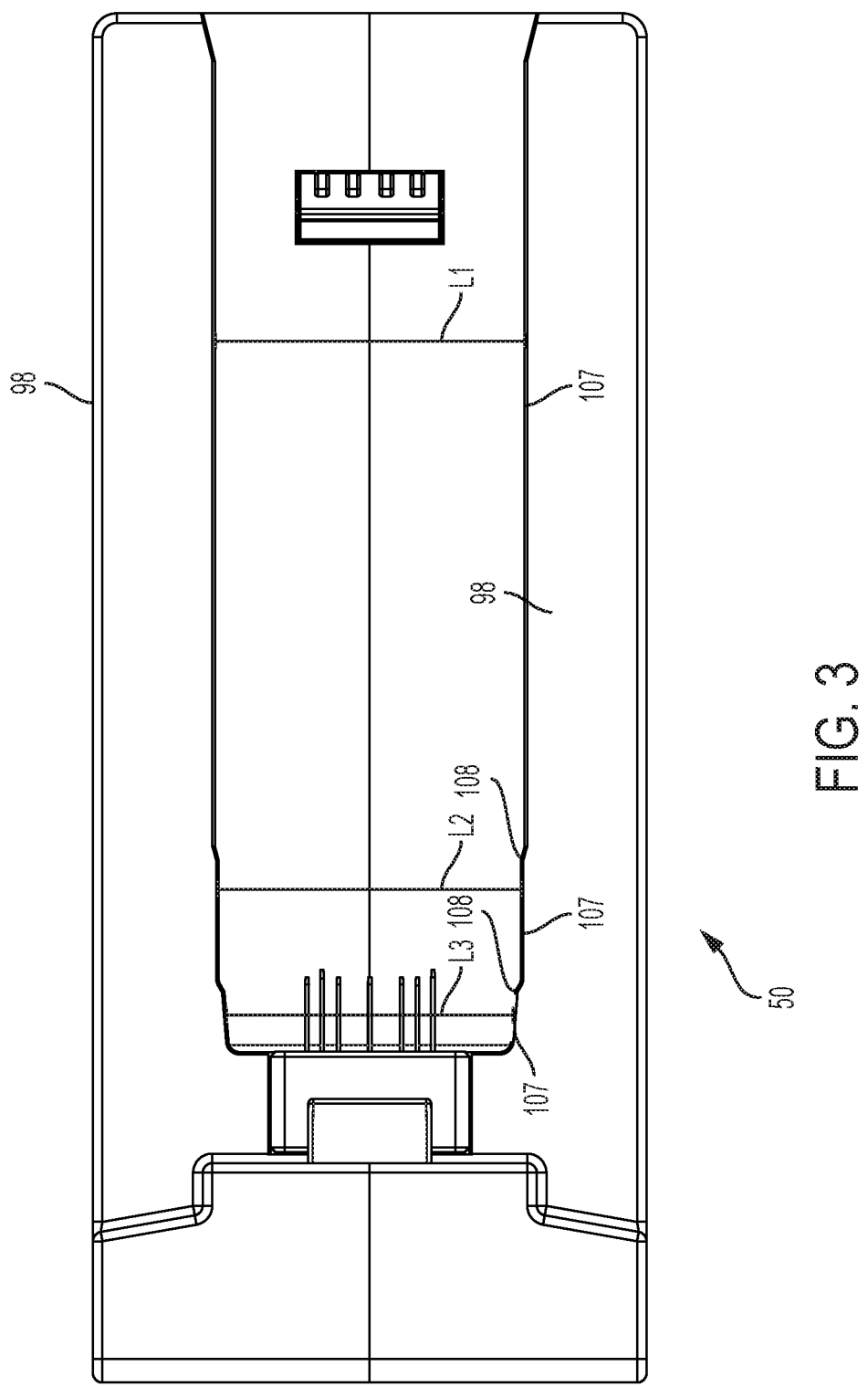
FIG. 3 is a bottom view of the battery-receiving portion as shown in FIG. 2.
Figure 4:
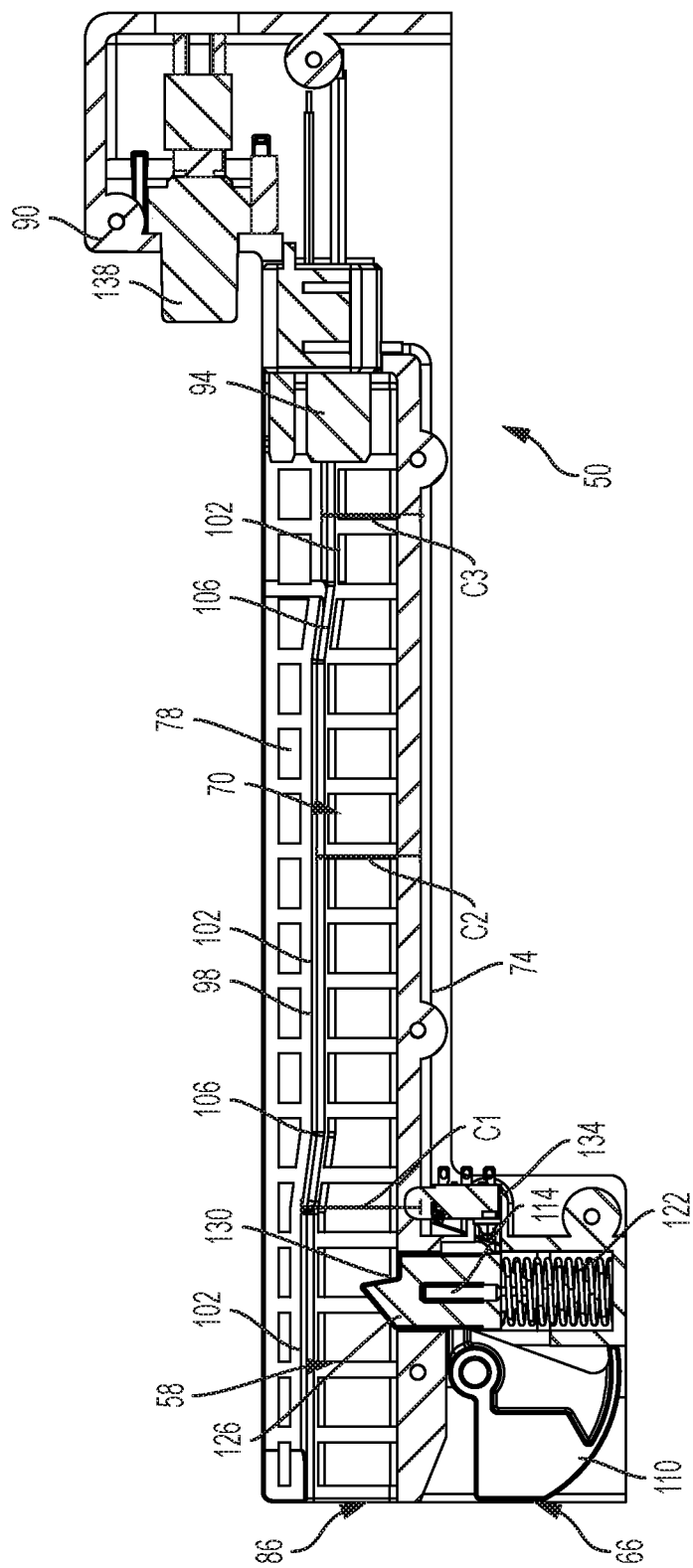
FIG. 4 is a cross-sectional side view of the battery-receiving portion as shown in FIG. 2.
Figure 5:
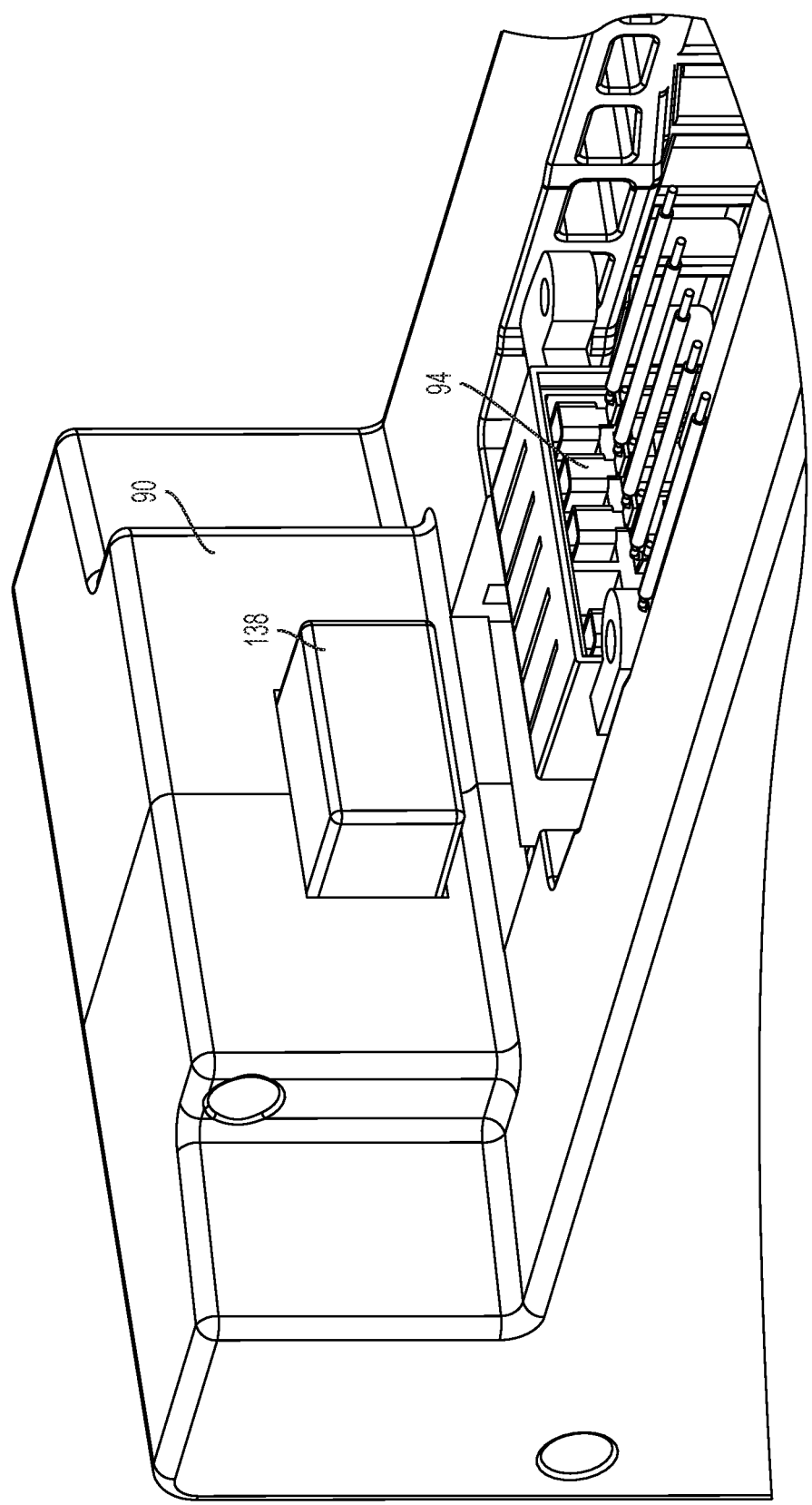
FIG. 5 is an enlarged perspective view of a spring ejector of the battery-receiving portion shown in FIG. 2.
Figure 6:
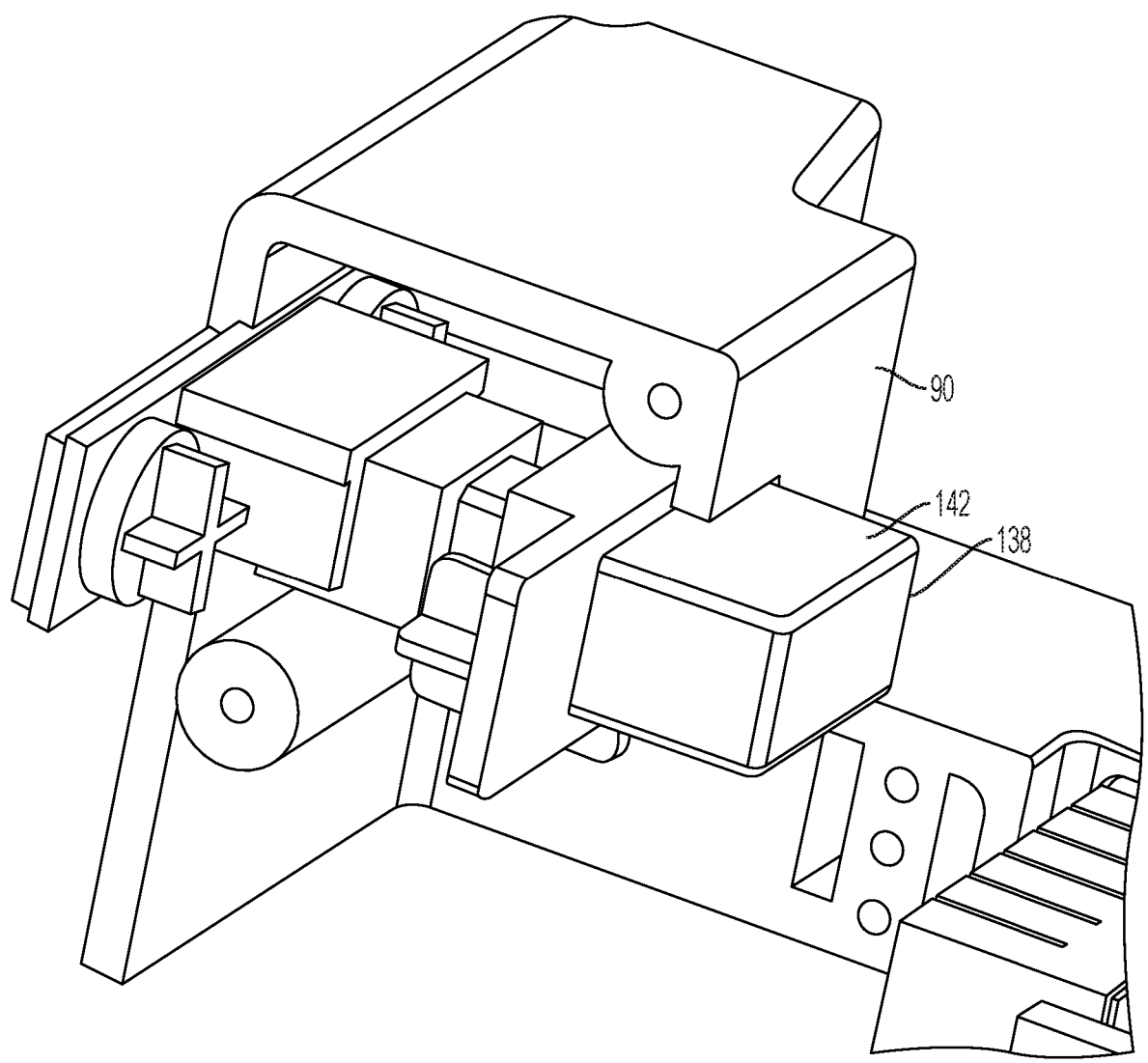
FIG. 6 is a partial cross-sectional perspective view of the spring ejector shown in FIG. 5.
Figure 7:
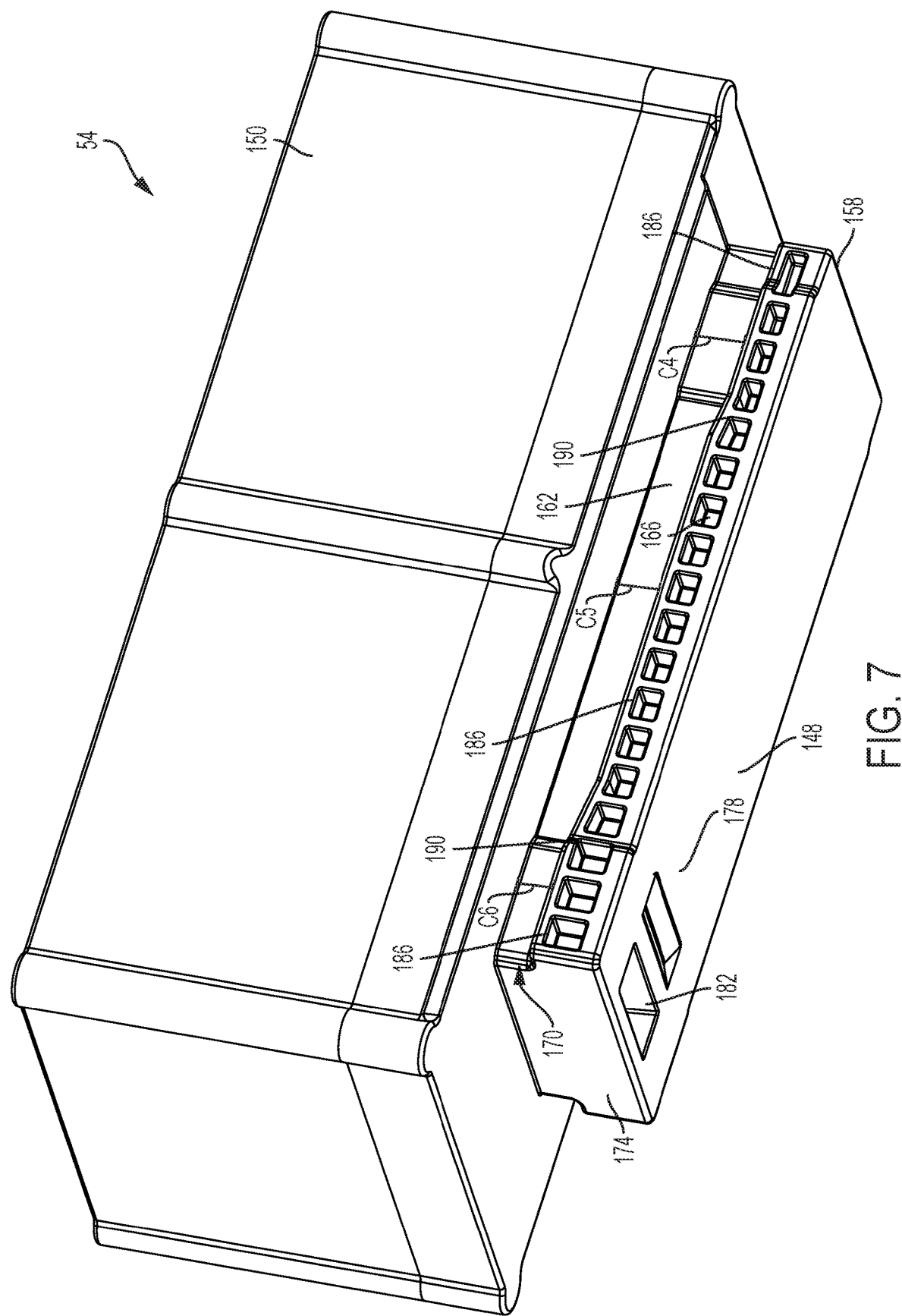
FIG. 7 is a perspective view of the battery pack shown in FIG. 1.
Figure 8:
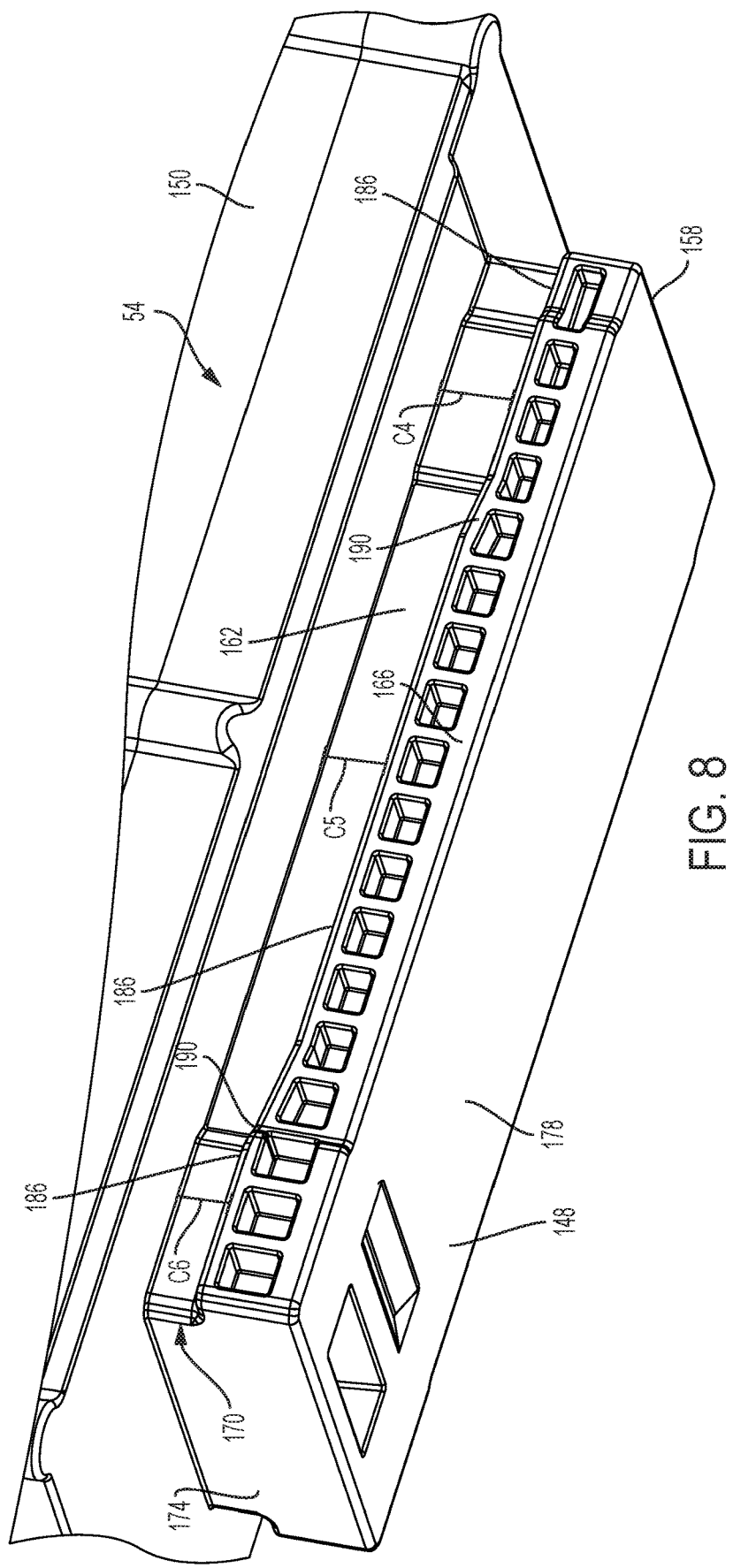
FIG. 8 is an enlarged perspective view of a portion of the battery pack shown in FIG. 7.
Figure 10:
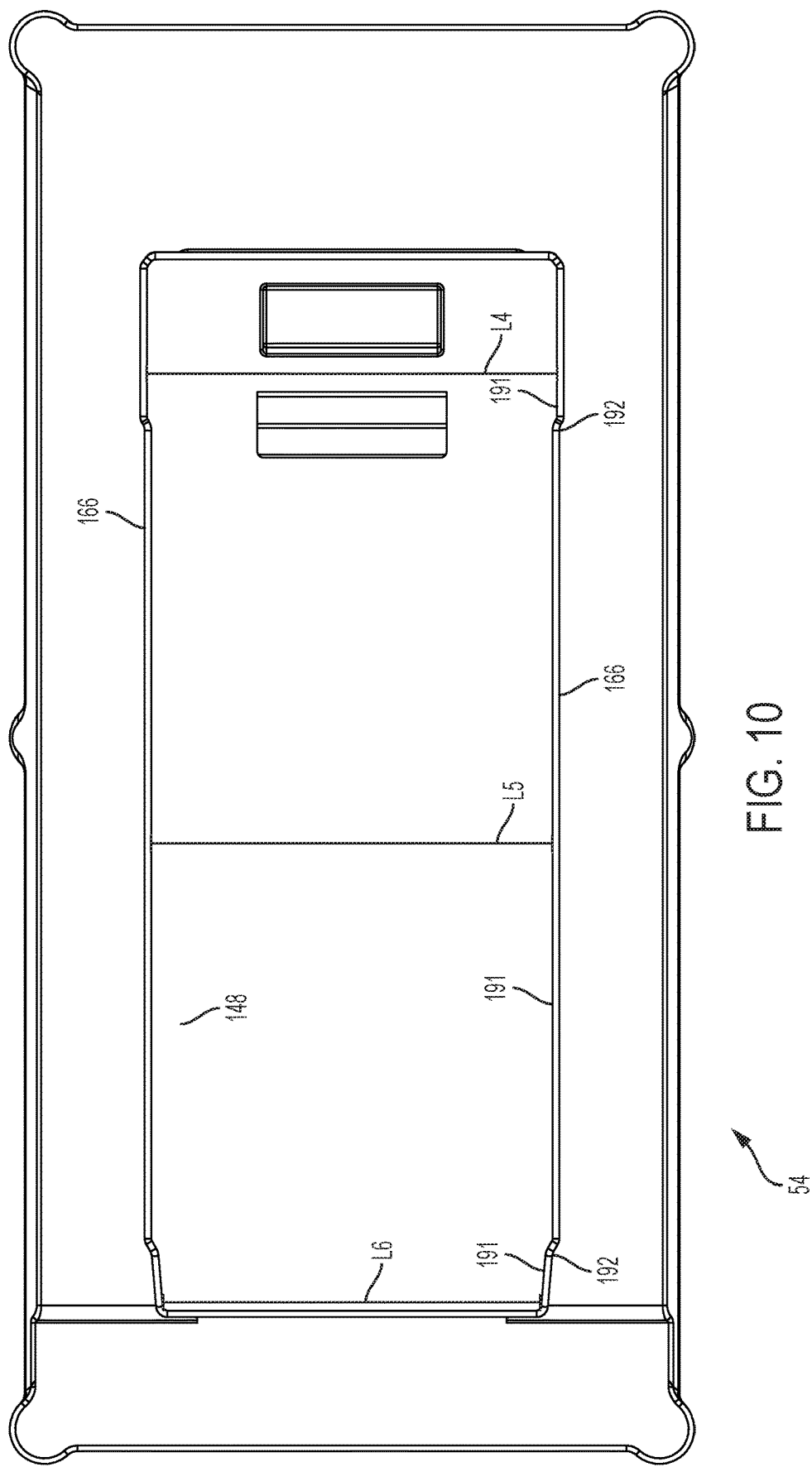
FIG. 10 is a top view of the battery pack shown in FIG. 7.
Figure 11:
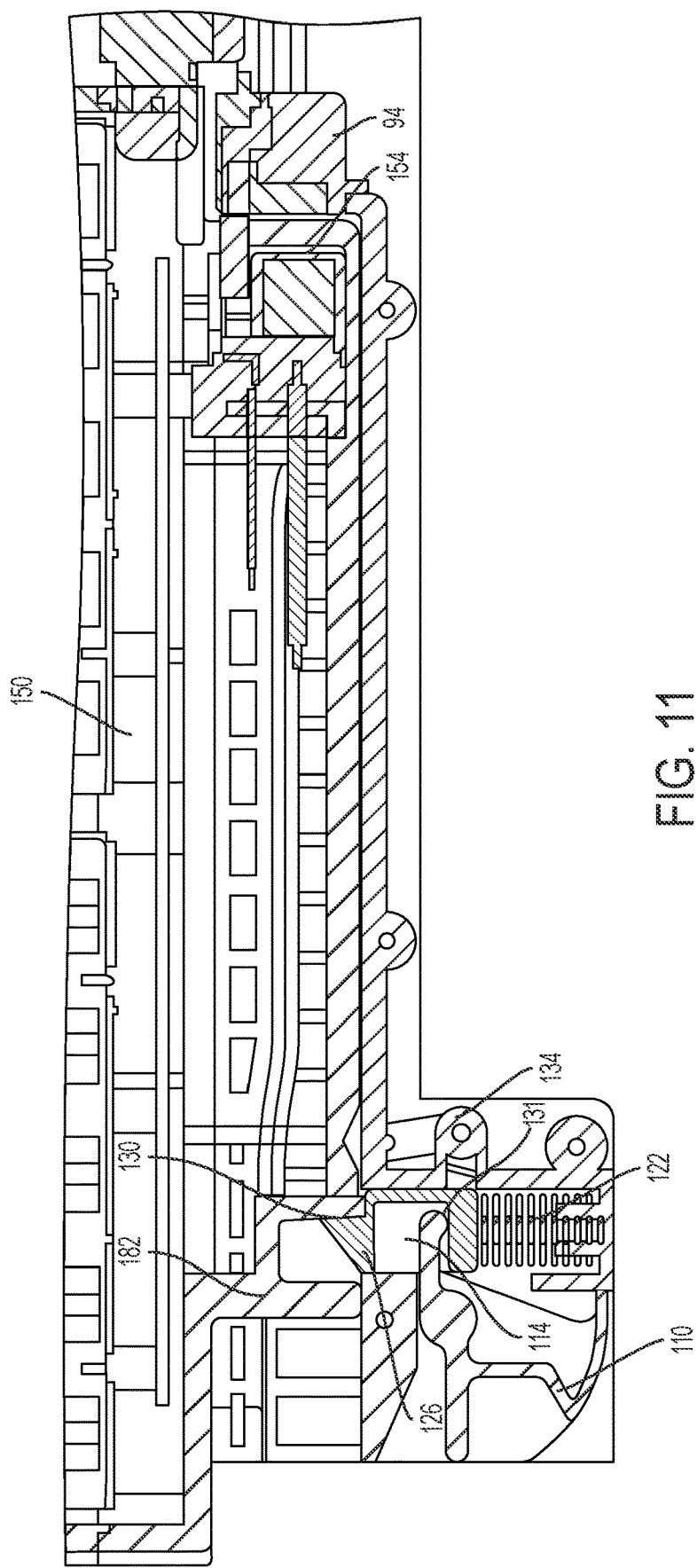
FIG. 11 is a cross-sectional side view of the battery pack coupled to the battery-receiving portion as shown in FIG. 1.

With specific reference to FIGS. 2-4, the battery-receiving portion 50 includes stepped grooves 58 extending between the open end 86 and the end wall 82 (e.g., as illustrated, from the open end 86 to the end wall 82). The stepped grooves 58 are defined by rails 98 disposed on the sidewalls 78. The rails 98 protrude from the sidewalls 78 to define an upper extent of the grooves 58 that face the lower surface 74.

As shown in FIG. 4, the illustrated rails 98 include a number of (e.g., three) generally parallel horizontal portions 102 defining distinct vertical clearances C1, C2, C3 . . . Cn of the grooves 58 measured between each horizontal portion 102 and the lower surface 74. Each horizontal portion 102 is connected by an angled portion 106 extending obliquely toward the lower surface 74 (e.g., when moving from left to right in FIG. 4) such that each horizontal portion 102 defines a successively smaller clearance, thereby forming the "stepped" configuration of the grooves 58. In the illustrated embodiment, the vertical clearance C1, C2, C3 of each of the horizontal portions 102 changes by a constant amount.

In other embodiments (not shown), the rails 98 may include two horizontal portions 102 or more than three horizontal portions 102. In addition, these portions 102 may be disposed at an angle relative to the lower surface 74. In other embodiments, the vertical clearances C1, C2, C3 may vary by different amounts (e.g., the difference in clearance may be greater or less than the difference in adjacent clearances).

A horizontal clearance is measured from the sidewall 78 to a periphery of the rails 98. In the illustrated embodiment (see FIG. 3), a stepped configuration is provided laterally between the opposite rails 98. The rails 98 include a number of (e.g., three) generally parallel axially-extending portions 107 defining distinct lateral clearances L1, L2, L3 . . . Ln therebetween. Each portion is connected to an angled portion 108 extending obliquely toward the opposite rail 98 (e.g., when moving from right to left in FIG. 3) such that the opposite portions 107 define a successively smaller lateral clearance, thereby forming the "stepped" configuration between the rails 98. In the illustrated embodiment, the lateral clearance L1, L2, L3 between each portion 107 changes by a constant amount.

In other embodiments (not shown), the rails 98 may include two portions 107 or more than three portions 107. In addition, these portions 107 may be disposed at an angle relative to the rail 98. In other embodiments, the lateral clearances L1, L2, L3 may vary by different amounts (e.g., the difference in clearance may be greater or less than the difference in adjacent clearances).

As shown in FIGS. 2, 4, and 11-12C, the latching mechanism 66 includes a pivotable actuator or handle 110 operatively engaging a latch member 114. The latch member 114 is slidably disposed in a bore 118 defined in the lower surface 74 and is biased by one or more biasing members (e.g., a spring 122, such as a coil spring, a torsion spring, etc.) to protrude through the lower surface 74 and into the cavity 70. The latch member 114 has an inclined surface 126 (e.g., angled about 30 degrees to about 60 degrees relative to the lower surface 74) facing toward the open end 86 and a generally vertically-extending surface 130 (e.g., about 0 degrees to about 10 degrees relative to a vertical axis) facing toward the end wall 82.

The latch member 114 is coupled to the spring 122. In some embodiments (not shown), two or more springs 122 may be coupled to the latch member 114. In such multi-spring arrangements, each spring 122 may be smaller/shorter, leading to a shorter overall height of the latch member 114 and the spring 122 without a reduction in biasing force.

The handle 110 is engaged with the latch member 114 via a cam surface 131 such that actuation (e.g., clockwise pivoting/rotation of the handle 110 with respect to the position shown in FIG. 4) of the handle 110 causes the latch member 114 to translate downward against the bias of the spring 122 to withdraw the latch member 114 from the cavity 70.

The latching mechanism 66 may be constructed for reduced wear. For example, the latch member 114 (and/or the latching recess (e.g., the slot 182) with which the latch member 114 is engageable) may be formed of or have one or more engagement surfaces including wear-resistant material. In the illustrated construction, the latch member 114 includes a polycarbonate (PC)-based material, such as, for example KINGFA® JH830, manufactured by Kingfa Science & Technology Co., Guangzhou, PRC. The material of the latch member 114 may, for example, increase hardness, impact resistance, wear resistance, etc., compared to Acrylonitrile butadiene styrene (ABS) or softer plastics.

The illustrated latching mechanism 66 also includes a switch 134 (e.g., a micro-switch 134) facilitating electrical coupling/decoupling of the battery pack 54 during actuation of the handle 110 to withdraw the latch member 114 from the cavity 70. In other embodiments, however, the switch 134 may be omitted. As will be described in greater detail with respect to FIGS. 12A-12C, the switch 134 may act to electrically decouple the battery pack 54 from the battery-receiving portion 50 and the device prior to removal of the battery pack 54 from the battery-receiving portion 50.

With reference to FIGS. 4-6 and 13A-13B, an ejector 138 is supported on the end wall 90. The ejector 138 includes an ejection member 142 biased by a biasing member (e.g., one or more springs (not shown)) to protrude through the end wall 90 (as shown in FIGS. 4-6 and 13A). When the battery pack 54 is attached to the battery-receiving portion 50 (see FIG. 13B), the ejection member 142 is pushed into the end wall 90 to compress the biasing member. From this position, the spring ejector 138 is configured to exert a force F on the battery pack 54 to push the battery pack 54 out of engagement with the battery-receiving portion 50 (e.g., upon release of the latching mechanism 66).

The stiffness of the ejector spring(s) may be tailored to the electrical device to which the battery pack 54 is connected. The stiffness may be based on a characteristic of the electrical device, such as, for example, a weight, mass, size, etc. of the electrical device, a speed of a motor (if provided), vibration generated by operation of the electrical device, etc. For example, for a power tool, such as a core drill, the stiffness of the spring(s) may be greater than that for another electrical device having a lower weight/mass, no motor, generating less vibration, etc. In contrast, for an electrical device, such as a charger, the stiffness may be relatively less to provide a decreased biasing force.

In another example, the biasing force of the ejector spring(s) may be different based on the electrical device. A stationary device, such as a table saw, a battery charger, etc., may require the ejector spring(s) to have increased biasing force to assist with ejection of the battery pack 54 from the electrical device, compared to a movable device, such as a hand-held power tool, which may be adjusted (e.g., moved to a position) to assist with removal of the battery pack 54.

In the some embodiments (as shown in FIGS. 4, 6 and 13A-13B), a switch 146 (e.g., an AC switch 146) is incorporated into the ejector 138. The switch 146 is configured to activate/deactivate an electrical device (e.g., a battery charger) based on a position of the battery pack 54 relative to the battery-receiving portion 50. In one example, pushing the ejection member 142 into the end wall 90 causes the ejection member 142 to engage and activate the switch 146. The switch 146 may be activated to permit power to be transferred to a portion of the device (e.g., a master board of a charger, etc.) when the battery pack 54 is initially inserted but prior to activation of the device contacts 94 (e.g., for charging operations).

FIGS. 7-10 illustrate a battery pack 54 for use with the battery-receiving portion 50, described above. The battery pack 54 includes a housing 150 defining an internal cavity in which one or more battery cells (not shown) are supported. Each battery cell may have a nominal voltage between about 3 V and about 5 V and may have a nominal capacity between about 2 Ah and about 6 Ah (in some cases, between about 3 Ah and about 5 Ah). The battery cells may be any rechargeable battery cell chemistry type, such as, for example, lithium (Li), lithium-ion (Li-ion), other lithium-based chemistry, nickel-cadmium (NiCd), nickel-metal hydride (NiMH), etc.

The battery cells may be connected in series, parallel, or combination series-parallel to provide the desired electrical characteristics (e.g., nominal voltage, current output, current capacity, power capacity, etc.) of the battery pack 54. The battery cells are coupled to battery contacts 154 supported on or within the housing 150 and configured to electrically and mechanically engage the device contacts 94 to facilitate the transfer of electrical power between the device and the battery pack 54. As will be described in greater detail below, the battery pack 54 includes mechanical features configured to engage corresponding features on the battery-receiving portion 50 to couple and maintain engagement of the battery-receiving portion 50 and the battery pack 54.

The housing 150 includes a protrusion 148 supporting, at a front end 158, the battery contacts 154. On each lateral side 162, a rail 166 extends laterally outwardly and to define a groove 170. Proximate a rear end 174, a top surface 178 defines a slot 182 sized and shaped to cooperate with the latch member 114.

In the illustrated embodiment, the rails 166 include a number of (e.g., three) parallel horizontal portions 186 defining distinct vertical clearances C4, C5, C6 . . . Cn of the grooves 170 measured between each horizontal portion 186 and the body of the housing 150. Each portion 186 is connected by an angled portion 190 extending obliquely away from the housing 150 when moving from the rear end 174 toward the front end 158 so each horizontal portion 186 defines a successively smaller clearance. As illustrated, the rails 166/grooves 170 of the battery pack 54 form a mated engagement between the rails 98/grooves 58 of the battery-receiving portion 50.

A horizontal clearance is measured from the lateral side 162 to a periphery of each rail 166. In the illustrated embodiment (see FIG. 10), a stepped configuration is provided laterally between the opposite rails 166. The rails 166 include a number of (e.g., three) generally parallel axially-extending portions 191 defining distinct lateral dimensions L4, L5, L6 . . . Ln therebetween. Each portion is connected to an angled portion 192 extending obliquely toward the opposite rail 166 (e.g., when moving from right to left in FIG. 10) such that the opposite portions 191 define a successively smaller lateral dimension, thereby forming the "stepped" configuration between the rails 166. In the illustrated embodiment, the lateral dimension L4, L5, L6 between each portion 191 changes by a constant amount.

It should be understood that, if the size and shape of the battery-receiving portion 50 is modified, corresponding variations in the size and shape of the battery pack 54 may be made. For example, the geometric configuration of the rails 98, 166 will be consistently varied in order to maintain the mating engagement between the battery pack 54 and the battery-receiving portion 50. It should be understood that, in other constructions (not shown), the orientation of the rails 98, 166 may be reversed with the rails 98 being directed outwardly and the rails 166 being directed inwardly.

With reference to FIGS. 1, 11, 12A-C, and 13B, the battery pack 54 is coupled to the battery-receiving portion 50 by aligning the rails 166 of the battery pack 54 with the grooves 58 of the battery-receiving portion 50, and subsequently sliding the battery pack 54 along a battery insertion axis 194 until the device contacts 94 engage the battery contacts 154.

In order to allow the sliding of the battery pack 54 onto the battery-receiving portion 50, the latch member 114 retracts into the bore 118 in the lower surface 74. To do so, a user may pivot the handle 110 to retract the latch member 114 while sliding the battery pack 54, or the user may simply slide the battery pack 54 relative to the battery-receiving portion 50 such that the front end 158 of the protrusion 148 engages the inclined surface 126. The angle of the inclined surface 126 causes the force exerted by the front end 158 to act vertically against the bias of the spring 122 such that the latch member 114 is "automatically" retracted into the bore 118 when the battery pack 54 slides through the cavity 70.

The size and shape of the rails 166 relative to the grooves 58 (and of the rails 98 relative to the grooves 170) act to facilitate and guide insertion of the battery pack 54 onto the battery-receiving portion 50. The relative clearances defined between the rails 166 and the grooves 58 decrease as the battery pack 54 is inserted further onto the battery-receiving portion 50. In the illustrated embodiment, engagement between the rails 166 and the grooves 58 (and between the rails 98 and the grooves 170) is closest proximate the front end 158 and the end wall 82 and proximate the rear end 174 and the open end 86. This construction may facilitate a tighter, more secure engagement between the battery pack 54 and the battery-receiving portion 50 as the battery pack 54 approaches and reaches full insertion.

In the illustrated embodiment, increased clearance is provided between the rails 166 relative to the grooves 58 (and of the rails 98 relative to the grooves 170) in the region between the front end 158/the end wall 82 and the rear end 174/the open end 86. This arrangement may facilitate smooth and easy insertion of the battery pack 54 due to, for example, reduced engagement, interference, etc.

When the battery pack 54 is fully inserted (FIGS. 1, 11 and 12A), the latch member 114 protrudes from the lower surface 74 to engage the slot 182 on the protrusion 148 thereby latching the battery pack 54 to the battery-receiving portion 50 (e.g., in a latched or locked position). The spring 122 biases the latching member 114 to engage the slot 182, and the vertical surface 130 of the latching member 114 engages a corresponding surface on the interior of the slot 182. Removal (and ejection) of the battery pack 54 along the insertion axis 194 is inhibited by the latch member 114. This engagement of the latching member 114 may also ensure and maintain close mechanical and electrical connection of the pack contacts 154 and the device contacts 94.

Figure 12A:
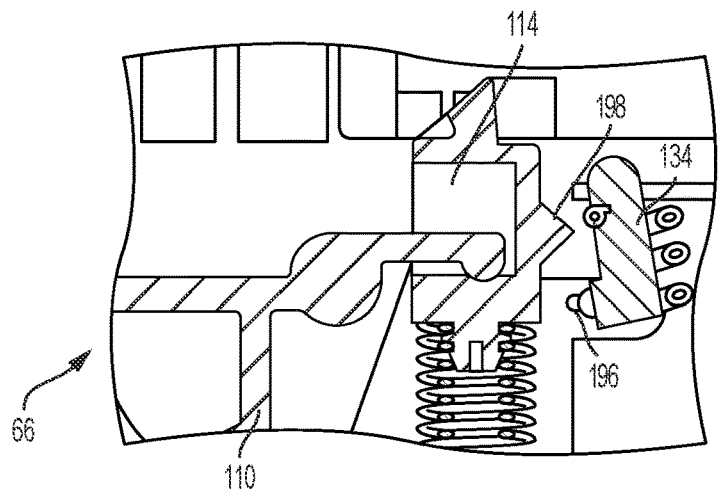
FIG. 12A is a cross-sectional side view of a latching mechanism of the battery-receiving portion shown in FIG. 11, illustrated in a latched position.
Figure 12B:
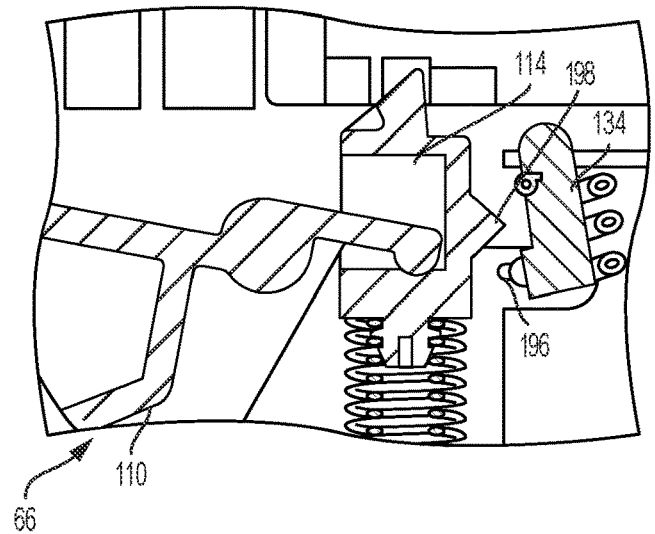
FIG. 12B is a cross-sectional side view of the latching mechanism shown in FIG. 12A, illustrated in an intermediate position.
Figure 12C:
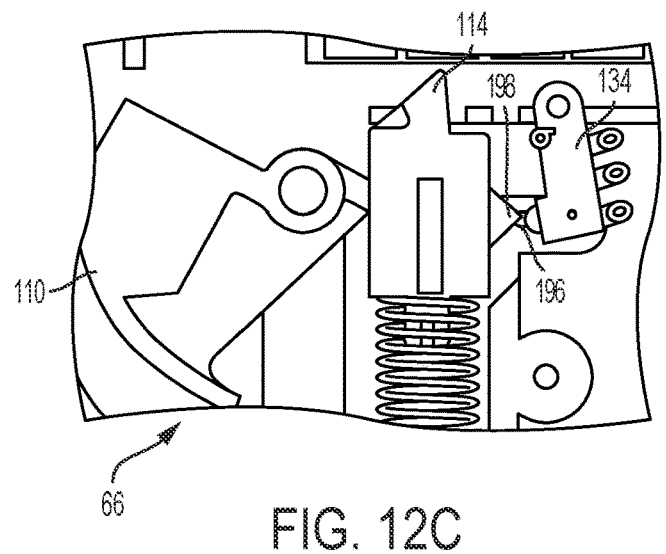
FIG. 12C is a cross-sectional side view of the latching mechanism shown in FIG. 12A, illustrated in an unlatched position.

FIGS. 12A-12C illustrate operation of the pivot-actuated latching mechanism 66. As the latch member 114 is moved from the latched position (FIG. 12A) to an intermediate position (FIG. 12B), the switch 134 is activated to inhibit the transfer of electrical power between the battery pack 54 and the device before the battery pack 54 is released by the latching member 114 and removable from the battery-receiving portion 50 and before the contacts 154, 94 disengage. Activation of the switch 134 to stop power transfer between the battery pack 54 and the device may, for example, prevent arcing between the contacts 154, 94 as the battery pack 54 is removed.

Further movement of the latching member 114 to an unlatched position (FIG. 12C) removes the latching member 114 from the slot 182, and the battery pack 54 is permitted to move along the battery insertion axis 194 off of the battery-receiving portion 50. The switch 134 is maintained in the on position to continue inhibiting the transfer of power between the battery pack 54 and the device.

As illustrated in FIGS. 12A-12C, the latch member 114 includes a protrusion 198 engaging an actuator 196 of the switch 134. In the illustrated construction, the intermediate position (FIG. 12B) in which the switch 134 is actuated is approximately halfway between the latched position (FIG. 12A) and the unlatched position (FIG. 12C) of the latch member. In other embodiments (not shown), actuation of the switch 134 may occur at any point between the latched and unlatched positions of the latch member 114.

Figure 13B:
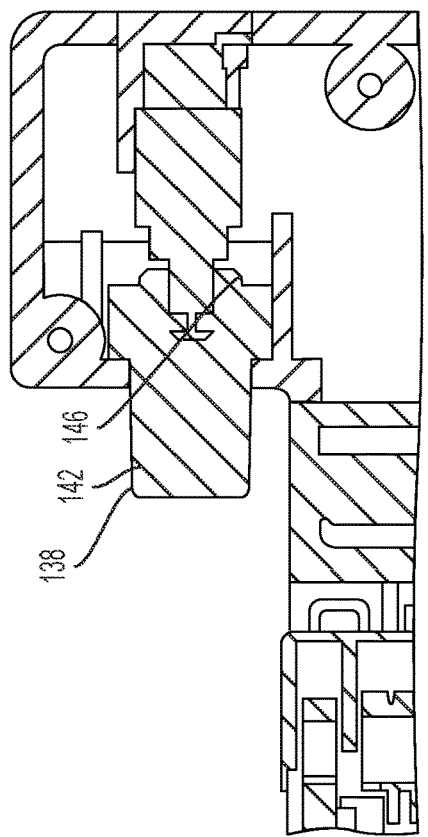
FIG. 13B is a cross-sectional side view of the spring ejector shown in FIG. 13A, illustrating when the battery pack is coupled to the battery-receiving portion.
Figure 13A:
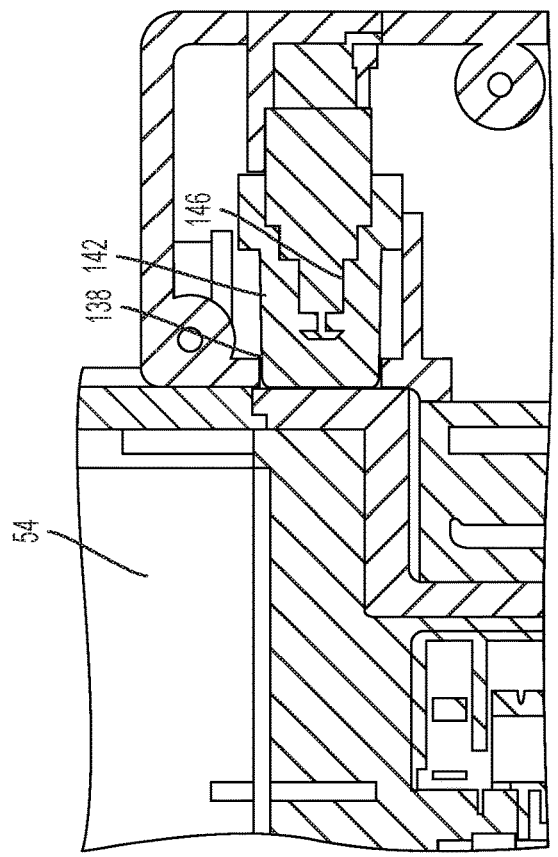
FIG. 13A is a cross-sectional side view of the spring ejector shown in FIG. 5.
Figure 14:
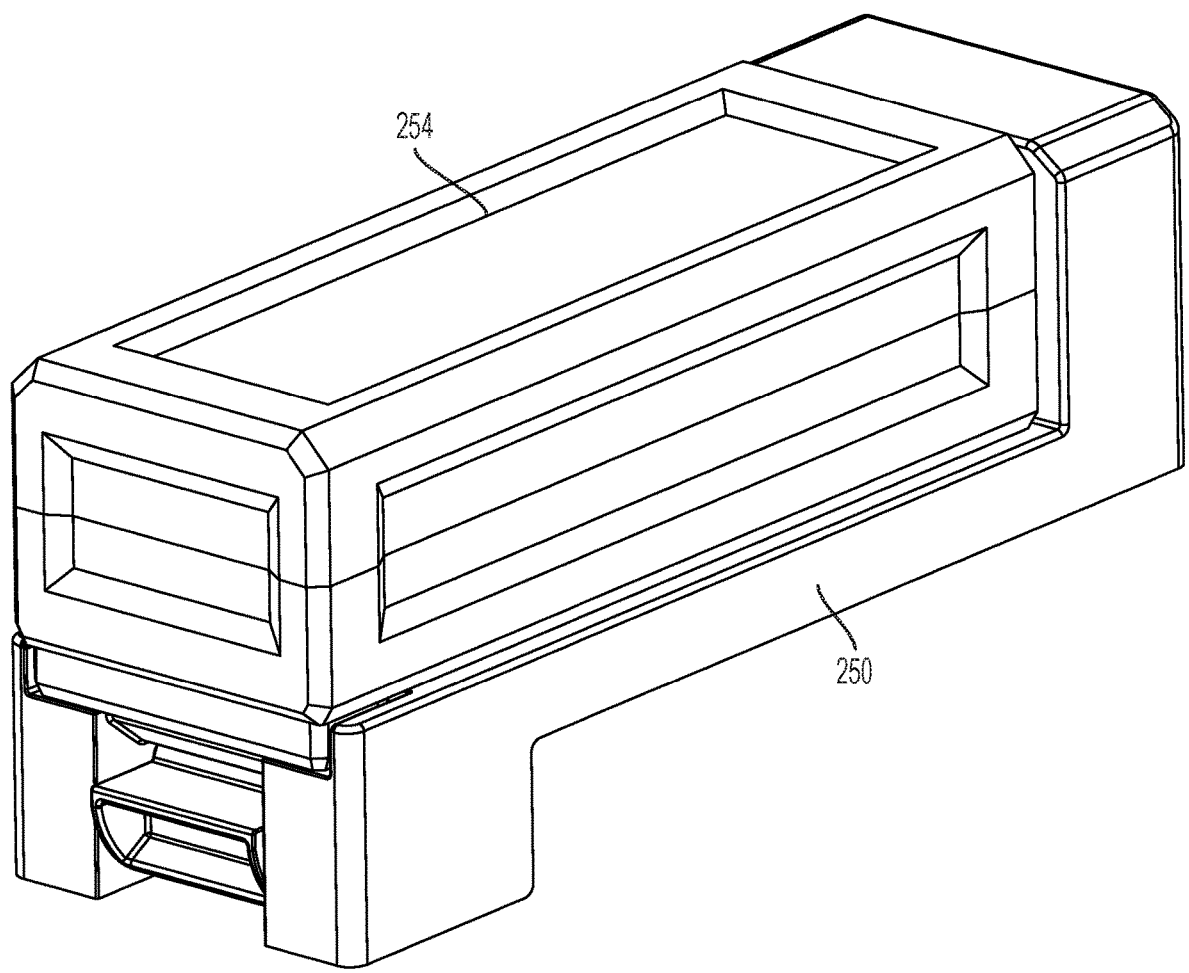
FIG. 14 is a perspective view of a battery pack coupled to a battery-receiving portion of an electrical device according to a second embodiment.

FIGS. 13A-13B illustrate operation of the ejector 138. When the battery pack 54 is fully inserted onto the battery-receiving portion 50 (see FIG. 13A), the ejection member 142 is pushed into the end wall 90 and the biasing member is compressed (e.g., the compressed condition of the ejector 138). In the compressed position, the ejection member 142 actuates the switch 146 to activate the electrical device (e.g., to permit power to be transferred to a portion of the device (e.g., a master board of a charger, etc.)).

When the latching member 114 is moved to the unlatched position (see FIG. 12C), the biased ejection member 142 exerts a force F along the direction of the battery insertion axis 194 to force the battery pack 54 toward disengagement from the battery-receiving portion 50 (e.g., the eject position (see FIG. 13B)). In one example, the ejection member 142 forces the battery pack 54 to a position in which the battery contacts 154 and the device contacts 94 become mechanically and electrically disengaged. As mentioned above, prior to this movement, the switch 134 has been activated to inhibit the transfer of electrical power between the battery pack 54 and the device. Displacement of the ejection member 142 to protrude through the end wall 90 disengages the switch 146 to deactivate a portion of the device (e.g., to inhibit power transfer to a portion of the device (such as the master board)), to disconnect the device contacts 94, or both.

FIGS. 14-20C illustrate an alternative construction of a battery-receiving portion 250 of an electrical device configured to receive a corresponding battery pack 254. The battery-receiving portion 250 and the corresponding battery pack 254 are similar to the battery-receiving portion 50 and the battery pack 54 shown in FIGS. 1-13B, and common elements have the same reference number plus "200".

The following description will focus on aspects of the battery-receiving portion 250 and battery pack 254 different than the battery-receiving portion 50 and the battery pack 54. It should be noted, however, that features of the battery-receiving portion 250 or the battery pack 254 may be incorporated or substituted into the battery-receiving portion 50 or the battery pack 54, or vice versa.

The battery-receiving portion 250 includes a first cavity 252 and a second cavity 256. The illustrated cavities 252, 256 are aligned but separated by a solid portion 260. The first cavity 252 is defined by a first lower surface 264, a pair of sidewalls 268, a first end wall 272, and an open end 286 opposite the first end wall 272. The second cavity 256 is similarly defined by a second lower surface 276, a pair of sidewalls 280, a second end wall 284, and a third end wall 288 opposite the second end wall 284.

In the illustrated embodiment, at least a portion of a latching mechanism 266 protrudes from the first lower surface 264 and is configured to engage the battery pack 254 to maintain a connection between the battery pack 254 and the battery-receiving portion 250. However, in other embodiments (not shown), the latching mechanism 266 may be disposed at various locations (e.g., on a sidewall 268, the end wall 272, the upper end wall 290, the second cavity 256, etc.) such that the latching mechanism 266 engages corresponding features on the battery pack 254 (e.g., a slot 382) to maintain engagement between the battery pack 254 and the battery-receiving portion 250.

Figure 15:
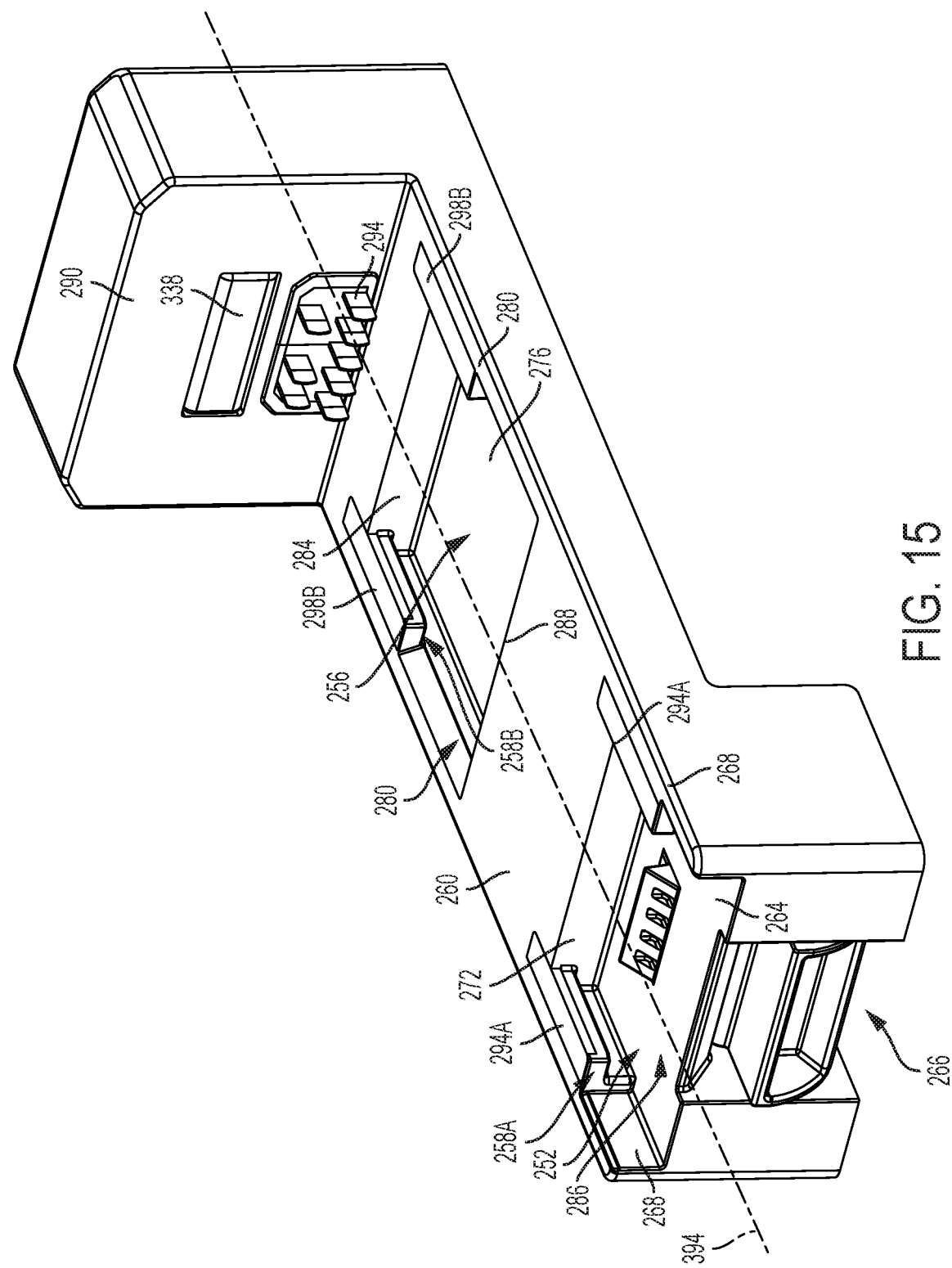
FIG. 15 is a perspective view of the battery-receiving portion shown in FIG. 14.
Figure 16:
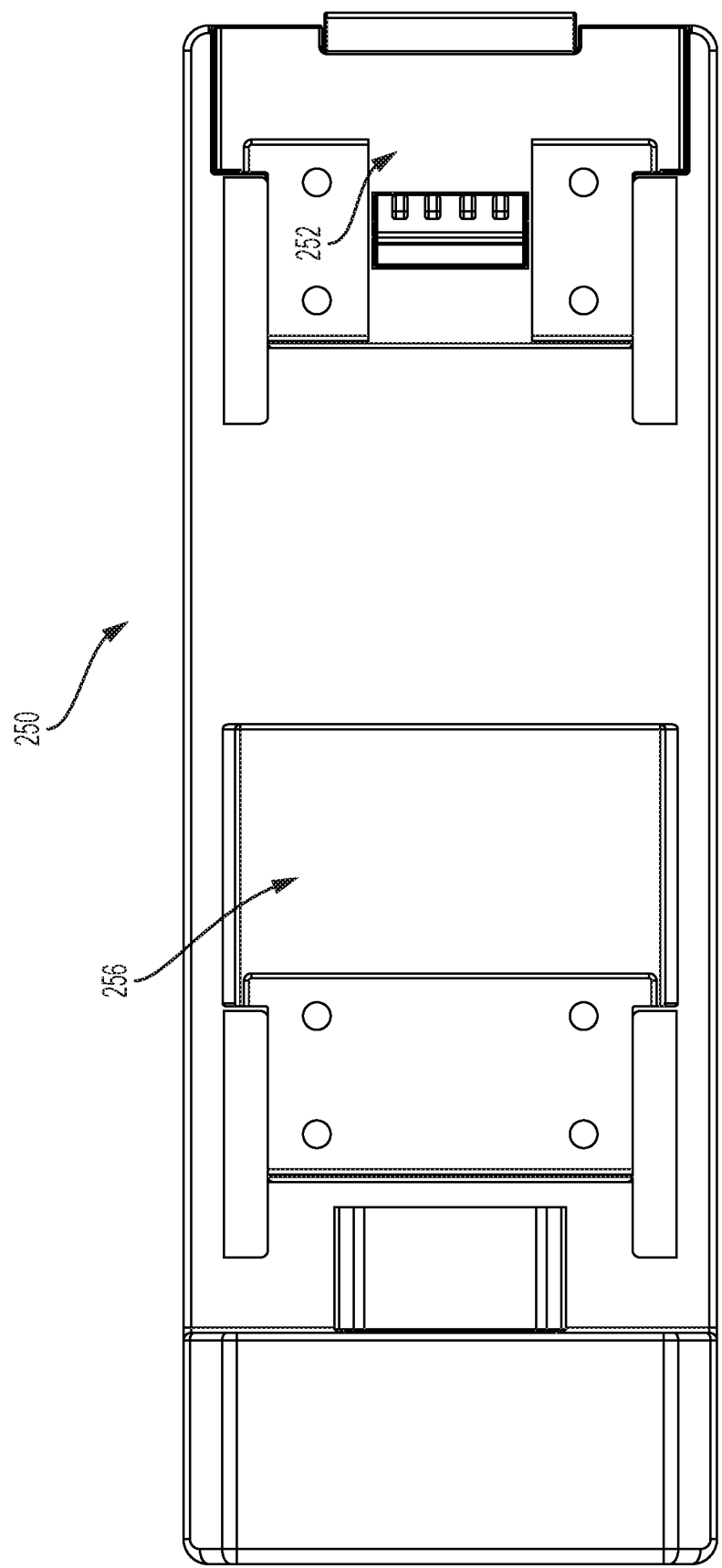
FIG. 16 is a bottom view of the battery-receiving portion shown in FIG. 15.
Figure 17:
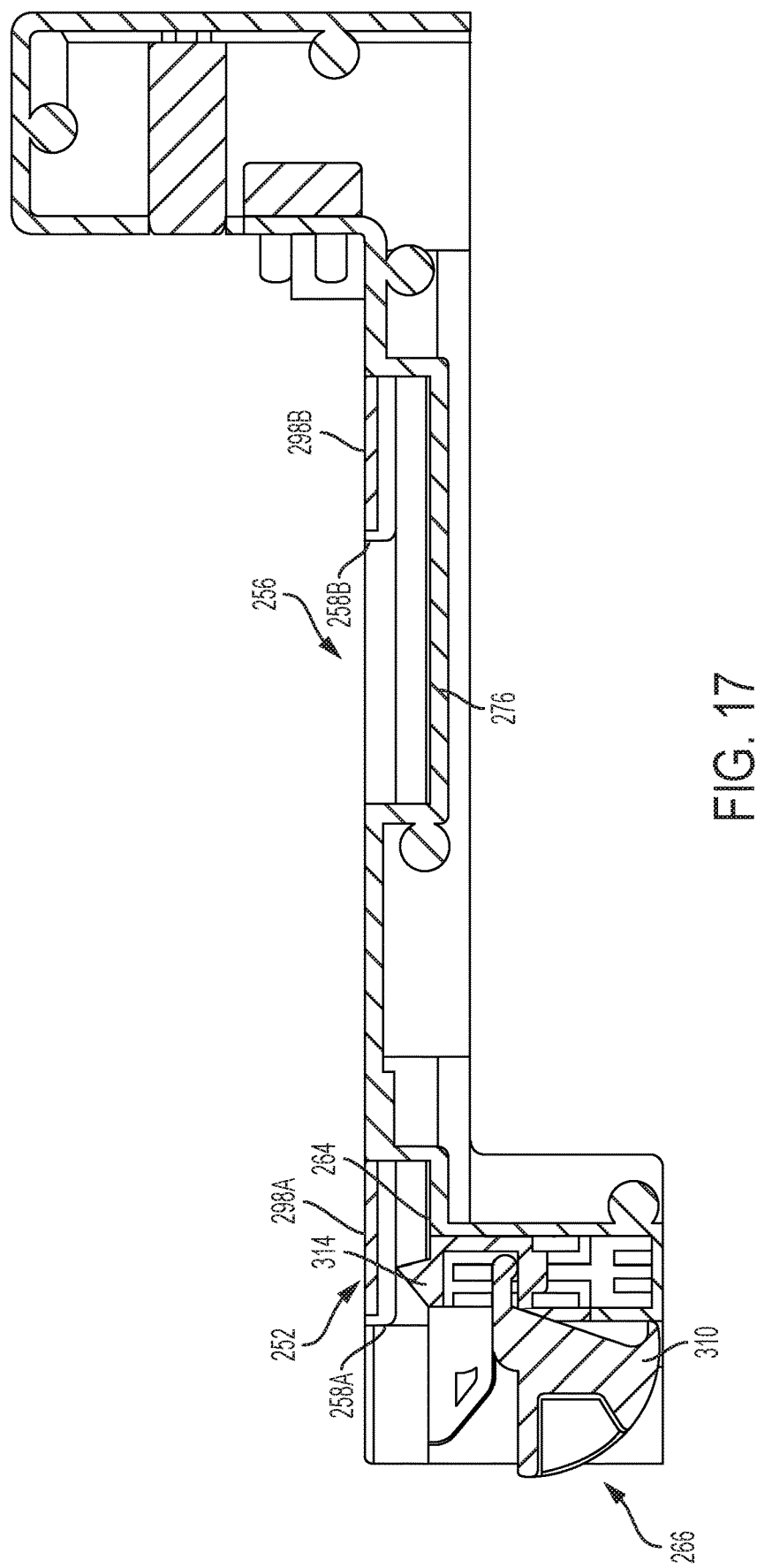
FIG. 17 is a cross-sectional side view of the battery-receiving portion shown in FIG. 15.

With specific reference to FIGS. 15-17, the battery-receiving portion 250 includes first grooves 258A defined by first rails 298A disposed along a portion of the sidewalls 268 of the first cavity 252 from the open end 286 to the first end wall 272. Second grooves 258B are defined by second rails 298B disposed along a portion of the sidewalls 268 of the second cavity 256 from second end wall 284 toward the third end wall 288. The illustrated rails 298A, 298B are collinear and collectively define a single battery sliding axis 394.

Device contacts 294 are supported on the end wall 290 and configured to receive battery contacts 354. An ejector 338 is configured to provide assisted removal of the battery pack 254 along the battery sliding axis 394.

Figure 18:
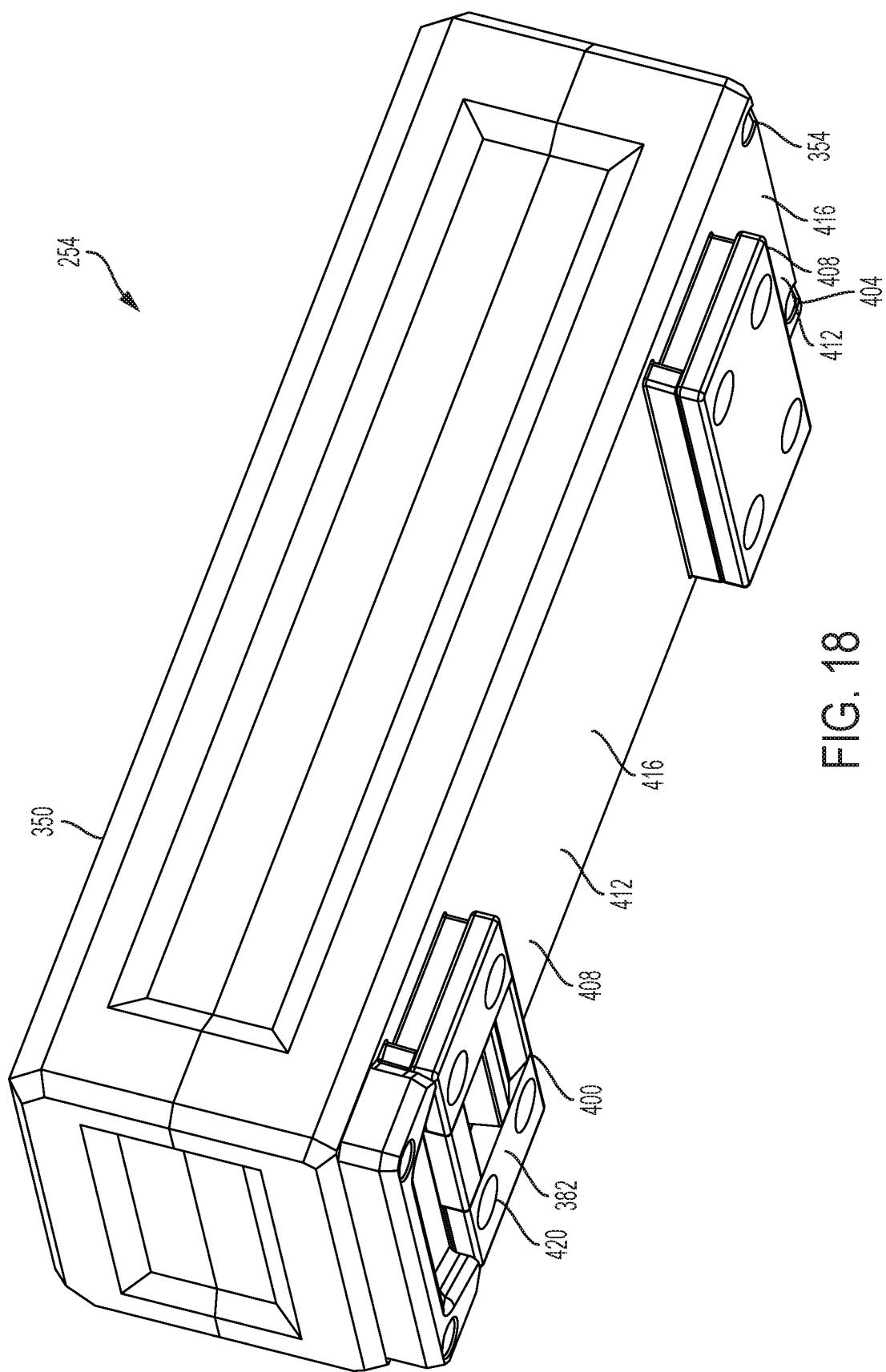
FIG. 18 is a perspective view of the battery pack shown in FIG. 14.
Figure 19:
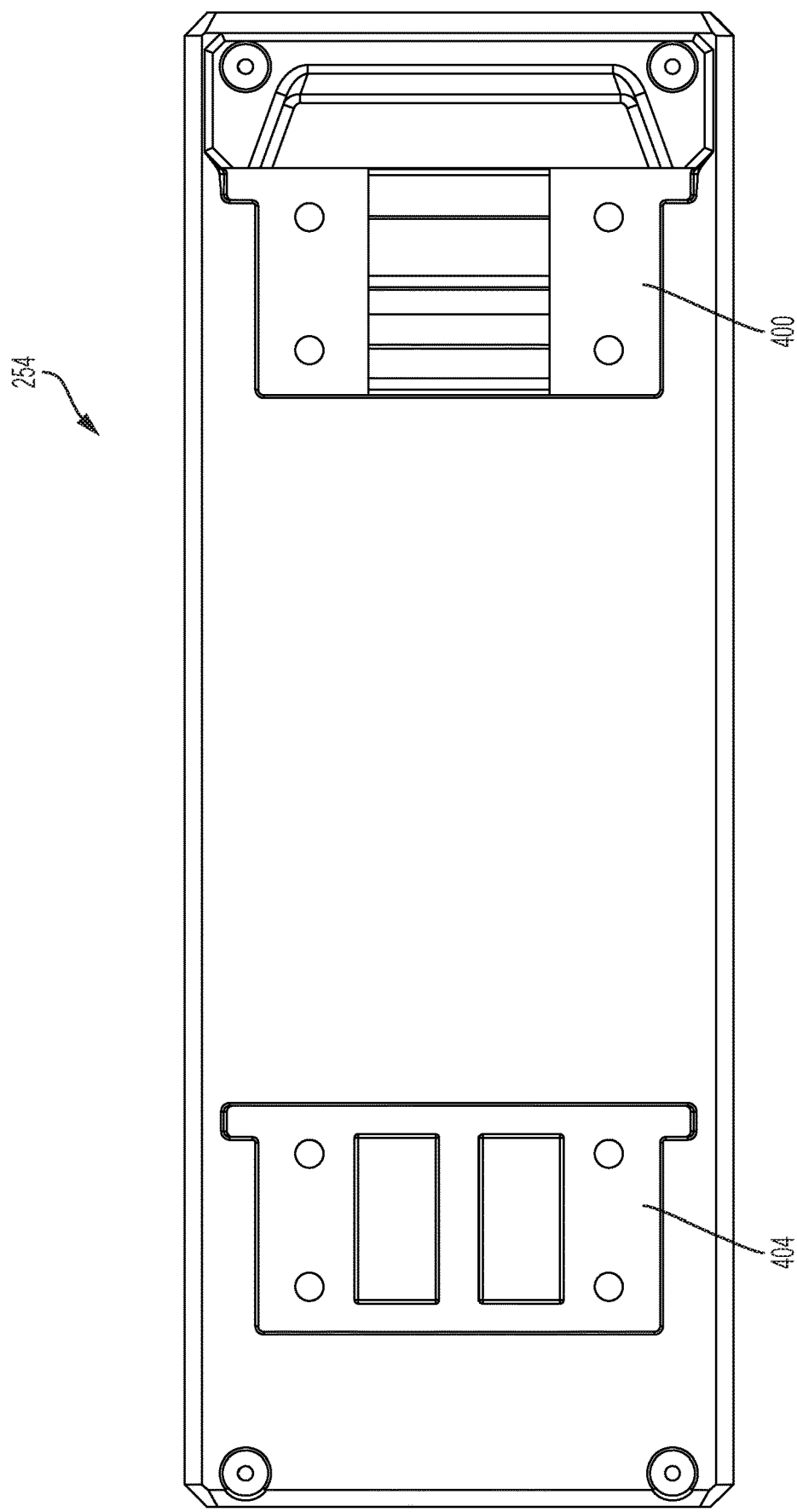
FIG. 19 is a top view of the battery pack shown in FIG. 18.

FIGS. 18-19 illustrate the battery pack 254 for use with the battery-receiving portion 250, described above. The battery pack 254 includes a housing 350 supporting one or more battery cells (not shown) coupled to the battery contacts 354.

The battery pack 254 includes a first protrusion 400 and a second protrusion 404 defined on the housing 350. Each protrusion 400, 404 has lateral sides 408, each including a rail 412 outwardly therefrom to define a groove 416. The first protrusion 400 further includes a surface 420 defining the slot 382 to receive the latch member 314. The rails 412 of the first protrusion 400 and the second protrusion 404 are collinear and sized and shaped to be received by the grooves 258A, 258B defined within the first cavity 252 and the second cavity 256, respectively.

Figure 20A:
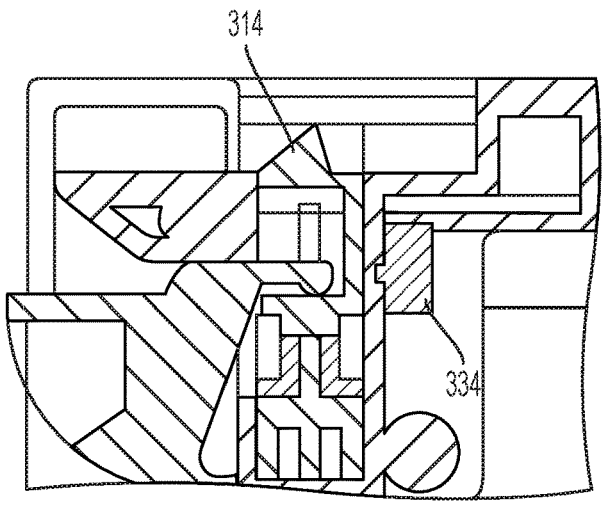
FIG. 20A is a cross-sectional side view of a latching mechanism of the battery-receiving portion shown in FIG. 17, illustrated in a latched position.
Figure 20B:
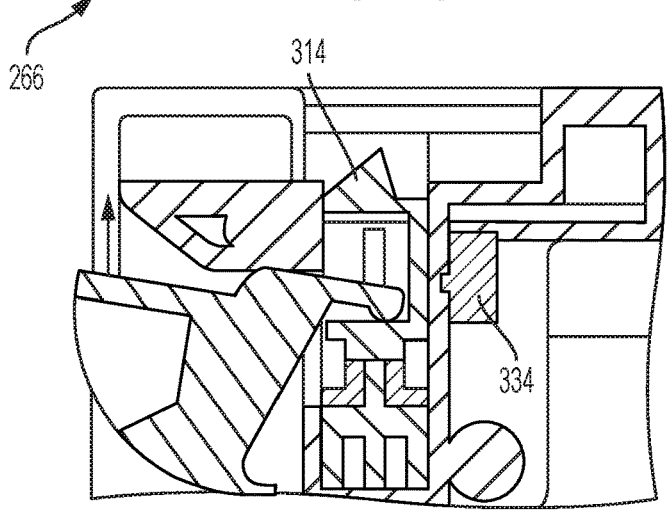
FIG. 20B is a side view of a cross section of the latching mechanism as shown in FIG. 20A, illustrated in an intermediate position.
Figure 20C:
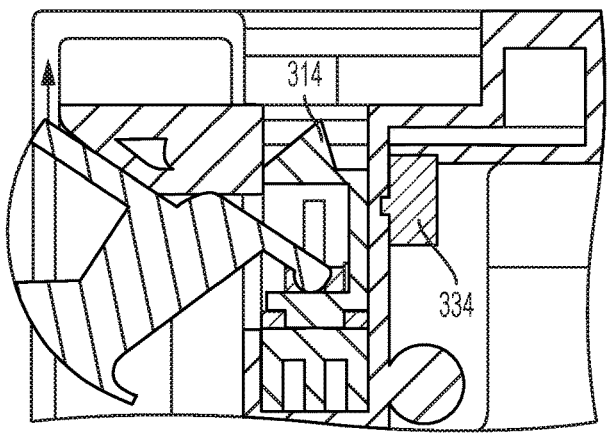
FIG. 20C is a side view of a cross section of the latching mechanism as shown in FIG. 20A, illustrated in an unlatched position.

With reference to FIGS. 20A-20C, the latching mechanism 266 is substantially similar to the latching mechanism 66 described above. However, in this embodiment, a switch 334 is not engaged until the latch member 314 is nearly removed from the first cavity 252. The intermediate position (FIG. 20B) may, for example, correspond to the latching member 314 being approximately 55% to 95% removed from the first cavity 252.

As illustrated in FIGS. 14-20C, the battery-receiving portion 250 and the battery pack 254 provide a "drop and slide" configuration. That is, to attach the battery pack 254 to the battery-receiving portion 250, the battery 254 is first "dropped" into the battery-receiving portion 250 along a vertical axis such that the first protrusion 400 and the second protrusion 404 drop into the first cavity 252 and the second cavity 256, respectively. Subsequently, the battery pack 254 "slides" along the battery sliding axis 394 to initiate coupling and latching in a similar manner as described above with respect to FIGS. 1-13B. In addition, decoupling or removal and ejection of the battery pack 254 is similar to the procedure described above with respect to FIGS. 1-13B.

FIGS. 21-23 and 27-28 illustrate an alternate construction of a battery-receiving portion 550 of an electrical device configured to receive a corresponding battery pack 554 (FIGS. 24-28). The battery-receiving portion 550 and the corresponding battery pack 554 are similar to the battery-receiving portions 50, 250 and the battery pack 54, 254 shown in FIGS. 1-13B and 14-20C, respectively. Common elements have the same reference number plus "500" from the battery-receiving portion 50 and the battery pack 54 and the same reference numeral plus "300" from the battery-receiving portion 250 and the battery pack 254.

The following description will focus on aspects of the battery-receiving portion 550 and the battery pack 554 different than the battery-receiving portions 50, 250 and the battery pack 54. It should be noted, however, that features of the battery-receiving portion 550 or the battery pack 554 may be incorporated or substituted into the battery-receiving portions 50, 250 or the battery pack 54, 254, or vice versa.

Figure 21:
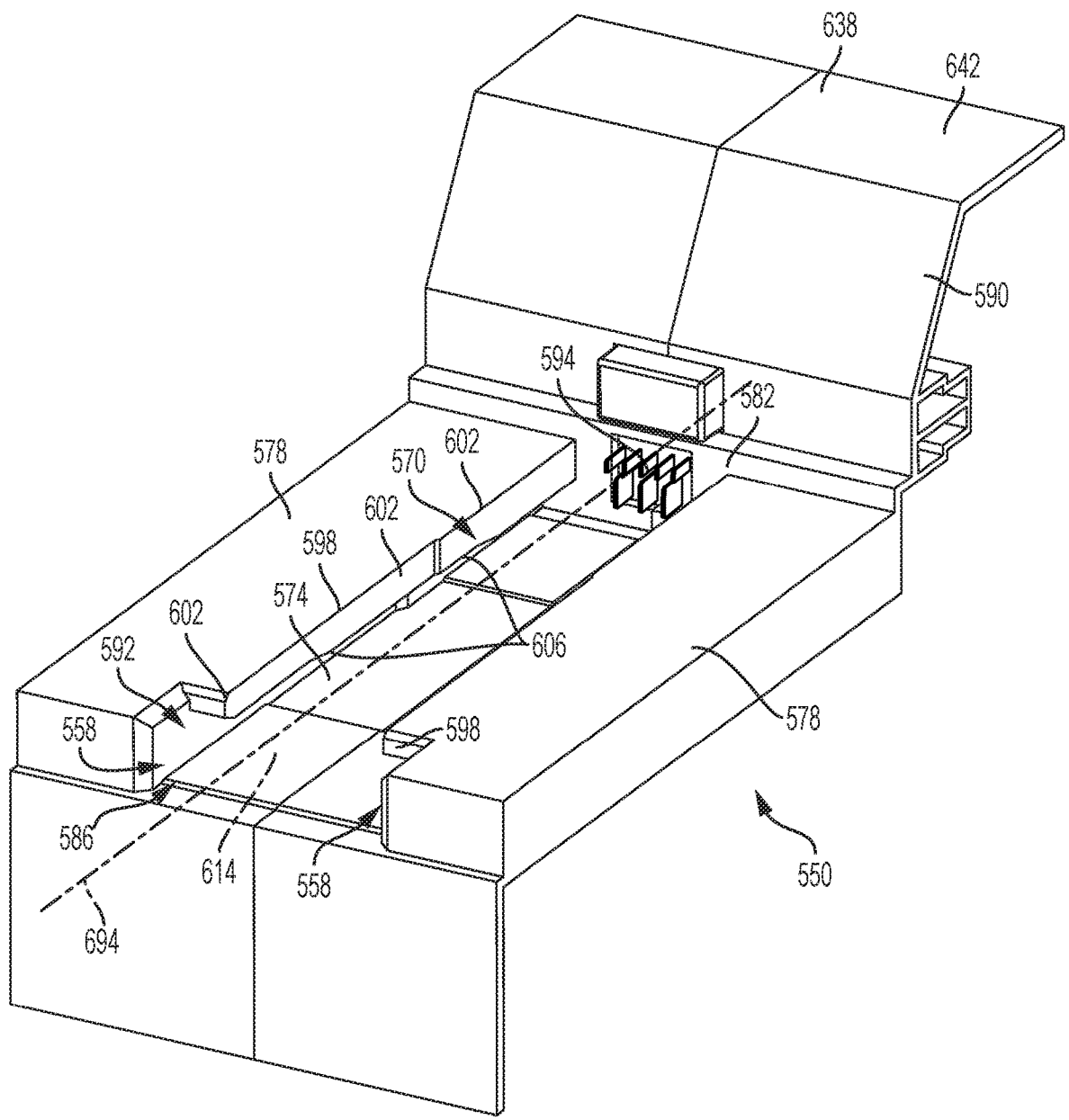
FIG. 21 is a perspective view of a battery-receiving portion of an electrical device according to a third embodiment.
Figure 22:
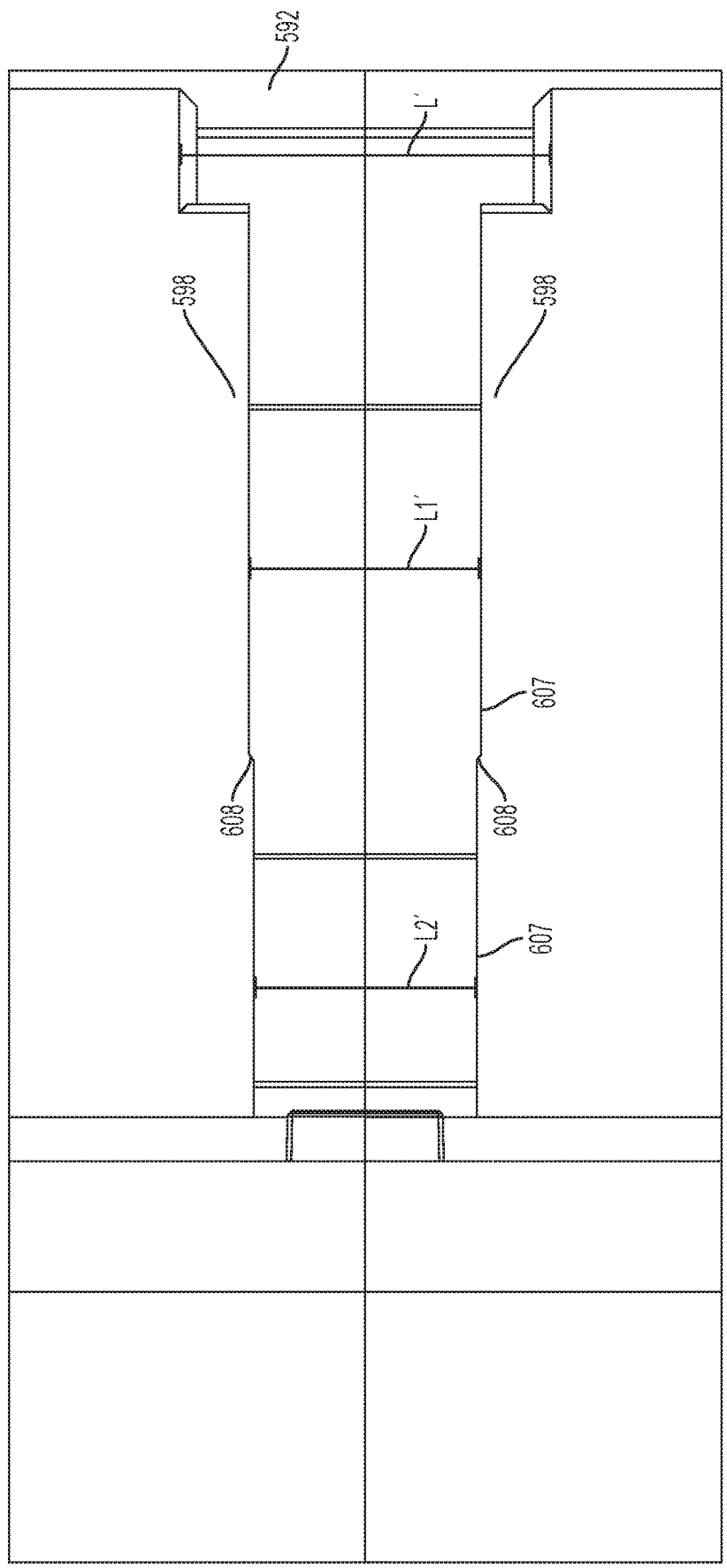
FIG. 22 is a bottom view of the battery-receiving portion shown in FIG. 21.
Figure 23:
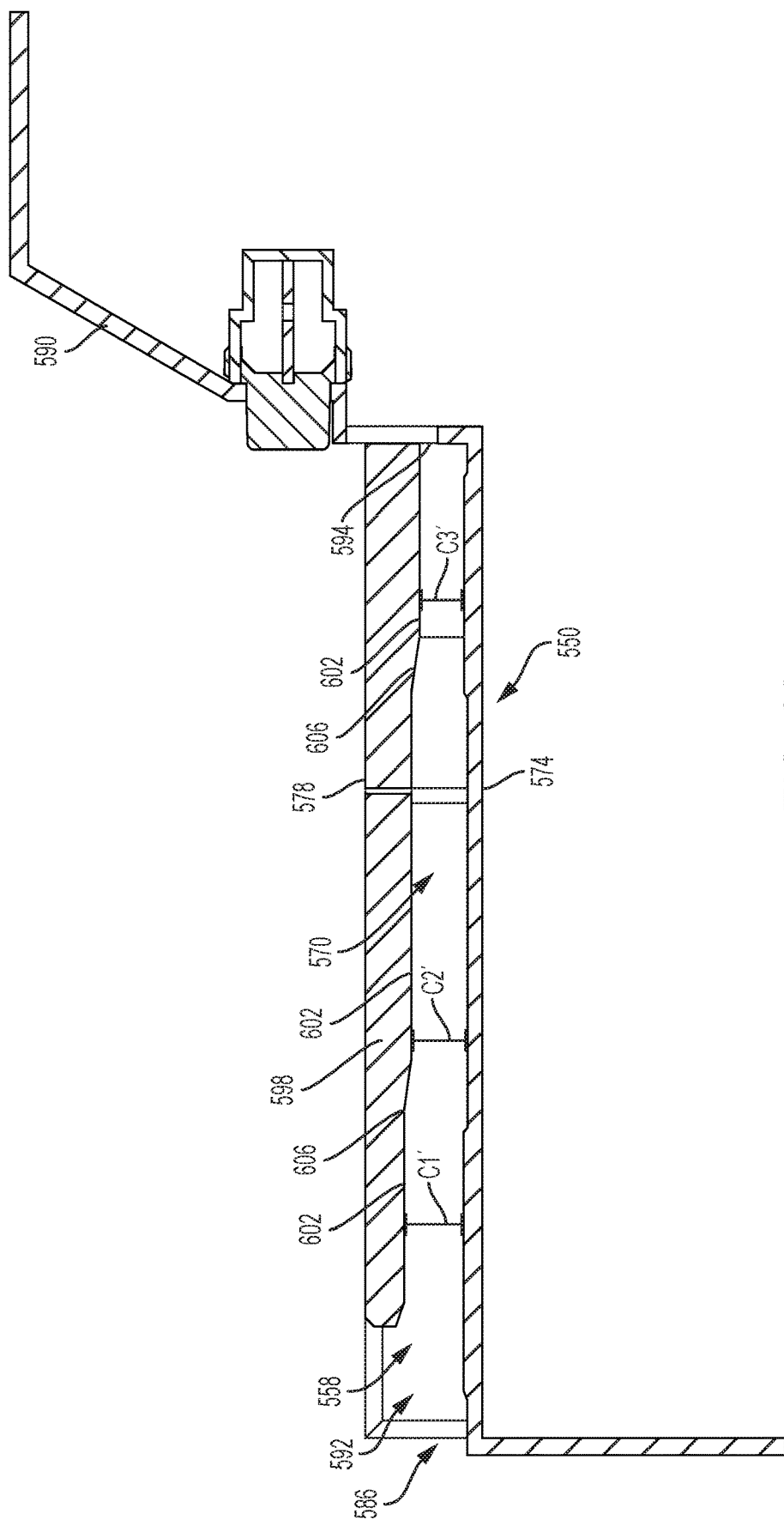
FIG. 23 is a cross-sectional side view of the battery-receiving portion shown in FIG. 21.

With specific reference to FIGS. 21-23, the illustrated battery-receiving portion 550 includes stepped grooves 558 extending along a portion of the sidewalls 578 between the open end 586 and the end wall 582 (e.g., as illustrated, from near the open end 586 to the end wall 582). In other embodiments (not shown), the grooves 558 may be substantially linear. The stepped grooves 558 are defined by rails 598 disposed on the sidewalls 578. The rails 598 protrude from the sidewalls 578 to define an upper extent of the grooves 558 that face the lower surface 574. As seen in FIGS. 21-23, the rails 598 do not extend along a portion of the sidewalls 578 proximate the open end 586 such that a widened portion 592 is defined at the open end 586.

In the illustrated embodiment (see FIG. 22), a stepped configuration is provided laterally between the opposite rails 598. The rails 598 include a number of (e.g., two) generally parallel axially-extending portions 607 defining distinct lateral clearances $L1', L2', \ldots Ln'$ therebetween. Each portion is connected to an angled portion 608 extending obliquely toward the opposite rail 598 (e.g., when moving from right to left in FIG. 22) such that the opposite portions 607 define a successively smaller lateral clearance, thereby forming the "stepped" configuration between the rails 598. In addition, a lateral clearance L' is provided between the sidewalls 578 in the widened portion 592 at the open end 586. In other embodiments (not shown), the rails 598 may include more than two portions 607.

Figure 24:
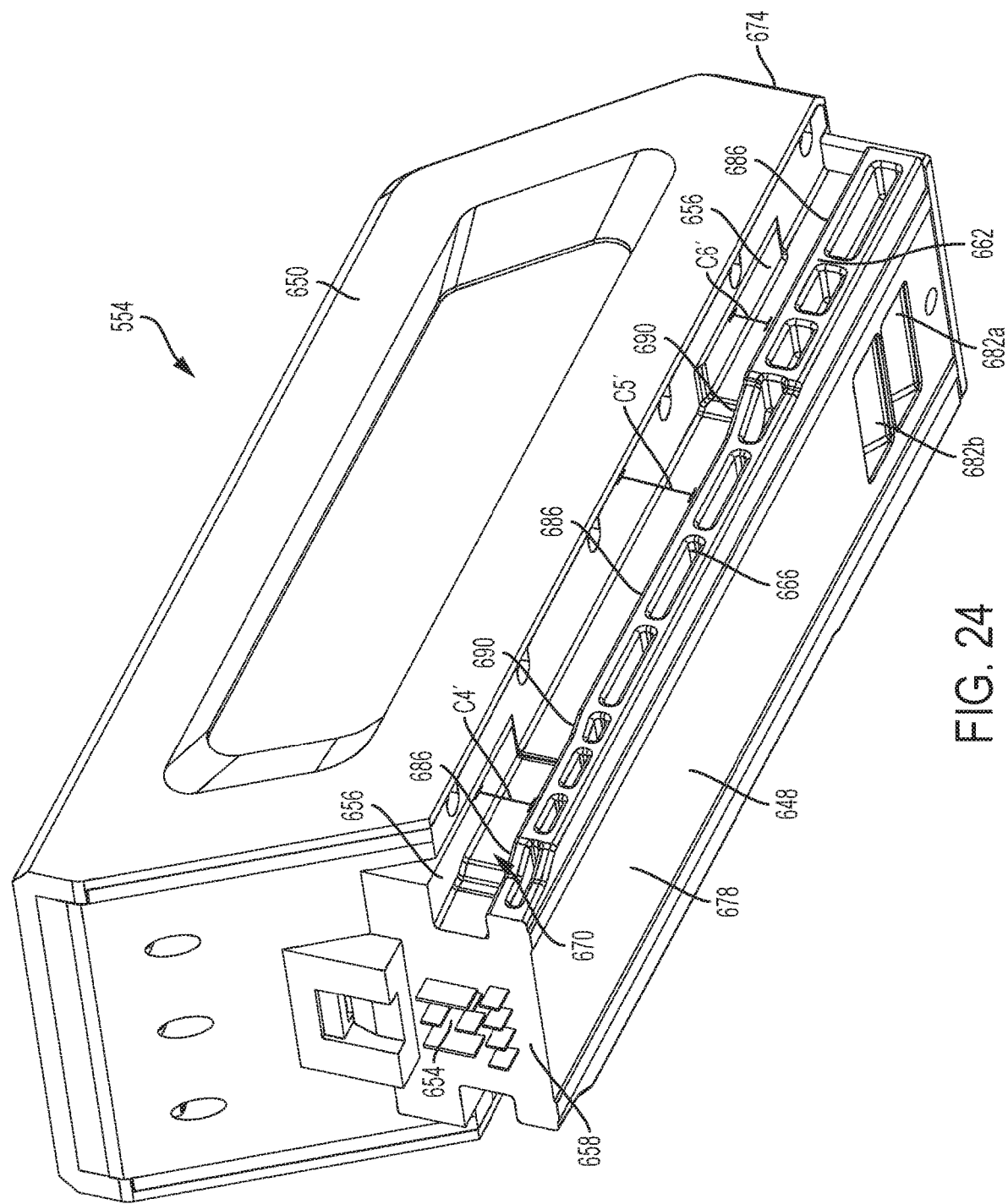
FIG. 24 is a perspective view of a battery pack for use with the battery-receiving portion of FIG. 21.
Figure 25:
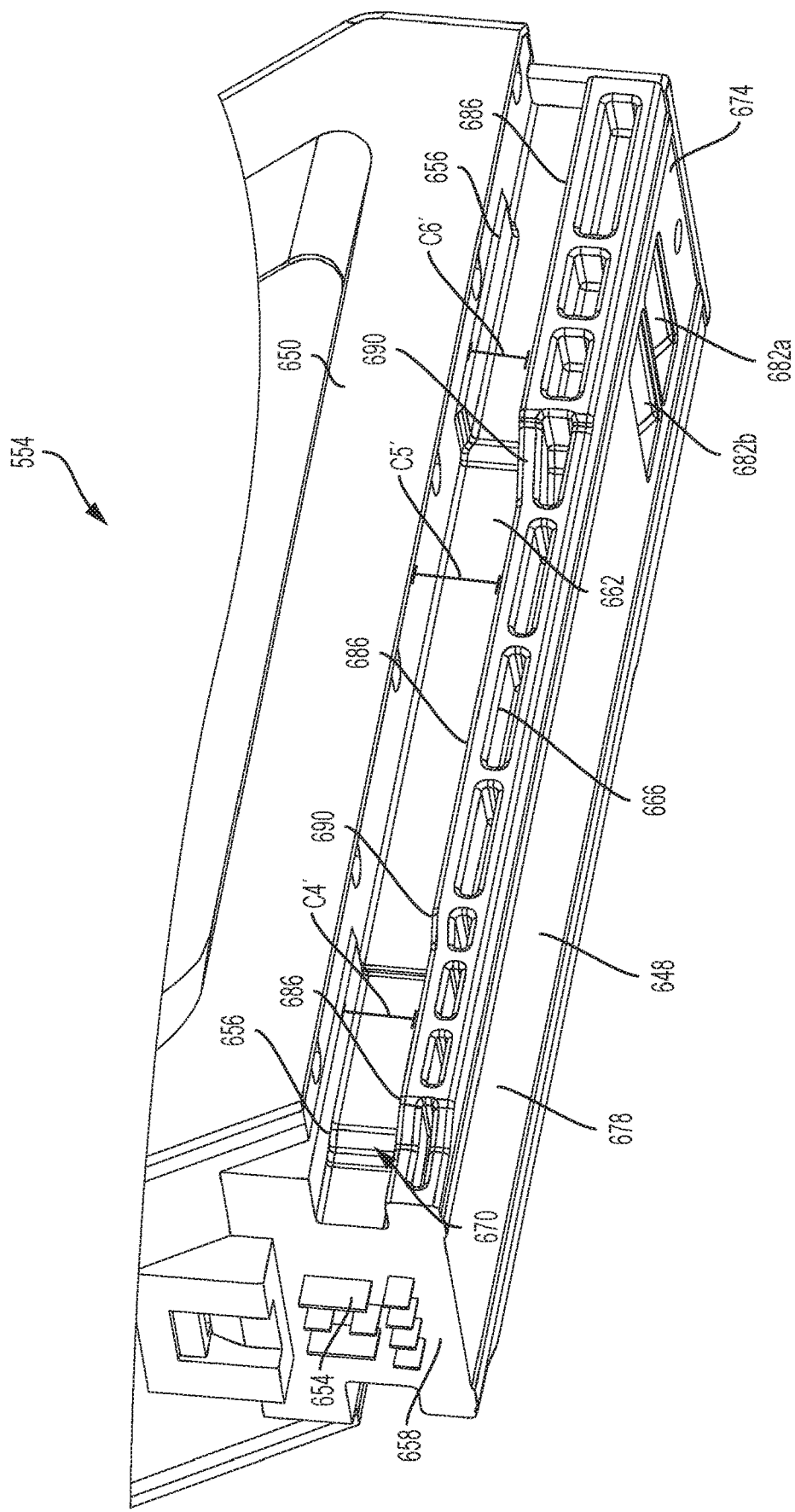
FIG. 25 is an enlarged perspective view of a portion of the battery pack shown in FIG. 24.
Figure 26:
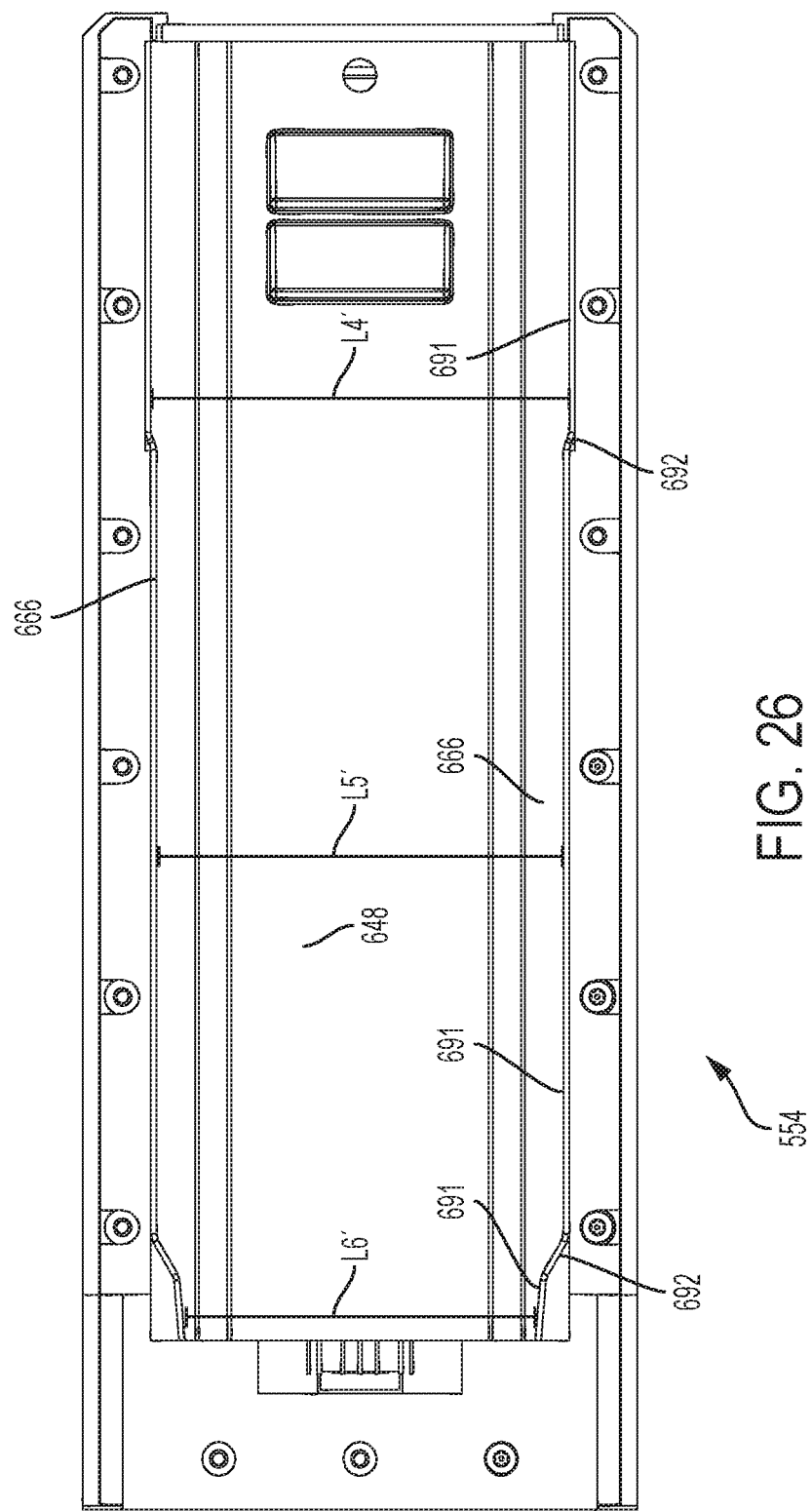
FIG. 26 is a top view of the battery pack shown in FIG. 24.

FIGS. 24-26 illustrate a battery pack 554 for use with the battery-receiving portion 550, described above. As will be described in greater detail below, the battery pack 554 includes mechanical features configured to engage corresponding features on the battery-receiving portion 550 to couple and maintain engagement of the battery-receiving portion 550 and the battery pack 554.

In the illustrated embodiment, the rails 666 include a number of (e.g., three) parallel horizontal portions 686 and the body of the housing 650 includes a number of (e.g., two) projections 652 defining pads or flat surfaces 656 facing the rails 666. The grooves 670 are defined by distinct vertical clearances C4', C5', C6' . . . Cn' of the grooves 670 measured between each horizontal portion 686 and the flat surfaces 656 (e.g., C4' and C6') or the body of the housing 650 (e.g., C5'). Each portion 686 is connected by an angled portion 690 extending obliquely away from the housing 650 when moving from the rear end 674 toward the front end 658. As illustrated, the rails 666/grooves 670 of the battery pack 554 form a mated engagement between the rails 598/grooves 558 of the battery-receiving portion 550.

The illustrated battery pack 554 includes a pair of slots 682a, 682b on the surface 678 configured to receive the latching member 614. When battery pack 554 is connected to the battery-receiving portion 550 and the latching mechanism 66, 266 is engaged, the latch member 114, 314 engages the slot 682a. When the latch member 114, 314 is disengaged from the slot 682a, as the battery pack 554 is removed from the battery-receiving portion 550, the latch member 114, 314 will engage the slot 682b if the handle 110, 310 is no longer actuated/has been released. This re-engagement of the latch member 114, 314 may inhibit the battery pack 554 from being disconnected inadvertently (e.g., if the handle 110, 310 was inadvertently actuated).

A horizontal clearance is measured from the lateral side 662 to a periphery of each rail 666. In the illustrated embodiment (see FIG. 26), a stepped configuration is provided laterally between the opposite rails 666. The rails 666 include a number of (e.g., three) generally parallel axially-extending portions 691 defining distinct lateral dimensions L4', L5', L6' . . . Ln' therebetween. Each portion is connected to an angled portion 692 extending obliquely toward the opposite rail 666 (e.g., when moving from right to left in FIG. 26) such that the opposite portions 691 define a successively smaller lateral dimension, thereby forming the "stepped" configuration between the rails 666. In the illustrated embodiment, the lateral dimension L4', L5', L6' between each portion 691 changes by a constant amount.

Again, it should be understood that, if the size, shape, orientation, etc. of the battery-receiving portion 550 is modified, corresponding variations in the size, shape, orientation, etc. of the battery pack 554 may be made.

Figure 27:
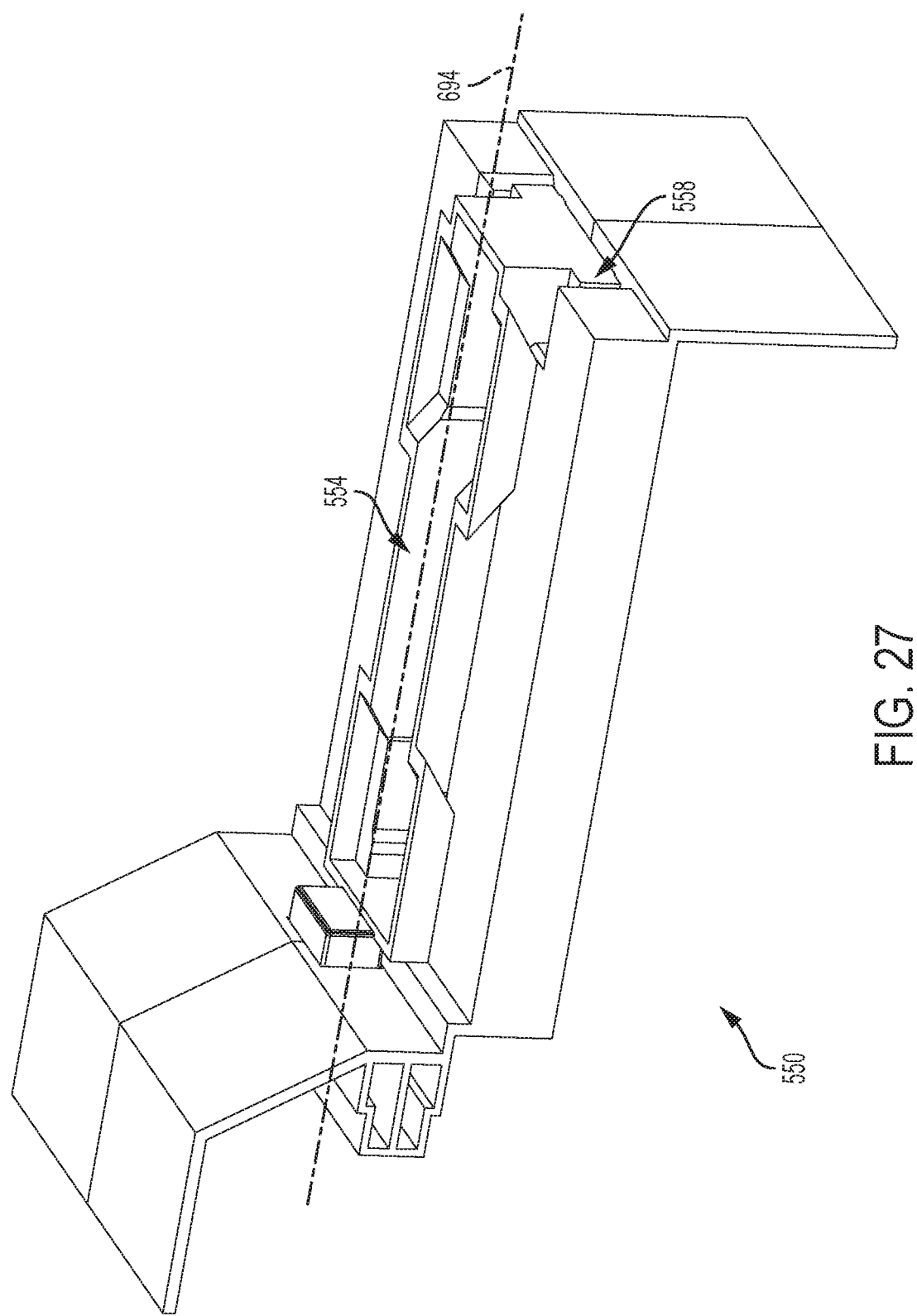
FIG. 27 is a perspective view of a portion of battery pack coupled to the battery-receiving portion of FIG. 21.
Figure 28:
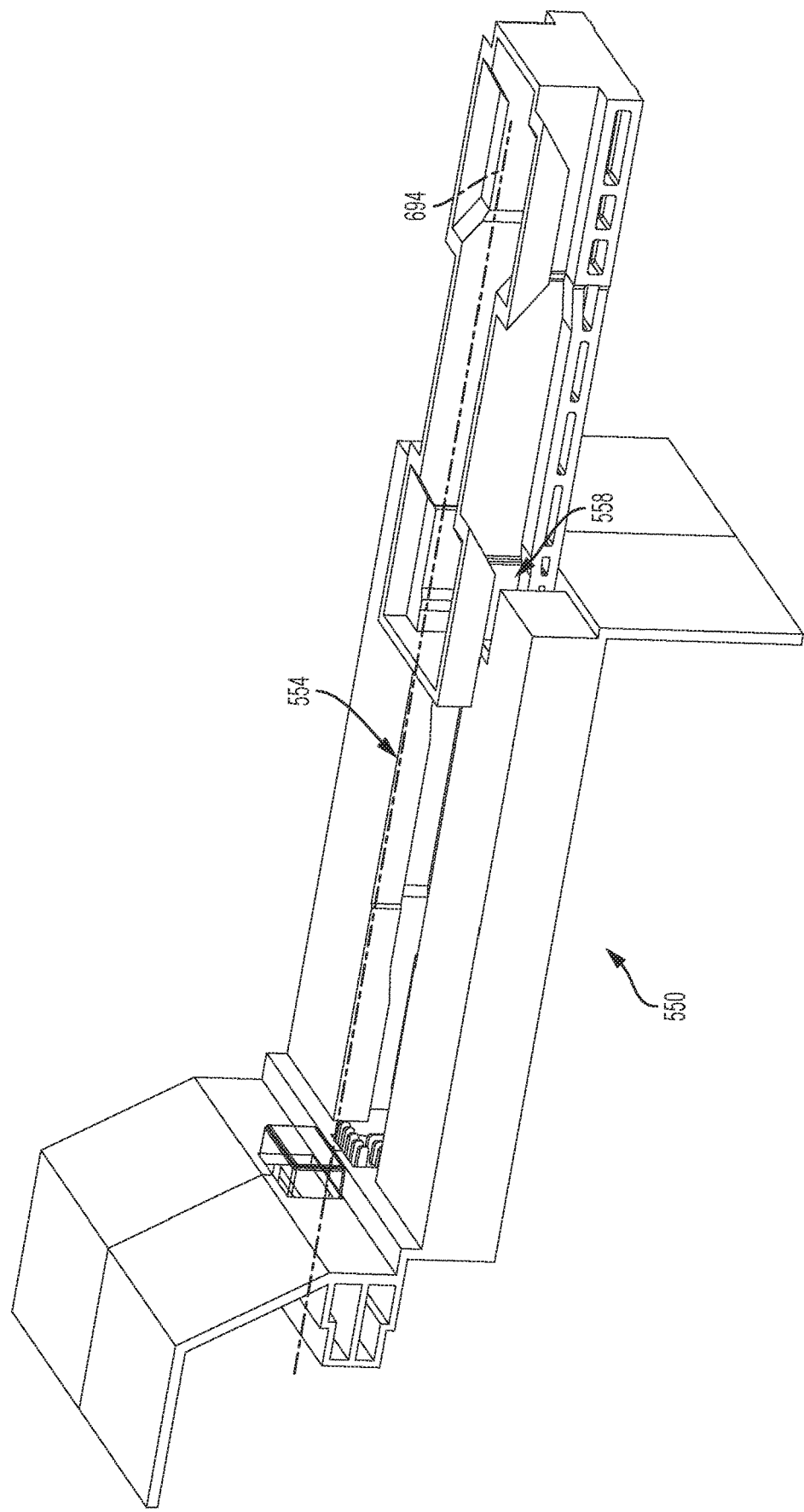
FIG. 28 is a perspective view of the portion of battery pack shown in FIG. 27, illustrated as partially engaged with the battery-receiving portion of FIG. 21.

FIGS. 27-28 illustrate a mating portion of the battery pack 554 (e.g., the battery pack 554 with the body of the housing 560 removed) being coupled to the battery-receiving portion 550. As illustrated, the rails 666 of the battery pack 554 are aligned with the grooves 558 of the battery-receiving portion 550, and, subsequently, the battery pack 554 slides along a battery insertion axis 694 until the device contacts 594 engage the battery contacts 654.

The widened portion 592 may facilitate insertion of the battery pack 554 by providing extra clearance at the open end 586 to reduce the difficulty in aligning the rails 666 of the battery pack 554 with the grooves 558 of the battery-receiving portion 550. Likewise, the larger relative clearances defined between the rails 666 and the grooves 558, which decrease as the battery pack 554 is inserted further onto the battery-receiving portion 550, may also facilitate insertion of the battery pack 554 while providing a tighter, more secure engagement between the battery pack 554 and the battery-receiving portion 550 by creating tighter clearances (e.g., at C4' and C6') at full insertion of the battery pack 554.

Figure 29:
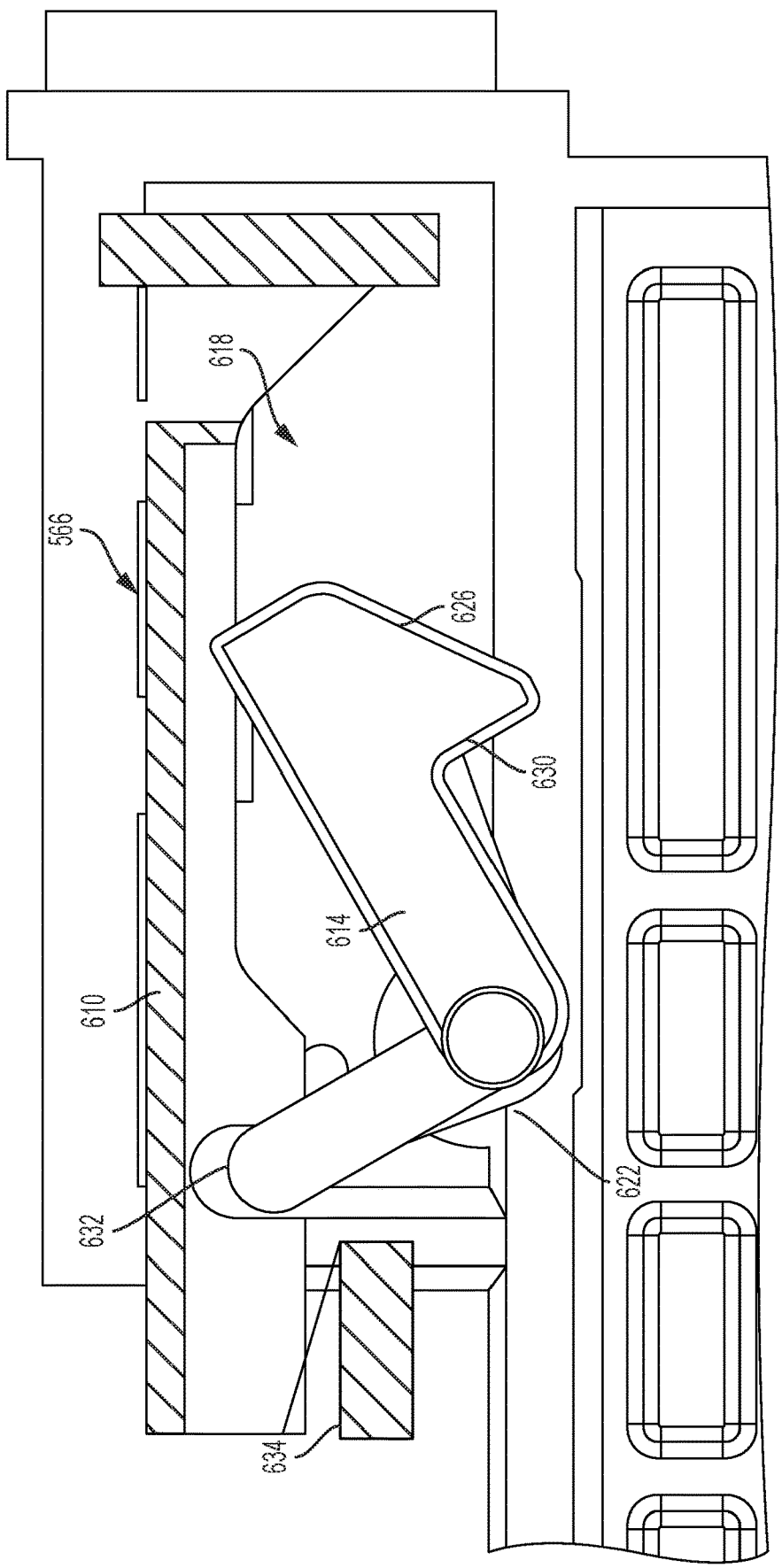
FIG. 29 is a cross-sectional side view of an alternative construction of a latching mechanism of a battery-receiving portion.
Figure 30:
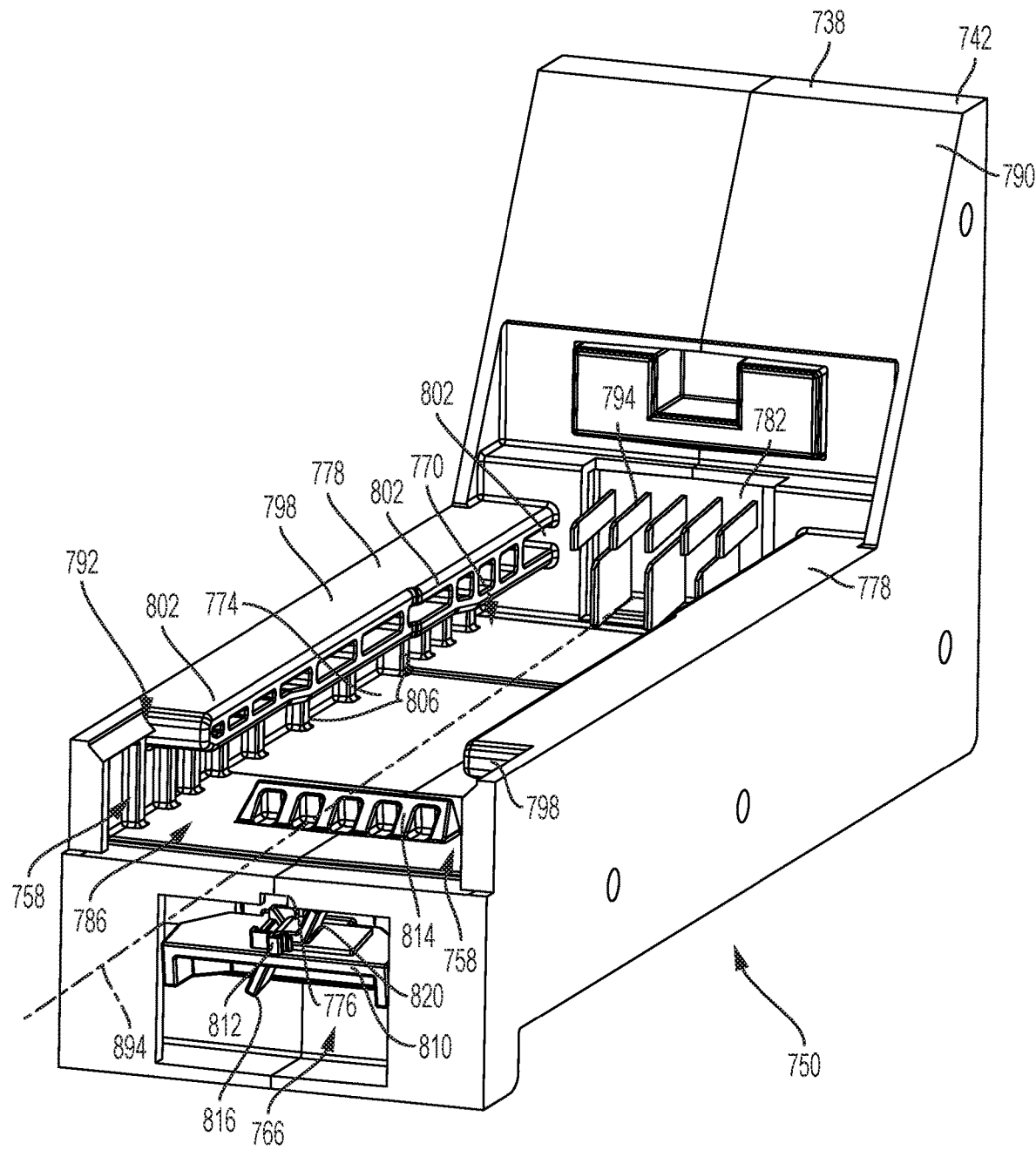
FIG. 30 is a perspective view of a battery-receiving portion of an electrical device according to a fourth embodiment.
Figure 31:
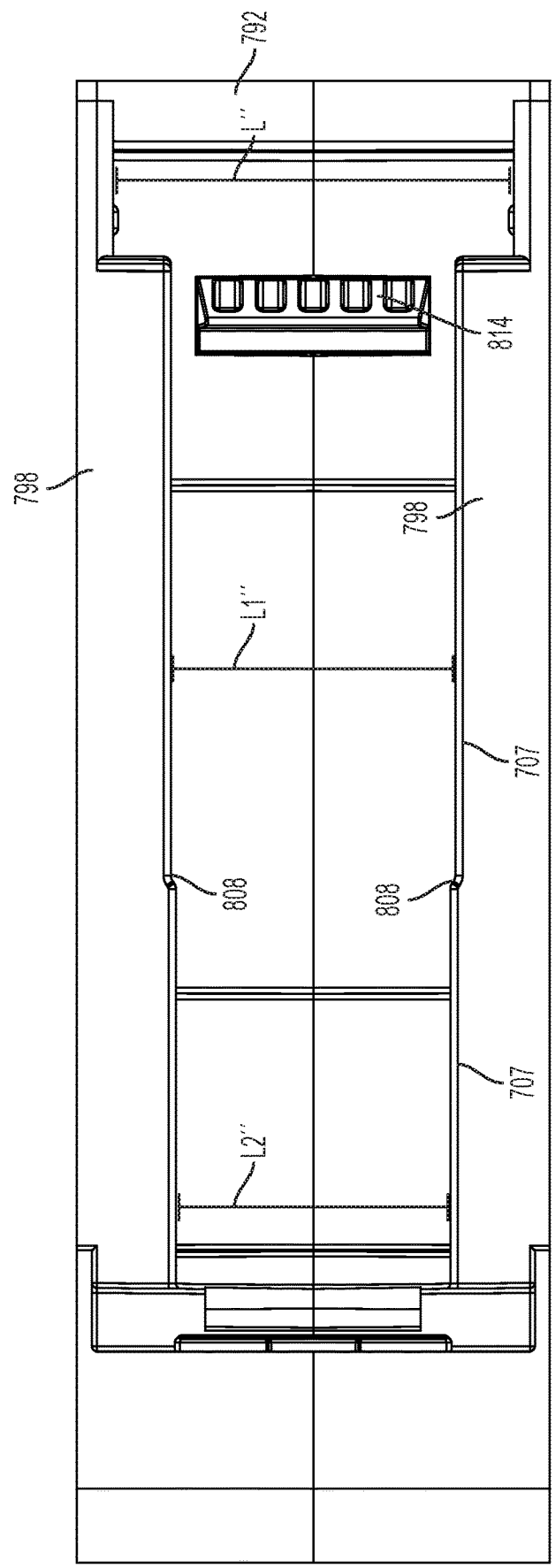
FIG. 31 is a top view of the battery-receiving portion shown in FIG. 30.

FIG. 29 illustrates an alternative construction of a slide-actuated latching mechanism 566. The latching mechanism 566 may be used with one of the battery-receiving portions 50, 250, 550 (e.g., with or in place of latching mechanisms 66, 266).

The illustrated latching mechanism 566 includes a laterally-displaceable actuator or button 610 operatively engaging a latch member 614. The latch member 614 is pivotally disposed in a cavity 618 (e.g., defined in the lower surface 574) and is biased by a biasing member (e.g., a torsion spring 622, a coil spring, etc.) to protrude through the lower surface 574 and into the cavity 570.

The latch member 614 has an inclined surface 626 (e.g., angled about 30 degrees to about 60 degrees relative to the lower surface 674) facing toward the open end 586 and a generally vertically-extending surface 630 (e.g., about −10 degrees to about 10 degrees relative to a vertical axis) facing toward the end wall 582.

The latch member 614 is coupled to the spring 622 and includes an end 632 coupled to the button 610 (e.g., via a cam surface). The button 610 is engaged with the latch member 614 such that actuation (e.g., pressing the button to effect lateral displace to the left in FIG. 29 to reach the position illustrated in FIG. 29) of the button 610 causes the latch member 614 to pivot against the bias of the spring 622 to withdraw the latch member 614 from the cavity 570.

The illustrated latching mechanism 566 also includes a switch 634 (e.g., a micro-switch 634) facilitating electrical coupling/decoupling of the battery pack 554 during actuation of the button 610 to withdraw the latch member 614 from the cavity 570. In other embodiments, however, the switch 634 may be omitted. As described above in greater detail, the switch 634 may act to electrically decouple the battery pack 554 from the battery-receiving portion 550 and the device prior to removal of the battery pack 554 from the battery-receiving portion 550.

As the latch member 614 is moved from the latched position (not shown but similar to the position shown in FIG. 12A) to an intermediate position (not shown but similar to the position shown in FIG. 12B), the switch 634 is activated to inhibit the transfer of electrical power between the battery pack 554 and the device before the battery pack 554 is released by the latching member 614 and removable from the battery-receiving portion 550 and before the contacts 654, 594 disengage. Activation of the switch 634 to stop power transfer between the battery pack 554 and the device may, for example, prevent arcing between the contacts 654, 594 as the battery pack 554 is removed.

Further movement of the latching member 614 to an unlatched position (FIG. 29) removes the latching member 614 from the slot 682a, 682b, and the battery pack 554 is permitted to move along the battery insertion axis 694 off of the battery-receiving portion 550. The switch 634 is maintained in the on position to continue inhibiting the transfer of power between the battery pack 554 and the device.

It should be understood that, in other constructions (not shown), features described as being on one of the battery-receiving portion 50, 250, 550 and the battery pack 54, 254, 554 (e.g., the stepped grooves 58, 558, the "drop and slide" arrangement, the latching mechanism 66, 566, the ejector 138, etc.) may be provided on the other of the battery-receiving portion 50 and the battery pack 54.

Figure 38:
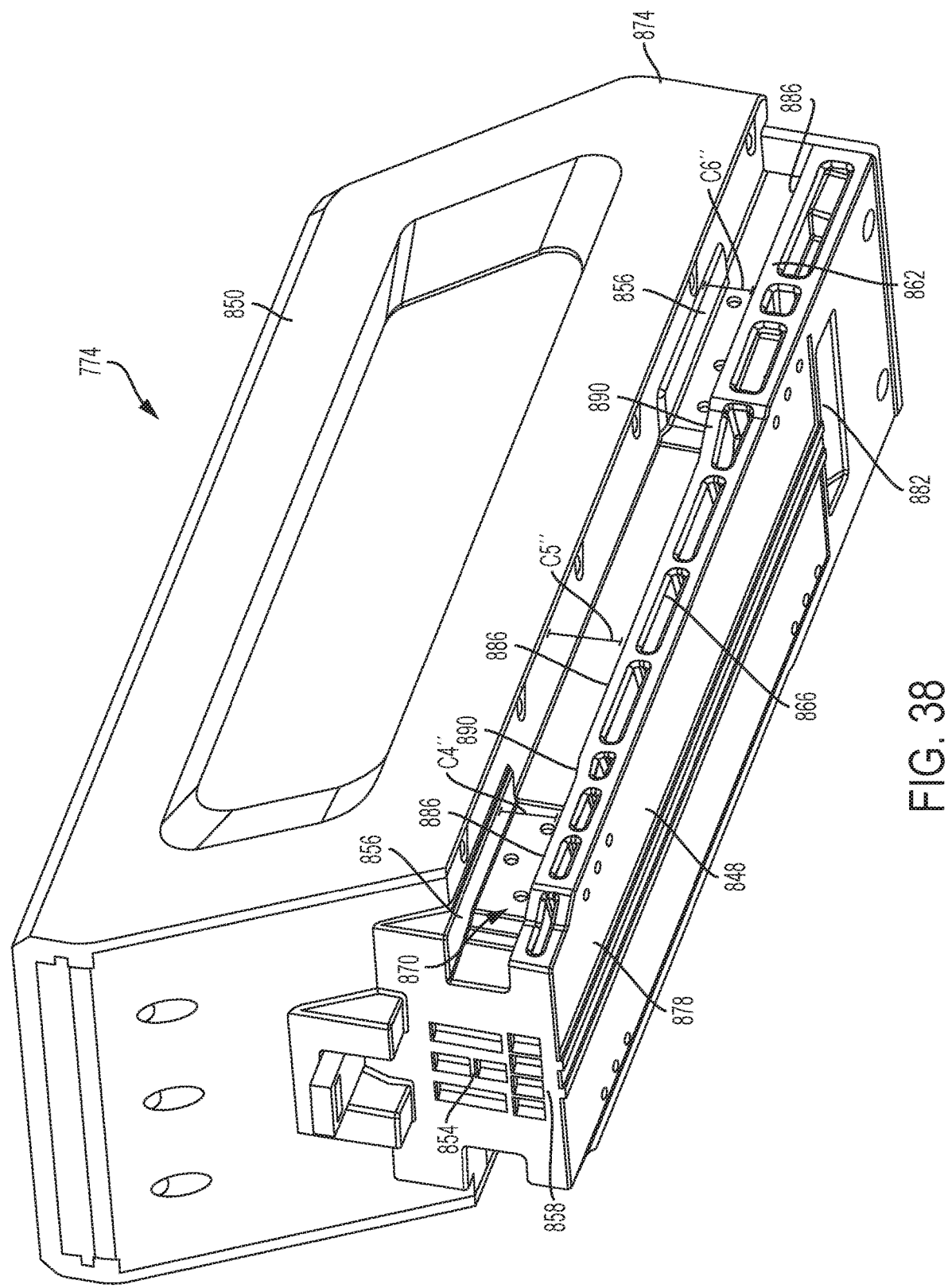
FIG. 38 is a perspective view of a battery pack for use with the battery-receiving portion.
Figure 39:
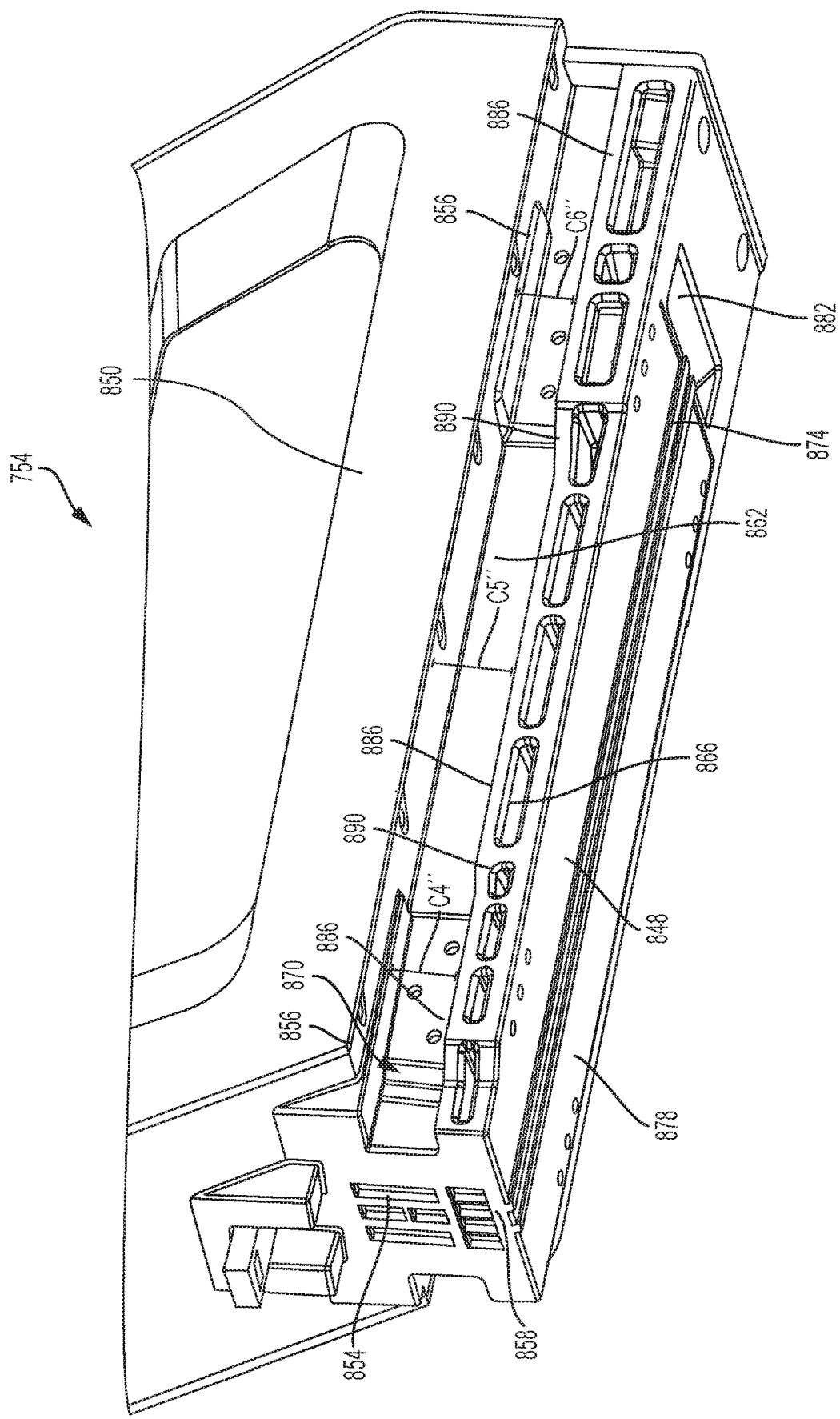
FIG. 39 is an enlarged perspective view of a portion of the battery pack shown in FIG. 38.
Figure 40:
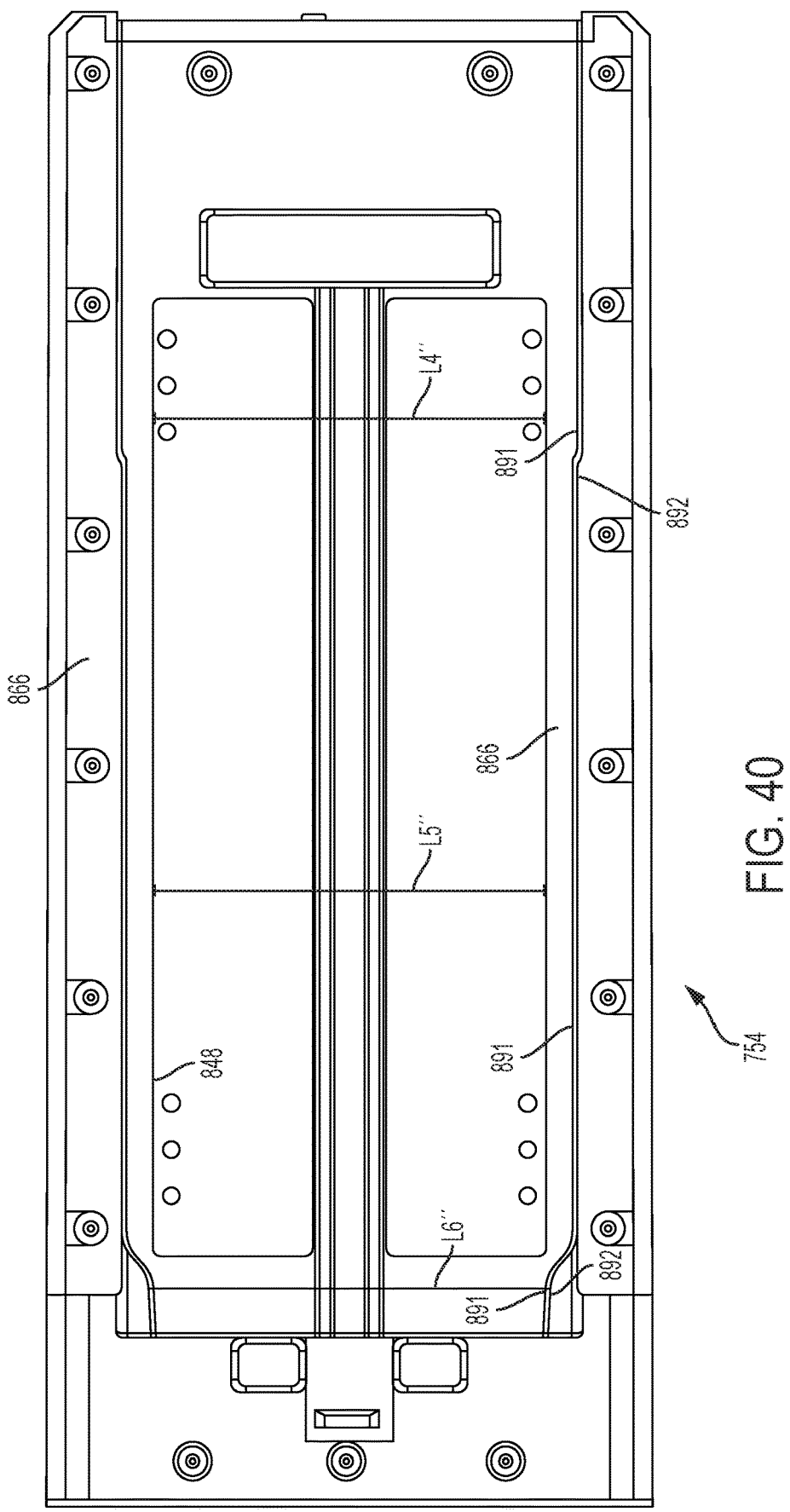
FIG. 40 is a top view of the battery pack shown in FIG. 38.

FIGS. 30-33 illustrate an alternate construction of a battery-receiving portion 750 of an electrical device configured to receive a corresponding battery pack 754 (FIGS. 38-40). The battery-receiving portion 750 and the corresponding battery pack 754 are similar to the battery-receiving portions 50, 250, 550 and the battery pack 54, 254, 554 shown in FIGS. 1-13B, 14-20C, and 21-29, respectively. Common elements have the same reference number plus "700" from the battery-receiving portion 50 and the battery pack 54, the same reference numeral plus "500" from the battery-receiving portion 250 and the battery pack 254, and the same reference numeral plus "200" from the battery-receiving portion 550 and the battery pack 554.

The following description will focus on aspects of the battery-receiving portion 750 and the battery pack 754 different than the battery-receiving portions 50, 250, 550 and the battery pack 54, 254, 554. It should be noted, however, that features of the battery-receiving portion 750 or the battery pack 754 may be incorporated or substituted into the battery-receiving portions 50, 250, 550 or the battery pack 54, 254, 554, or vice versa.

With reference to FIGS. 30-33, the battery-receiving portion 750 is substantially similar, in particular, to the battery-receiving portion 550 illustrated in FIGS. 21-29. However, the battery-receiving portion 750 further includes a dual-action latching mechanism 766. In other words, in order to operate the latching mechanism 766 to release the battery 754 from the battery-receiving portion 750, two separate actions are required.

As shown in FIGS. 30-33, the latching mechanism 766 includes a primary actuator or handle 810 that supports a secondary actuator 812. The secondary actuator 812 includes a user interface 816 on a first end and a housing engaging portion 820 on an opposite end.

The secondary actuator 812 is pivotable between a first position, in which the housing engaging portion 820 engages a portion of the lower surface 774, and a second position, in which the housing engaging portion 820 extends into a groove or aperture 776 in the portion of the lower surface 774. The secondary actuator 812 is biased toward the first position by a biasing member 824 (e.g., a torsion spring, etc.) to maintain engagement with the lower surface 774.

In the first position, the engagement of the engaging portion 820 and the lower surface 774 inhibits or prevents movement (e.g., pivoting) of the actuator 810 to prevent unlatching of the battery pack 754. A user can apply a force to the user interface 816 to pivot the secondary actuator (e.g., in a counterclockwise direction in FIG. 33) against the bias of the biasing member 824 into the second position. In the second position, the engaging portion 820 no longer engages the lower surface 774 and is instead aligned with the groove 776 thereby providing clearance for the actuator 810 to pivot and unlatch the battery pack 754, as described in greater detail below.

Figure 32:
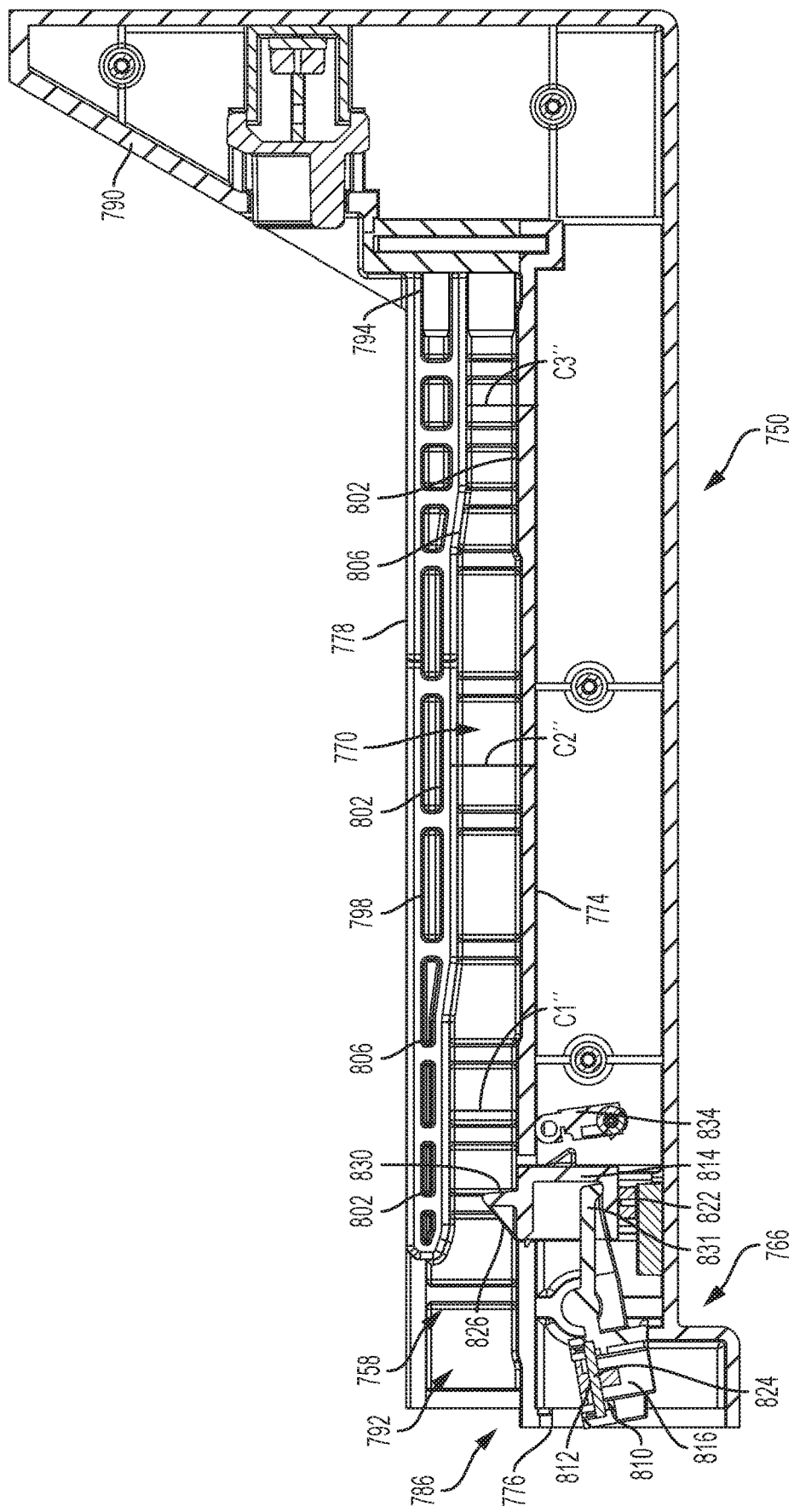
FIG. 32 is a cross-sectional side view of the battery-receiving portion shown in FIG. 30.

The actuator 810 operatively engages the latch member 814. The latch member 814 is slidably disposed in a bore 818 defined in the lower surface 774 and is biased by two biasing members (e.g., springs 822, such as a coil spring, a torsion spring, etc.) to protrude through the lower surface 774 and into the cavity 770. As seen in FIG. 32, the biasing springs 822 are located beneath opposing lateral sides of the latch member 814. The latch member 814 has an inclined surface 826 (e.g., angled about 30 degrees to about 60 degrees relative to the lower surface 774) facing toward the open end 786 and a generally vertically-extending surface 830 (e.g., about −10 degrees to about 10 degrees relative to a vertical axis) facing toward the end wall 782.

The latch member 814 is coupled to the springs 822. In some embodiments (not shown), one spring 822 may be coupled to the latch member 814 instead of two. In other embodiments (not shown), three or more springs 822 may be coupled to the latch member 814. In such multi-spring arrangements, each spring 822 may be smaller/shorter, leading to a shorter overall height of the latch member 814 and the spring 822 without a reduction in biasing force.

Figure 33:
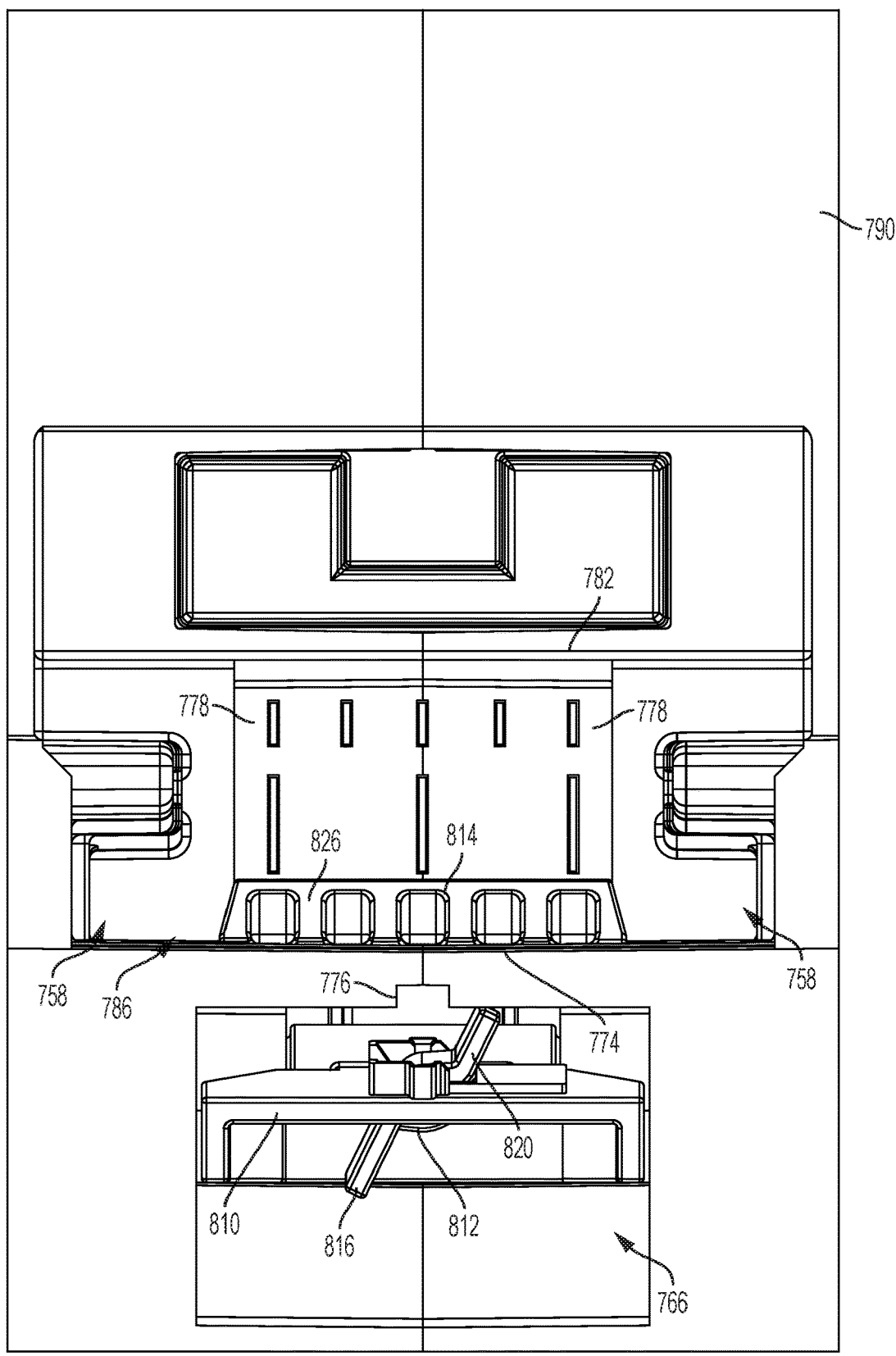
FIG. 33 is a front view of the battery receiving portion shown in FIG. 30.
Figure 34:
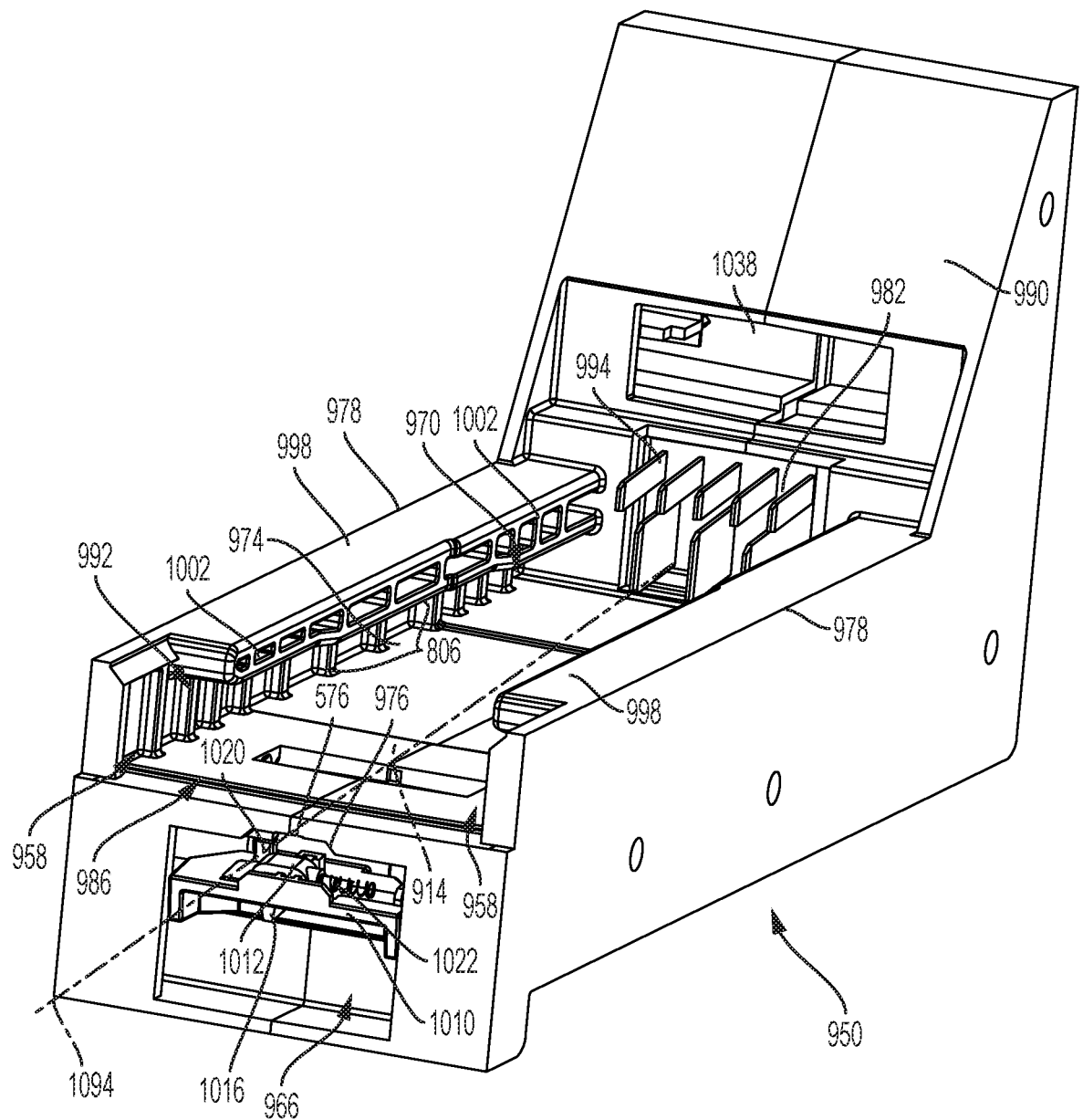
FIG. 34 is a perspective view of a battery-receiving portion of an electrical device according to a fifth embodiment.
Figure 35:
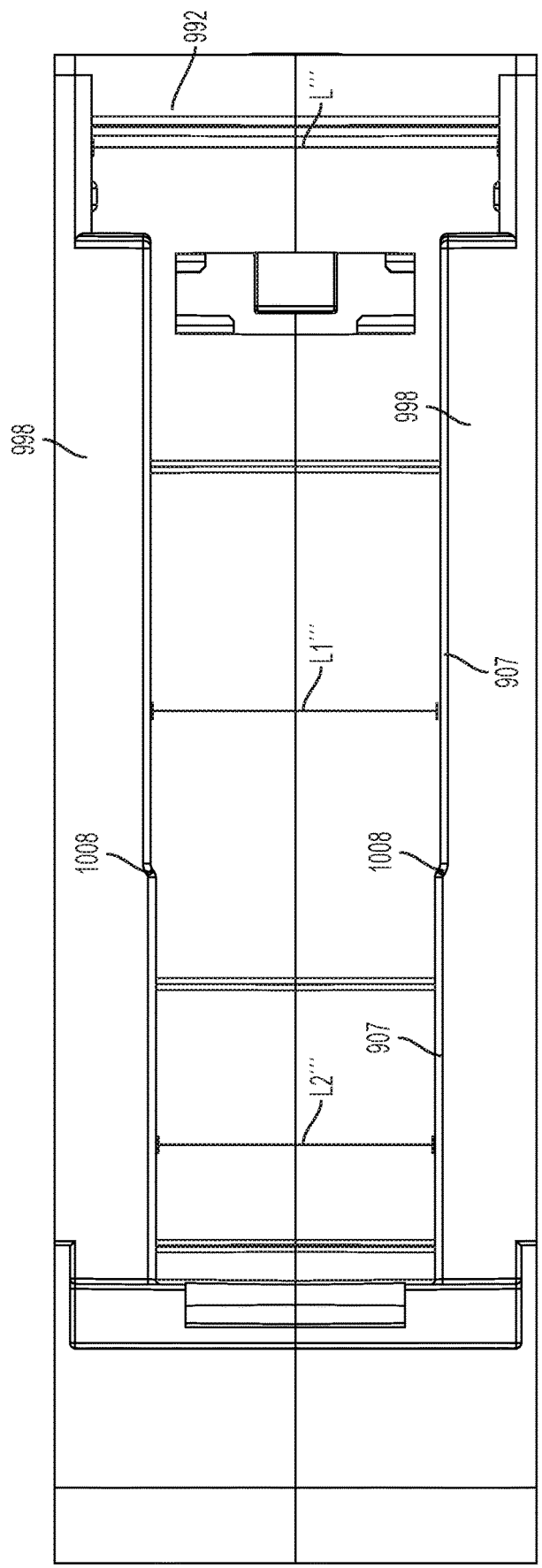
FIG. 35 is a top view of the battery-receiving portion shown in FIG. 34.

The handle 810 is engaged with the latch member 814 via a cam surface 831 such that actuation (e.g., clockwise pivoting/rotation of the handle 810 with respect to the position shown in FIG. 33) of the handle 810 causes the latch member 814 to translate downwardly against the bias of the springs 822 to withdraw the latch member 814 from the cavity 770.

The latching mechanism 766 also includes a switch 834 (e.g., a micro-switch 834) facilitating electrical coupling/decoupling of the battery pack 754 during actuation of the handle 810 to withdraw the latch member 814 from the cavity 70. In other embodiments (not shown), the switch 834 may be omitted. The switch 834 may act to electrically decouple the battery pack 754 from the battery-receiving portion 750 and the device prior to removal of the battery pack 754 from the battery-receiving portion 750. The operation of a similar switch 134 was described in greater detail with respect to FIGS. 12A-12C.

As seen in the foregoing description, the dual-action latching mechanism 766 requires a user to perform two actions in order to unlatch the battery pack 754. More specifically, the user must operate the secondary actuator 812 into the second position before the actuator 810 may be operated to remove the latch member 814 from the cavity 770, to thereby unlatch the battery pack 754. Such a mechanism can, for example, prevent or reduce the likelihood of unintended unlatching of the battery pack 754 from the battery-receiving portion 750.

It should be understood that, in other constructions (not shown), features described as being on one of the battery-receiving portion 50, 250, 550, 750 and the battery pack 54, 254, 554, 754 (e.g., the stepped grooves 58, 558, the "drop and slide" arrangement, the latching mechanism 66, 566, the ejector 138, etc.) may be provided on the other of the battery-receiving portion 50, 250, 550, 750 and the battery pack 54, 254, 554, 754.

FIGS. 34-37 illustrate an alternate construction of a battery-receiving portion 950 of an electrical device configured to receive a corresponding battery pack 754 (FIGS. 38-40). The battery-receiving portion 950 is similar to the battery-receiving portions 50, 250, 550, 750 shown in FIGS. 1-13B, 14-20C, 21-29, and 30-33, respectively. Common elements have the same reference number plus "900" from the battery-receiving portion 50, the same reference numeral plus "700" from the battery-receiving portion 250, the same reference numeral plus "400" from the battery-receiving portion 550, and the same reference numeral plus "200" from the battery-receiving portion 750.

The following description will focus on aspects of the battery-receiving portion 950 different than the battery-receiving portions 50, 250, 550, 750. It should be noted, however, that features of the battery-receiving portion 950 may be incorporated or substituted into the battery-receiving portions 50, 250, 550, 750, or vice versa.

With reference to FIGS. 34-37, the battery-receiving portion 950 is substantially similar, in particular, to the battery-receiving portion 550, 750 illustrated in FIGS. 21-29 and 30-33, respectively. However, the battery-receiving portion 950 further includes an alternate embodiment of a dual-action latching mechanism 966. To operate the dual-action latching mechanism 966 to release the battery 754 from the battery-receiving portion 950, two separate actions are required.

As shown in FIGS. 34-37, the latching mechanism 966 includes a primary actuator or handle 1010 that supports a linearly displaceable secondary actuator 1012. The secondary actuator 1012 includes a user interface 1016 and a housing engaging portion 1020. The secondary actuator 1012 is linearly displaceable (e.g., slidable) between a first position, in which the housing engaging portion 1020 engages a portion of the lower surface 974, and a second position, in which the housing engaging portion 1020 extends into a groove or aperture 976 in the portion of the lower surface 974. The secondary actuator 1012 is biased into the first position by a biasing member 1024 (e.g., a coil spring, etc.) to maintain engagement with the lower surface 974.

In the first position, the engagement of the engaging portion 1020 and the lower surface 974 inhibits or prevents movement (e.g., pivoting) of the actuator 1010 to prevent unlatching of the battery pack 754. A user can apply a force to the user interface 1016 to displace the secondary actuator against the bias of the biasing member 1024 into the second position. In the second position, the engaging portion 1020 no longer engages the lower surface 974 and is instead aligned with the groove 976 thereby providing clearance for the actuator 1010 to pivot and unlatch the battery pack 754, as described in greater detail below.

The pivotable actuator 1010 operatively engages the latch member (not illustrated in this embodiment but similar to the latch member 814). The latch member is slidably disposed in a bore 1018 defined in the lower surface 974 and is biased by two biasing members (e.g., springs, such as a coil spring, a torsion spring, etc.) to protrude through the lower surface 974 and into the cavity 970. The biasing springs 1022 are located beneath opposing lateral sides of the latch member. The latch member has an inclined surface 1026 (e.g., angled about 30 degrees to about 60 degrees relative to the lower surface 974) facing toward the open end 986 and a generally vertically-extending surface 1030 (e.g., about −10 degrees to about 10 degrees relative to a vertical axis) facing toward the end wall 982, similar to the latch members 114, 614, 814.

The latch member is coupled to the springs 1022. In some embodiments (not shown), one spring 1022 may be coupled to the latch member instead of two. In other embodiments (not shown), three or more springs 1022 may be coupled to the latch member. In such multi-spring arrangements, each spring 1022 may be smaller/shorter, leading to a shorter overall height of the latch member and the spring 1022 without a reduction in biasing force.

Figure 36:
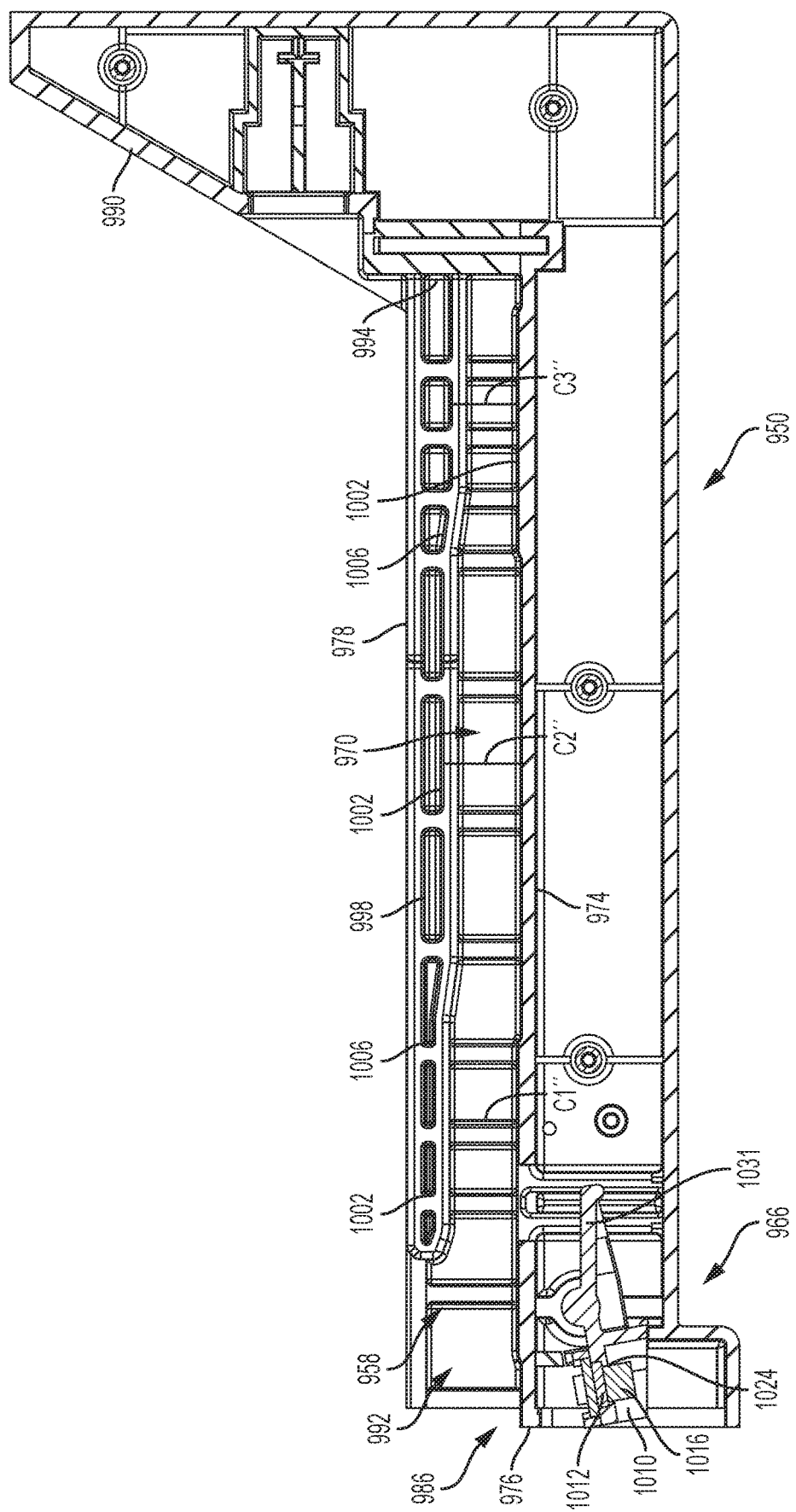
FIG. 36 is a cross-sectional side view of the battery-receiving portion shown in FIG. 34.
Figure 37:
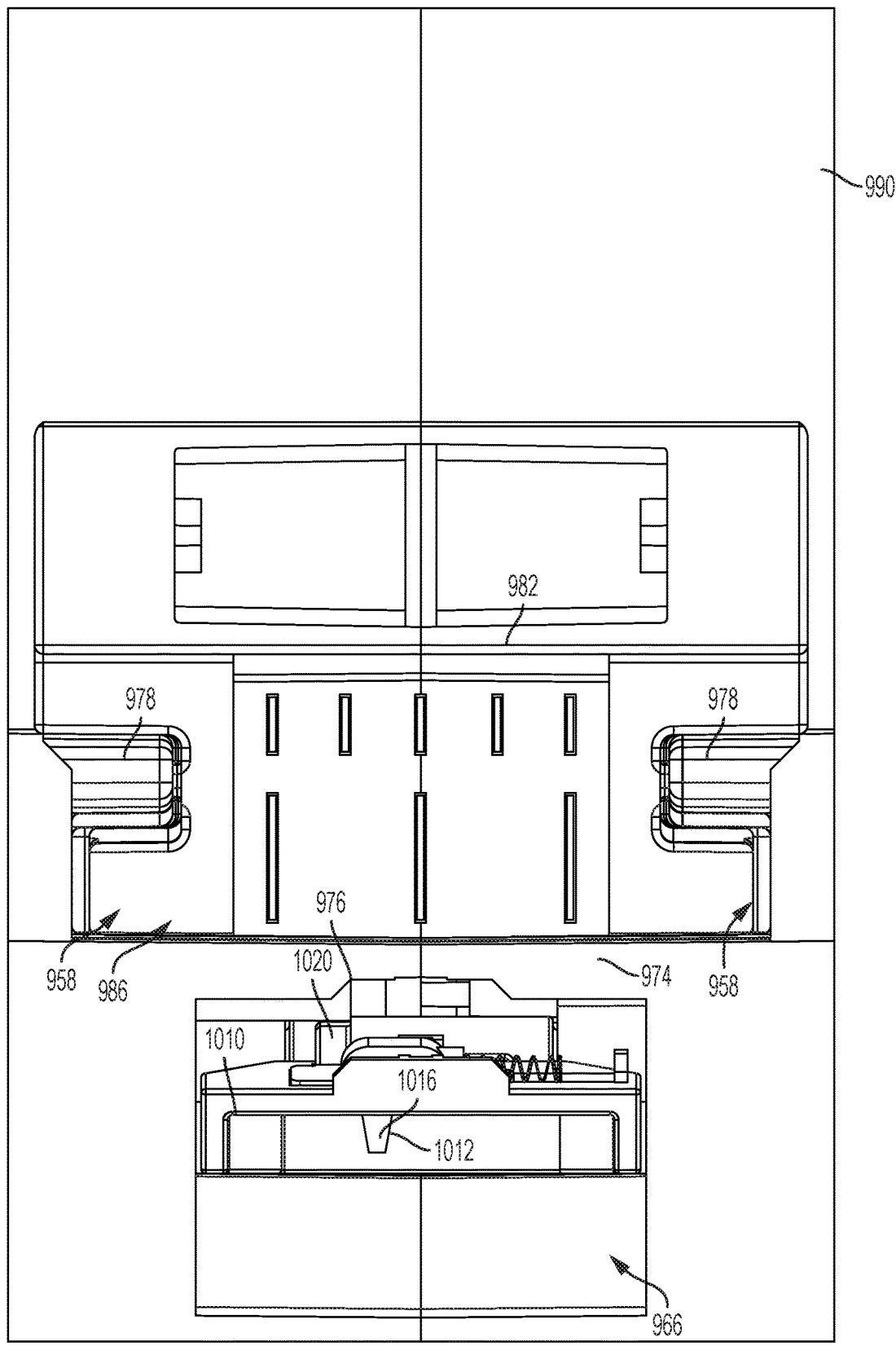
FIG. 37 is a front view of the battery receiving portion shown in FIG. 34.

The handle 1010 is engaged with the latch member via a cam surface 1030 such that actuation (e.g., clockwise pivoting/rotation of the handle 1010 with respect to the position shown in FIG. 36) of the handle 1010 causes the latch member to translate downward against the bias of the springs 1022 to withdraw the latch member from the cavity 970.

The latching mechanism 966 also includes a switch (e.g., a micro-switch; not shown but similar to the switch 834) facilitating electrical coupling/decoupling of the battery pack 754 during actuation of the handle 1010 to withdraw the latch member 1014 from the cavity 970. In other embodiments (not shown), the switch may be omitted. The switch may act to electrically decouple the battery pack 754 from the battery-receiving portion 950 and the device prior to removal of the battery pack 754 from the battery-receiving portion 950. The operation of a similar switch 134 was described in greater detail with respect to FIGS. 12A-12C.

As seen in the foregoing description, the dual-action latching mechanism 966 requires a user to perform two actions in order to unlatch the battery pack 754. More specifically, the user must operate the secondary actuator 1012 into the second position before the actuator 1010 may be operated to remove the latch member from the cavity 970, to thereby unlatch the battery pack 754. Such a mechanism can, for example, prevent or reduce the likelihood of unintended unlatching of the battery pack 754 from the battery-receiving portion 950.

It should be understood that, in other constructions (not shown), features described as being on one of the battery-receiving portion 50, 250, 550, 750, 950 and the battery pack 54, 254, 554, 754 (e.g., the stepped grooves 58, 558, the "drop and slide" arrangement, the latching mechanism 66, 566, the ejector 138, etc.) may be provided on the other of the battery-receiving portion 50, 250, 550, 750, 950 and the battery pack 54, 254, 554, 754.

FIGS. 38-40 illustrate the battery pack 754 for use with the battery-receiving portion 750, 950, described above. As will be described in greater detail below, the battery pack 754 includes mechanical features configured to engage corresponding features on the battery-receiving portion 750, 950 to couple and maintain engagement of the battery-receiving portion 750, 950 and the battery pack 754.

In the illustrated embodiment, the rails 866 include a number of (e.g., three) parallel horizontal portions 886 and the body of the housing 850 includes a number of (e.g., two) projections 852 defining pads or flat surfaces 856 facing the rails 866. The grooves 870 are defined by distinct vertical clearances $C4''$, $C5''$, $C6''$ . . . $Cn''$ of the grooves 870 measured between each horizontal portion 886 and the flat surfaces 856 (e.g., $C4''$ and $C6''$) or the body of the housing 850 (e.g., $C5''$). Each portion 886 is connected by an angled portion 890 extending obliquely away from the housing 850 when moving from the rear end 874 toward the front end 858. As illustrated, the rails 866/grooves 870 of the battery pack 754 form a mated engagement between the rails 798, 998/grooves 758, 958 of the battery-receiving portion 750, 950.

A horizontal clearance is measured from the lateral side 862 to a periphery of each rail 866. In the illustrated embodiment (see FIG. 40), a stepped configuration is provided laterally between the opposite rails 866. The rails 866 include a number of (e.g., three) generally parallel axially-extending portions 891 defining distinct lateral dimensions $L4''$, $L5''$, $L6''$ . . . $Ln''$ therebetween. Each portion is connected to an angled portion 892 extending obliquely toward the opposite rail 866 (e.g., when moving from right to left in FIG. 40) such that the opposite portions 891 define a successively smaller lateral dimension, thereby forming the "stepped" configuration between the rails 866. In the illustrated embodiment, the lateral dimension L4", L5", L6" between each portion 891 changes by a constant amount.

With reference to FIG. 40, the battery pack 754 includes a single slot 882. The slot 882 is sized and shaped to receive and engage latch member 814, 1014 to prevent removal of the battery pack 754 when the battery pack 754 is attached to the battery-receiving portion 750, 950.

Figure 41:
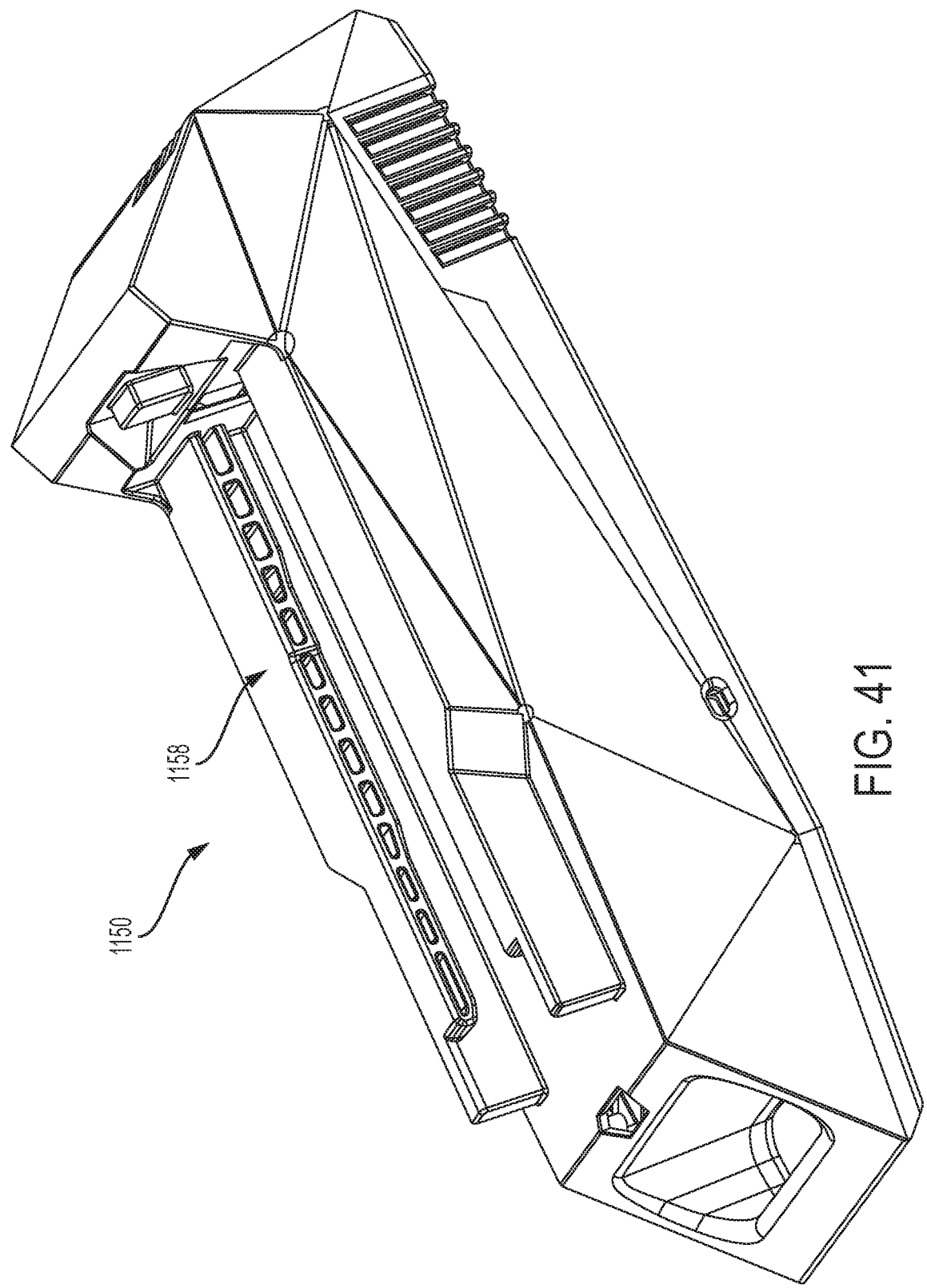
FIG. 41 is a perspective view of an electrical device, such as a charger, including a battery-receiving portion.
Figure 42:
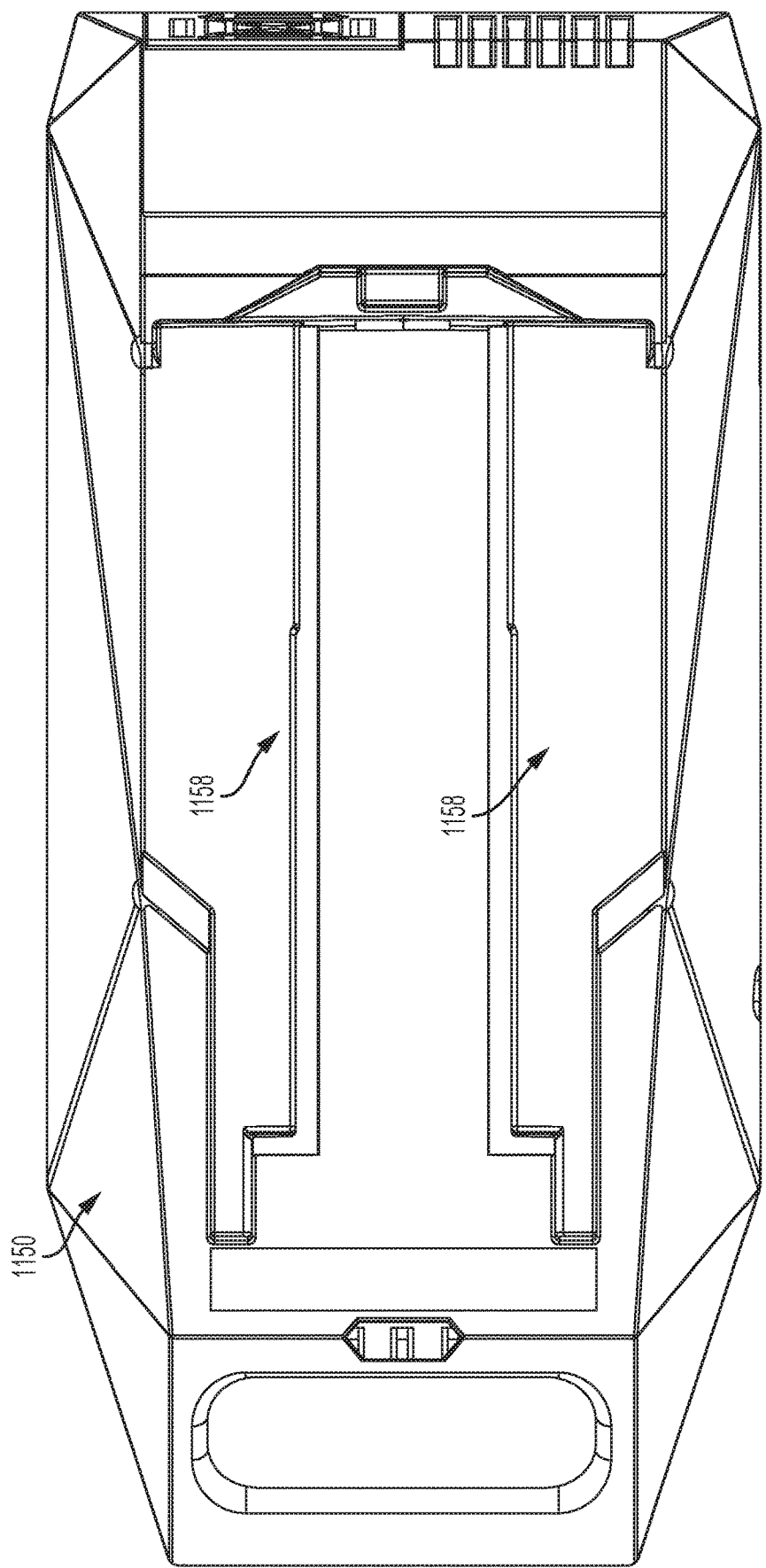
FIG. 42 is a top view of the device of FIG. 41.
Figure 43:
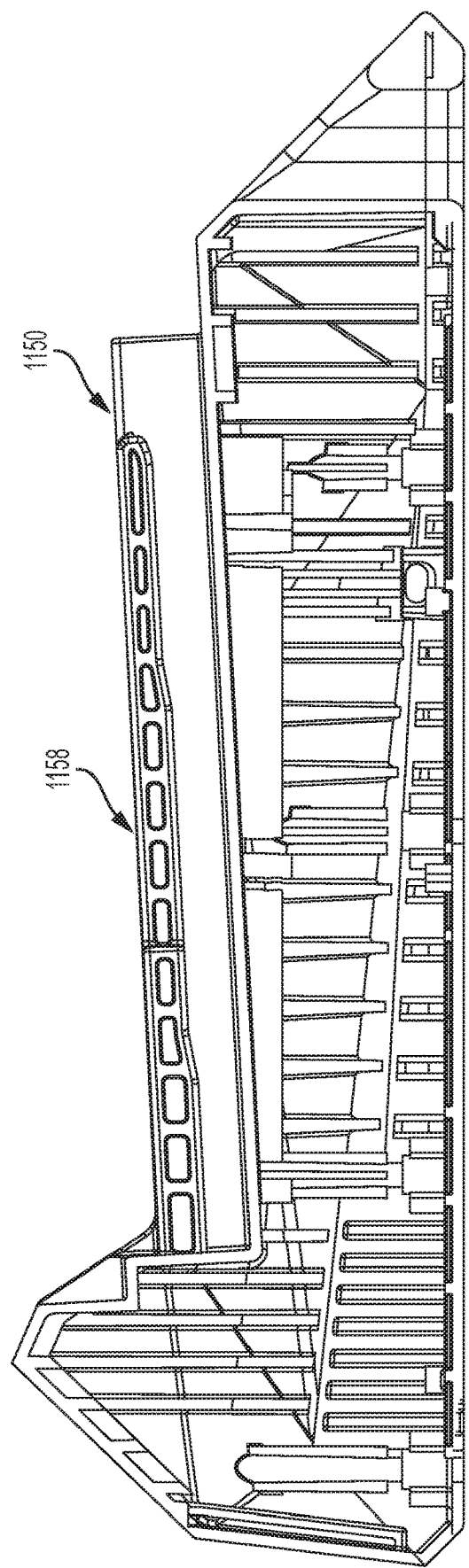
FIG. 43 is a partial cross-sectional side view of the device of FIG. 41.
Figure 44A:
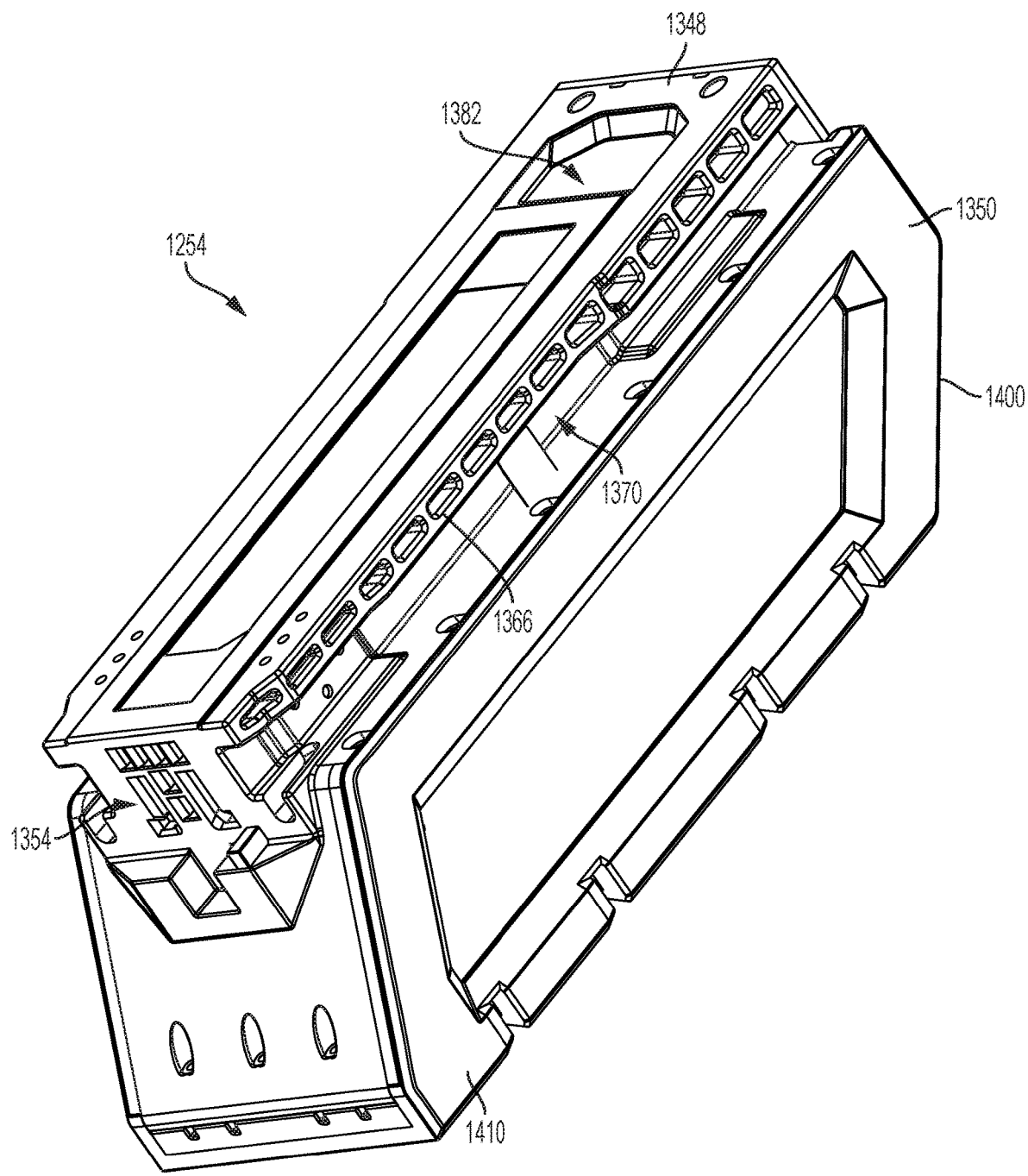
FIGS. 44A-44I are views of an alternative construction of a battery pack.
Figure 44B:
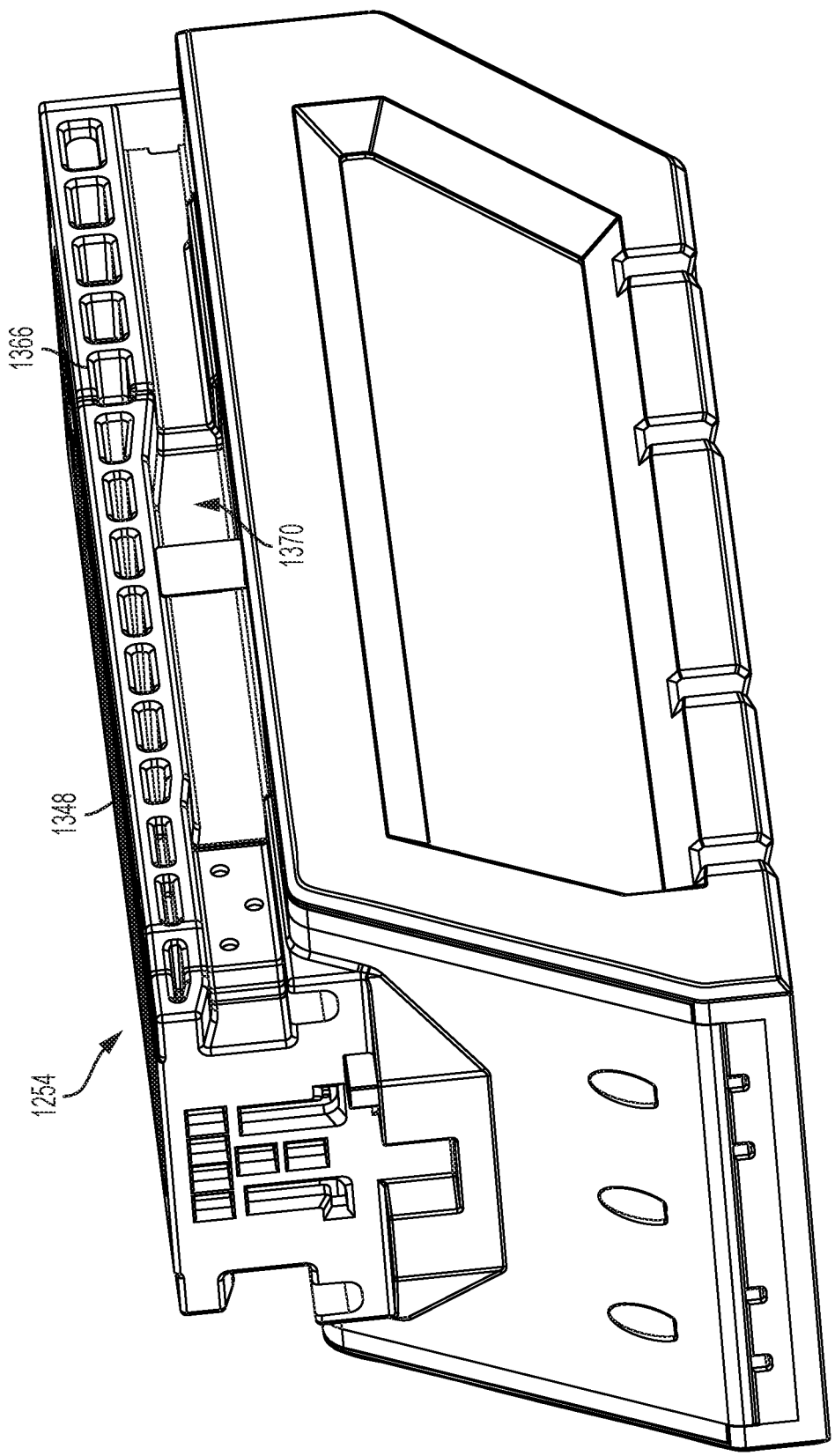
Figure 44C:
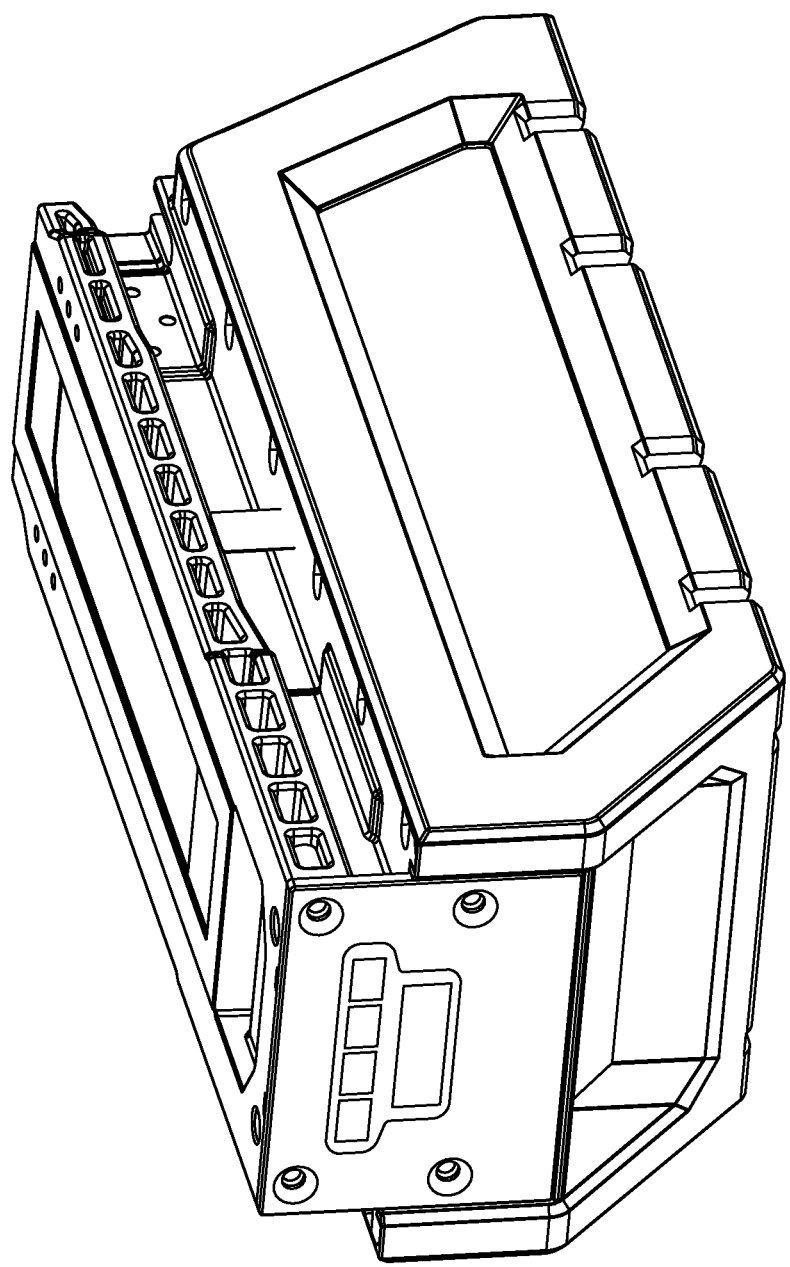
Figure 44D:
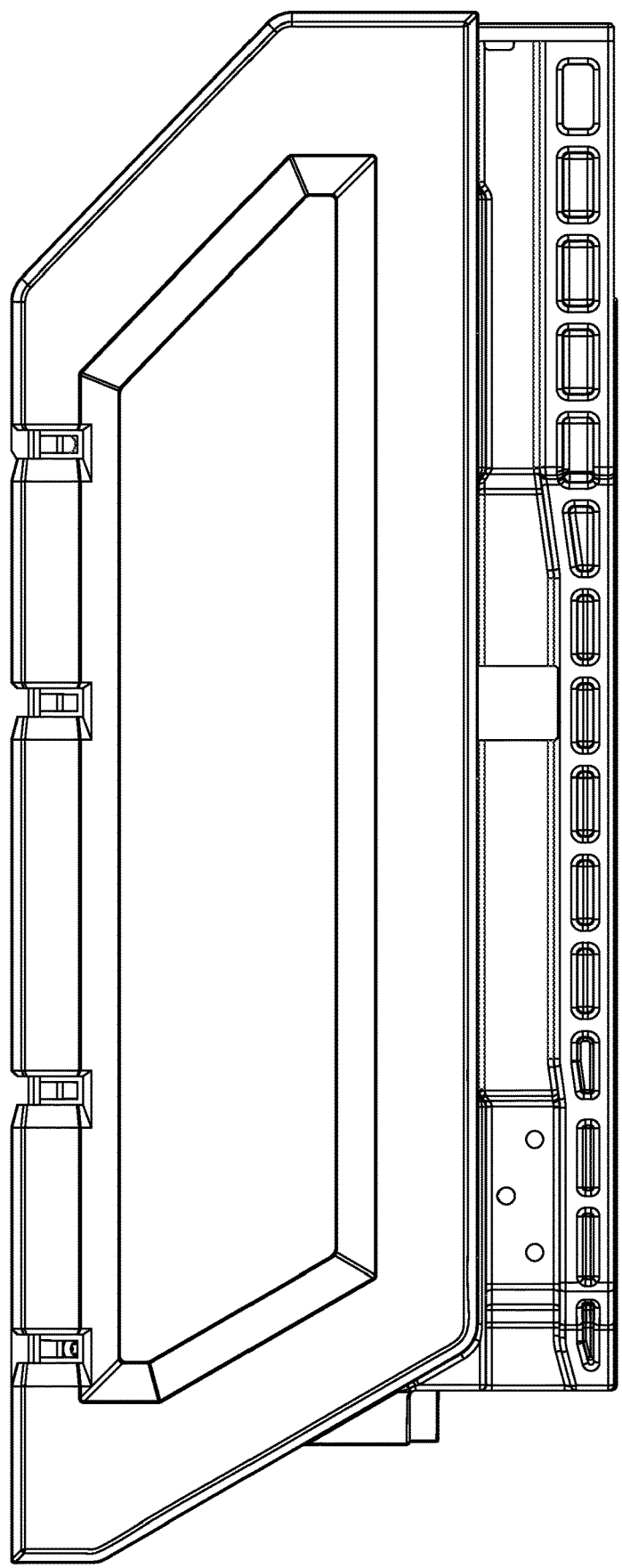
Figure 44E:
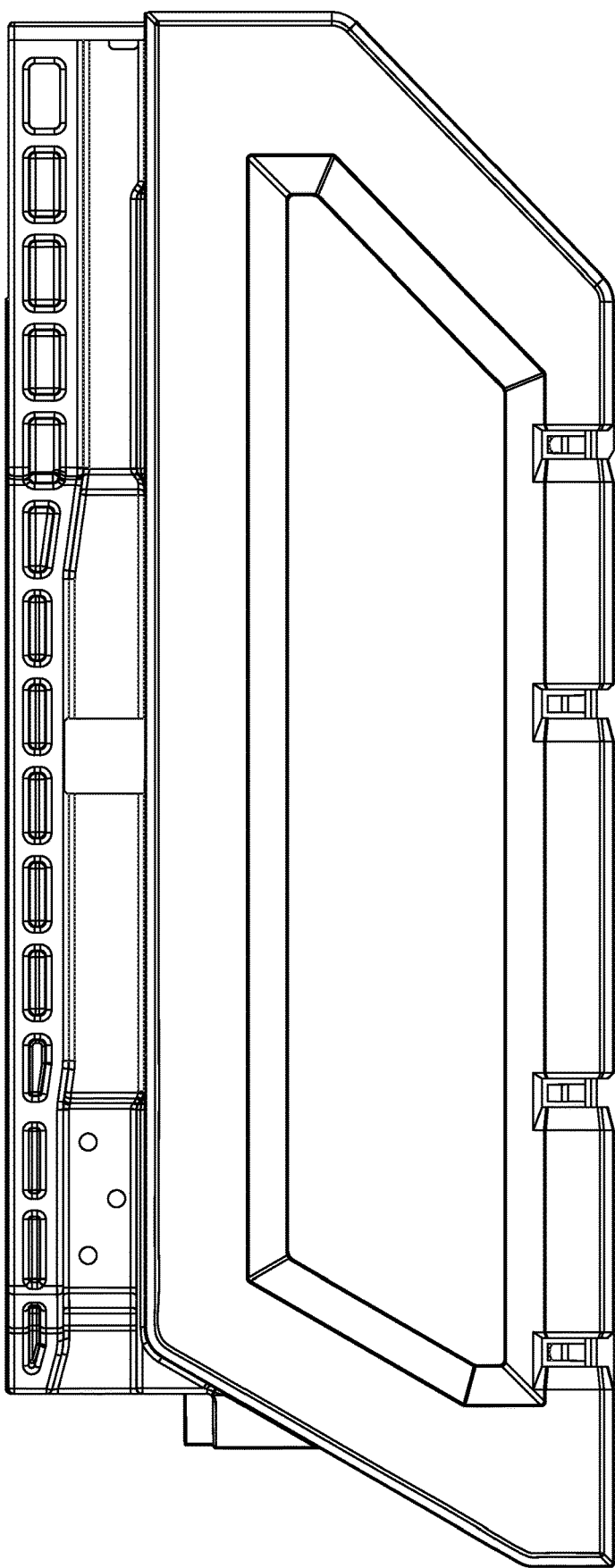
Figure 44F:
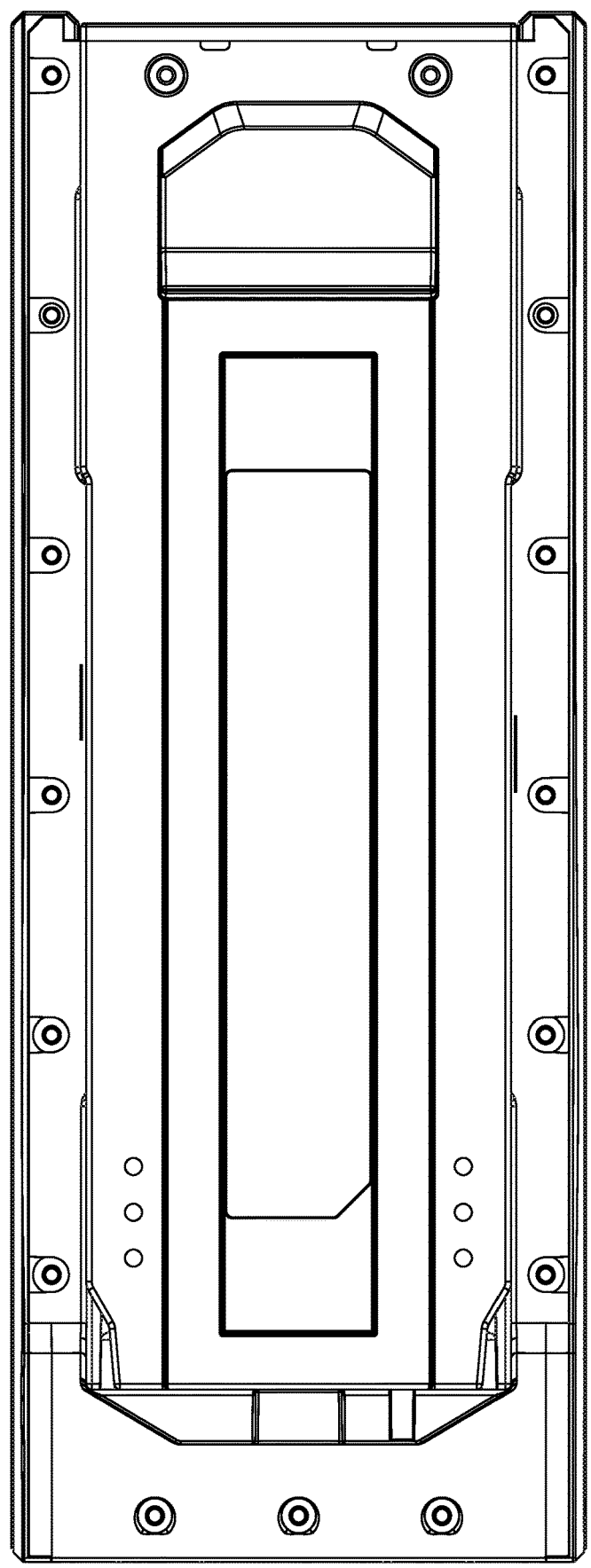
Figure 44G:
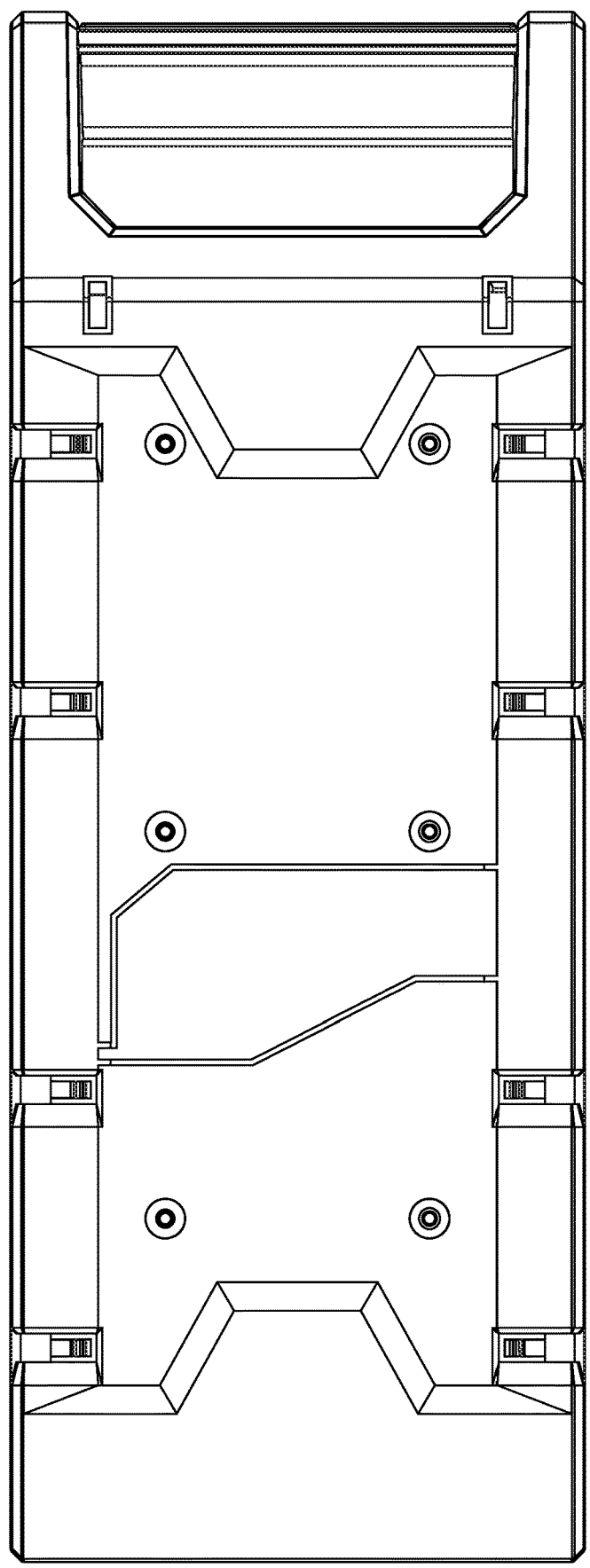
Figure 44H:
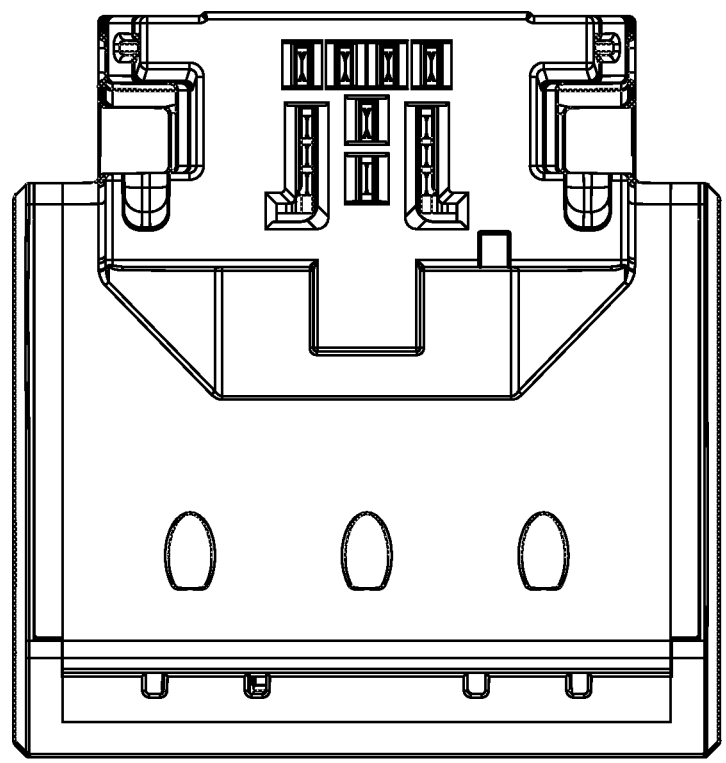
Figure 44I:
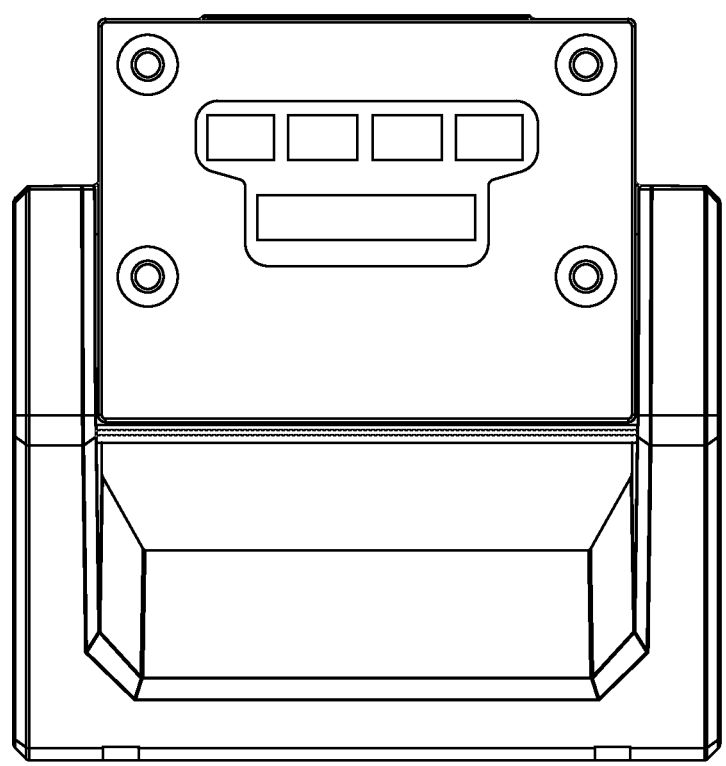

FIGS. 41-43 illustrate an electrical device, such as a battery charger, including a battery-receiving portion 1150. As illustrated, the battery-receiving portion 1150 has a "stepped" configuration provided by stepped rails 1158, similar to the stepped rails 58, 558, 758, 958, described above, and configured to receive a battery pack with a complementary configuration, such as the battery pack 54, 554, 754. When connected, the battery charger is operable to charge the battery pack 54, 554, 754.

In other constructions (not shown), the battery-receiving portion 1150 may have a different configuration, such as a "drop and slide" configuration similar to the battery-receiving portion 250, described above, and be configured to receive a battery pack having a complementary configuration, such as the battery pack 254.

FIGS. 44A-44I and FIGS. 49A-49H illustrate alternative constructions of the battery pack 1254 and 1554, respectively. The battery packs 1254 and 1554 are similar to the battery 54 described above. Common elements have the same reference number plus "1200" or "1500" respectively, from the battery pack 54. The battery packs 1254 or 1554 may include features of the battery packs 54, 254, 554, 754.

Each battery pack 54, 254, 554, 754, 1254, 1554 may include one or more cell strings, each having a number (e.g., 5, 10, 20, etc.) of battery cells connected in series to provide a desired discharge output (e.g., nominal voltage (e.g., 20 V, 40 V, 60 V, 80 V, 120 V) and current capacity). In the illustrated construction, the battery pack 1254 includes one string of 20 series connected cells (a "20S1P" configuration), while the battery pack 1554 includes two strings, each having 20 series connected cells (a "20S2P" configuration).

Due to the higher number of cells used in the battery pack (e.g., the battery pack 1254), the size/weight of the electrical device, the battery pack 1254 may be more vulnerable to damage. In some constructions (see, for example, FIGS. 45-48F), the battery-receiving portion 50 and/or the battery pack 1254 may be constructed with one or more of the below-described structures to improve impact resistance.

In one example, as shown in FIG. 45, the housing 1350 of the battery pack 1254 may be constructed with one or more angled surfaces 1400 to remove or soften corner shapes. As a result, rather than impacting a sharp or square corner, the battery pack 1254 may impact on a flat or blunt surface. The angled surface(s) 1400 may increase the strength of the battery pack 1254 during impact of loading.

Figure 46A:
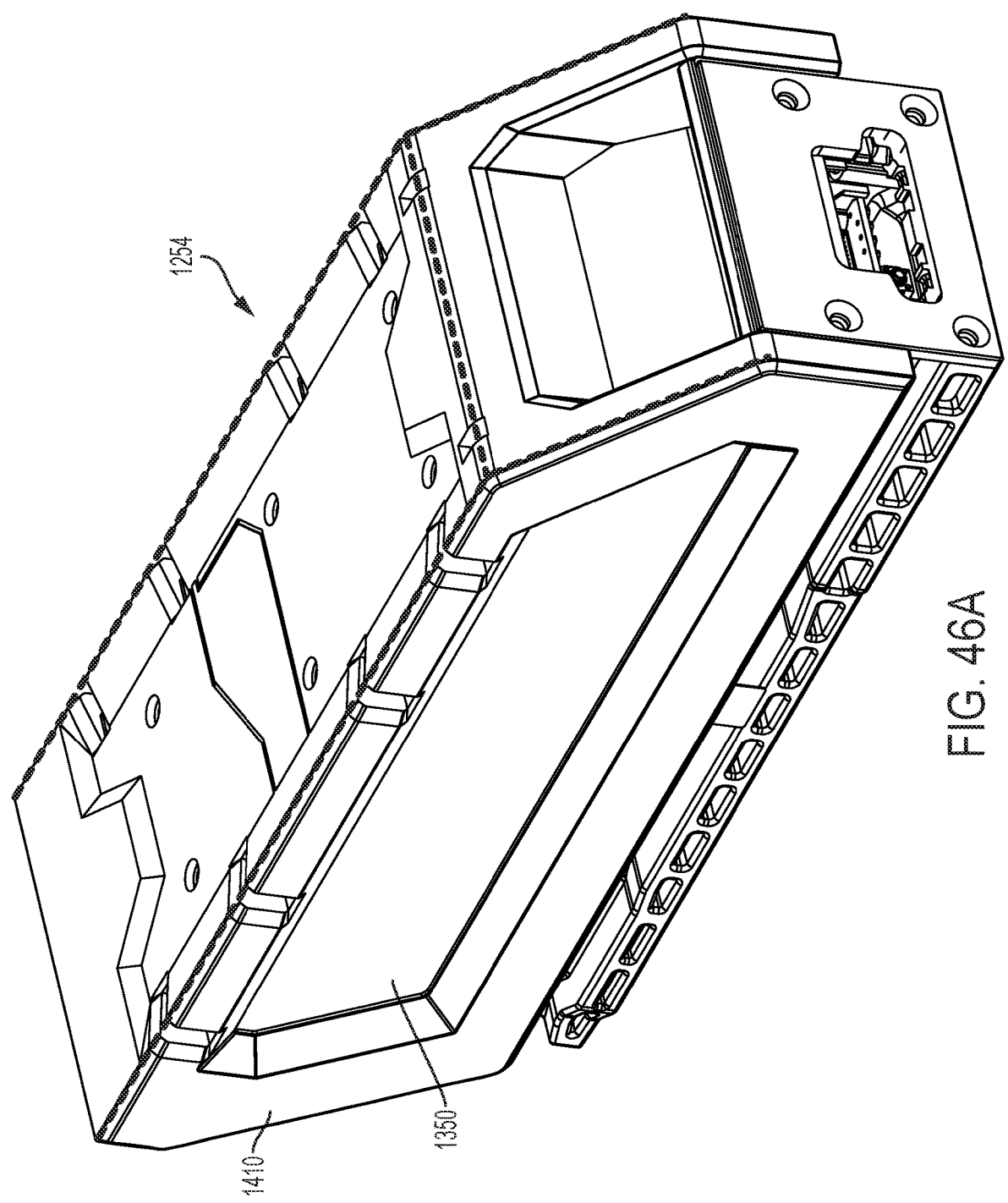
FIGS. 46A-46B are views of a battery pack illustrating overmold material.
Figure 46B:
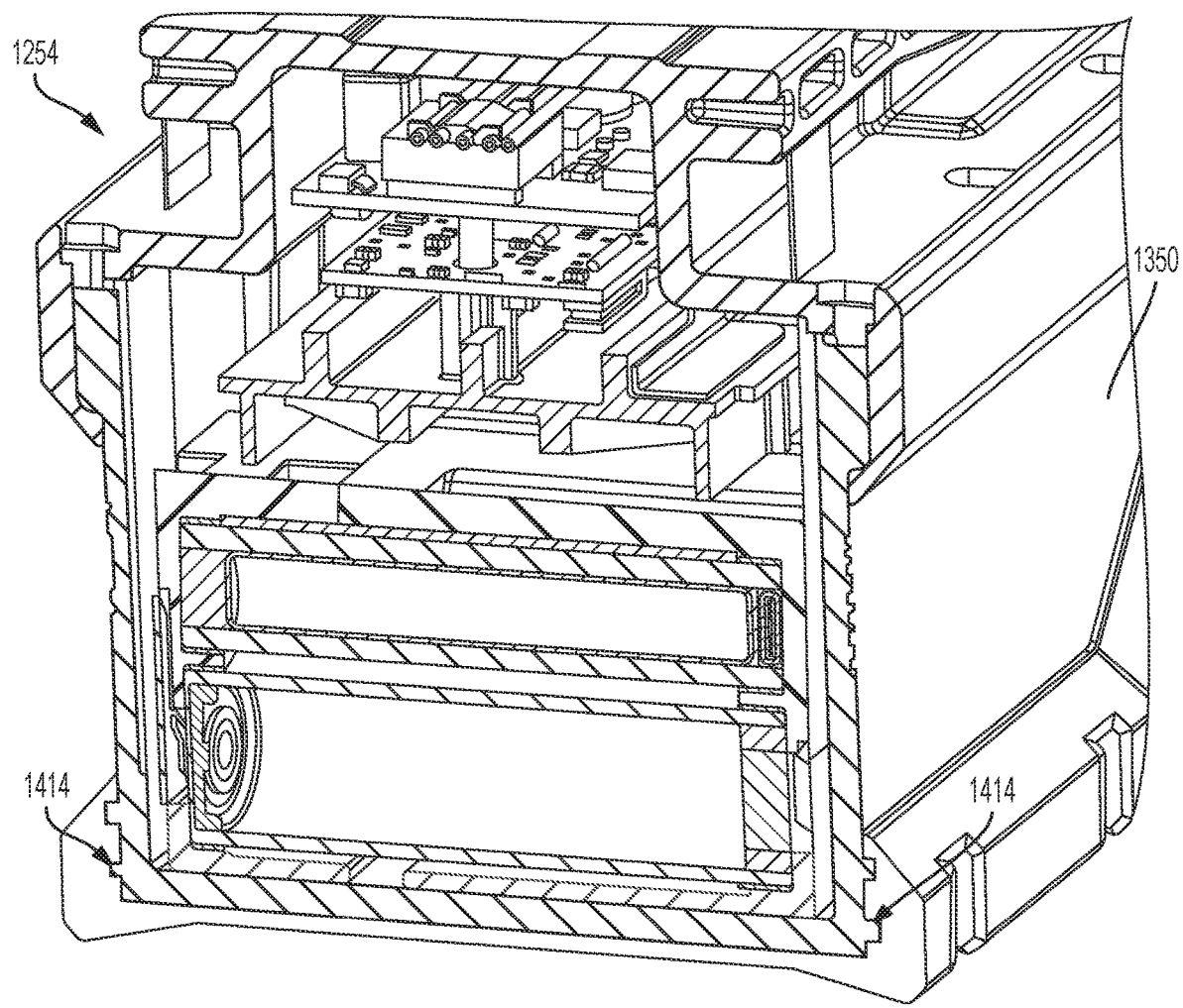

In another example (see FIGS. 46A-46B), the battery pack 1254 may include elastomeric overmold material 1410 covering surfaces most likely to be impacted (e.g., exposed edges 1414 of the housing 1350). The overmold material 1410 may include an elastomeric material such as a thermoplastic elastomer (TPE), polyurethane, rubber, reduce a load experienced during an impact or drop (e.g., a force up to about 250 Joules or more). As shown in FIG. 46B, in the illustrated construction, the overmold material 1410 is thickest (e.g., about 4 mm or more) along the exposed edges 1414 of the housing 1350 and tapers away from these locations (e.g., to a thickness of about 1 mm or less).

In yet another example (see FIGS. 47A-47B), material of the interface between a battery pack 1254 (e.g. the housing 1350, the protrusion 1348 and the rails 1366) and/or the associated electrical device (e.g., the battery-receiving portion 50, the side walls 78 and the rails 98) may be reinforced. In the illustrated construction, the material of the housing 1350 and of the battery-receiving portion 50 includes plastic, and the reinforcement 1420 is formed of metal. As illustrated, the reinforcement 1420 is molded with the material of the housing 1350 or of the battery-receiving portion 50. The reinforcement 1420 may contribute to improved impact resistance and drop strength, resistance to material fatigue from vibration, etc.

Figure 47A:
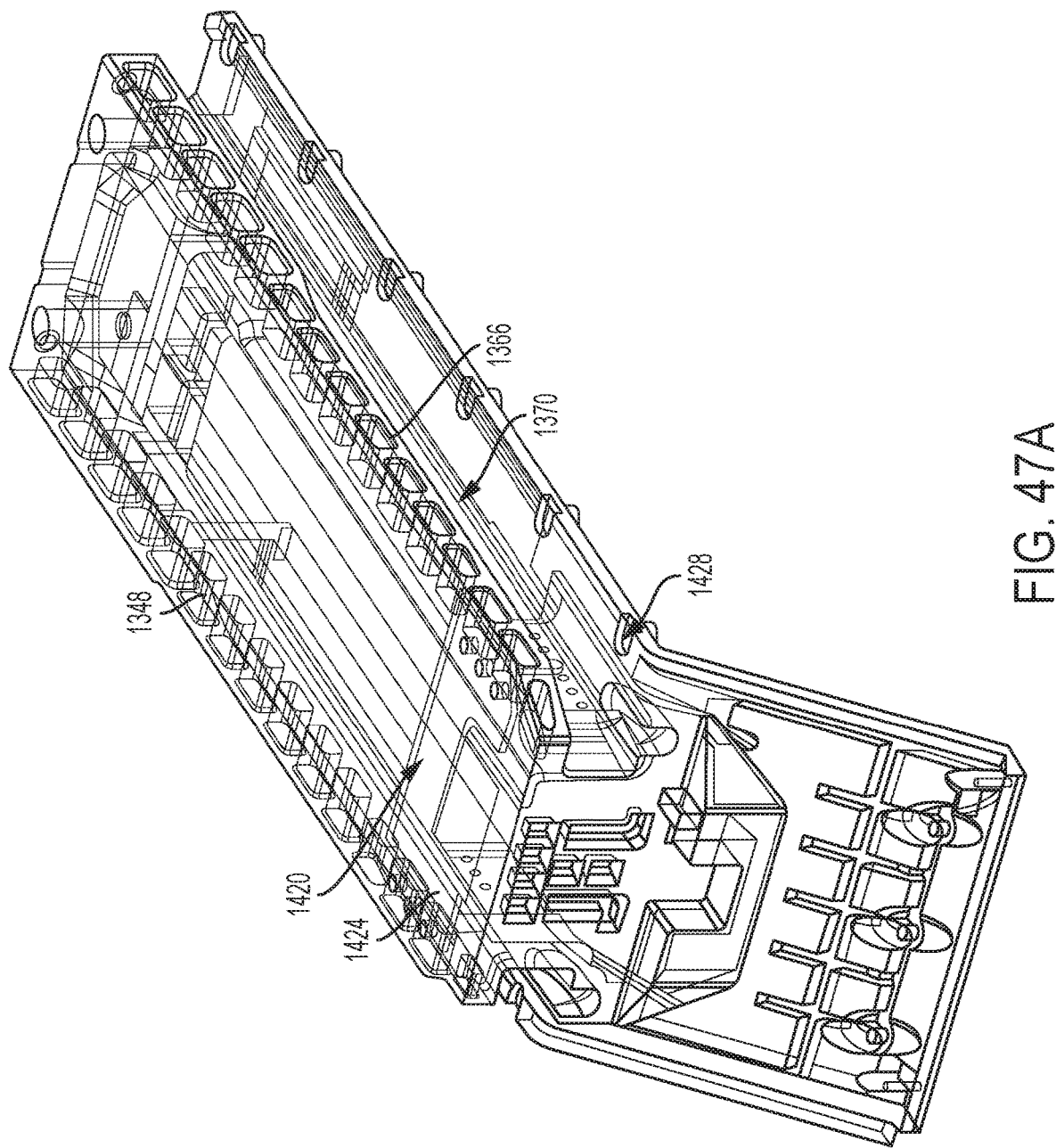
FIGS. 47A-47B are views of a support portion of the battery pack.
Figure 47B:
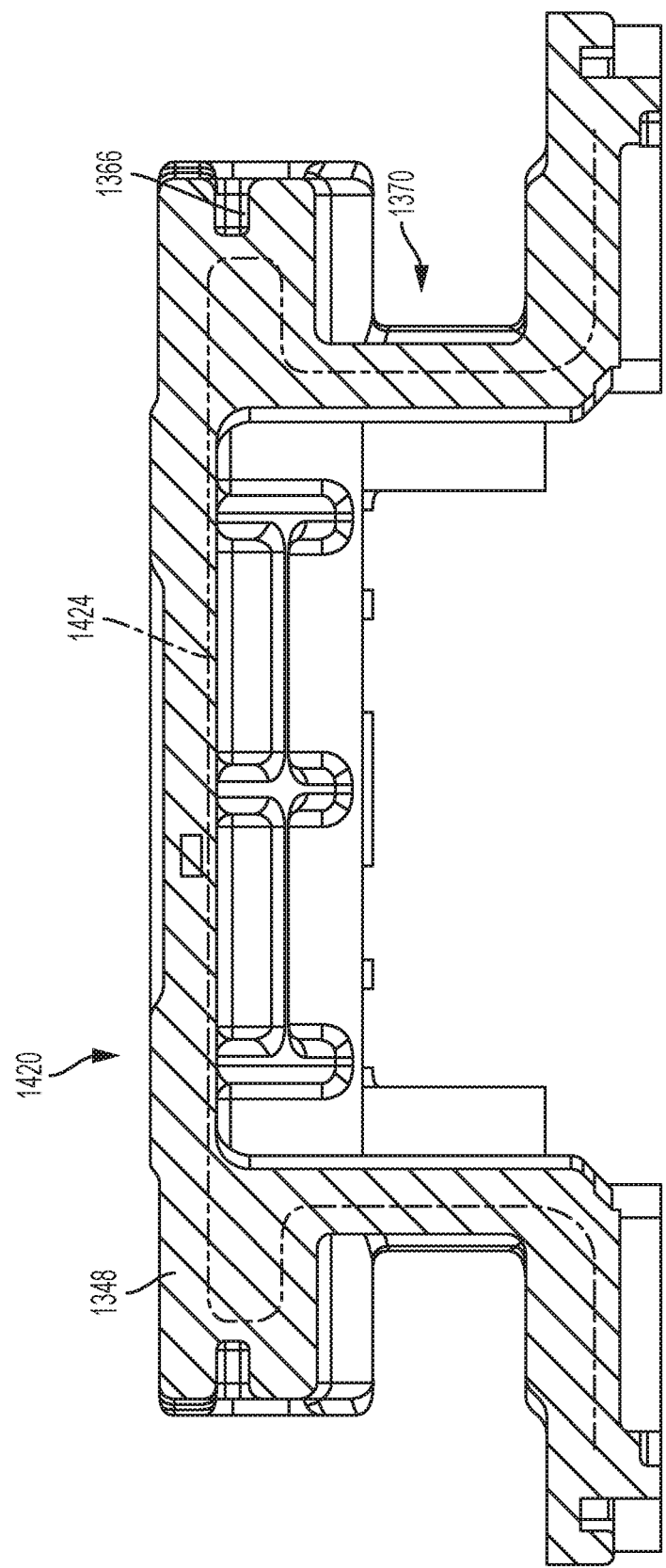

FIGS. 47A-47B illustrate reinforcement of the interface of the battery pack 1254. The reinforcement 1420 is provided in areas of the rails 1366 and the protrusion 1348. The illustrated reinforcement 1420 includes a stamping 1424 including portions following the cross-section of the rails 1366, forming a generally C-shape around the grooves 1370. The stamping 1424 also spans the width of the protrusion 1348. In the illustrated construction, the stamping 1424 is tied directly to bosses 1428 in the housing 1350.

In a further example (see FIGS. 48A-48F), a shock absorption arrangement 1440 may be provided between the battery pack 1254 and the electrical device. The arrangement 1440 may provide impact or drop isolation for the battery pack 1254 by providing shock absorbing cushions in the interface. The arrangement 1440 may be provided for shock rather than vibration isolation and provides isolation in all directions.

Figure 48A:
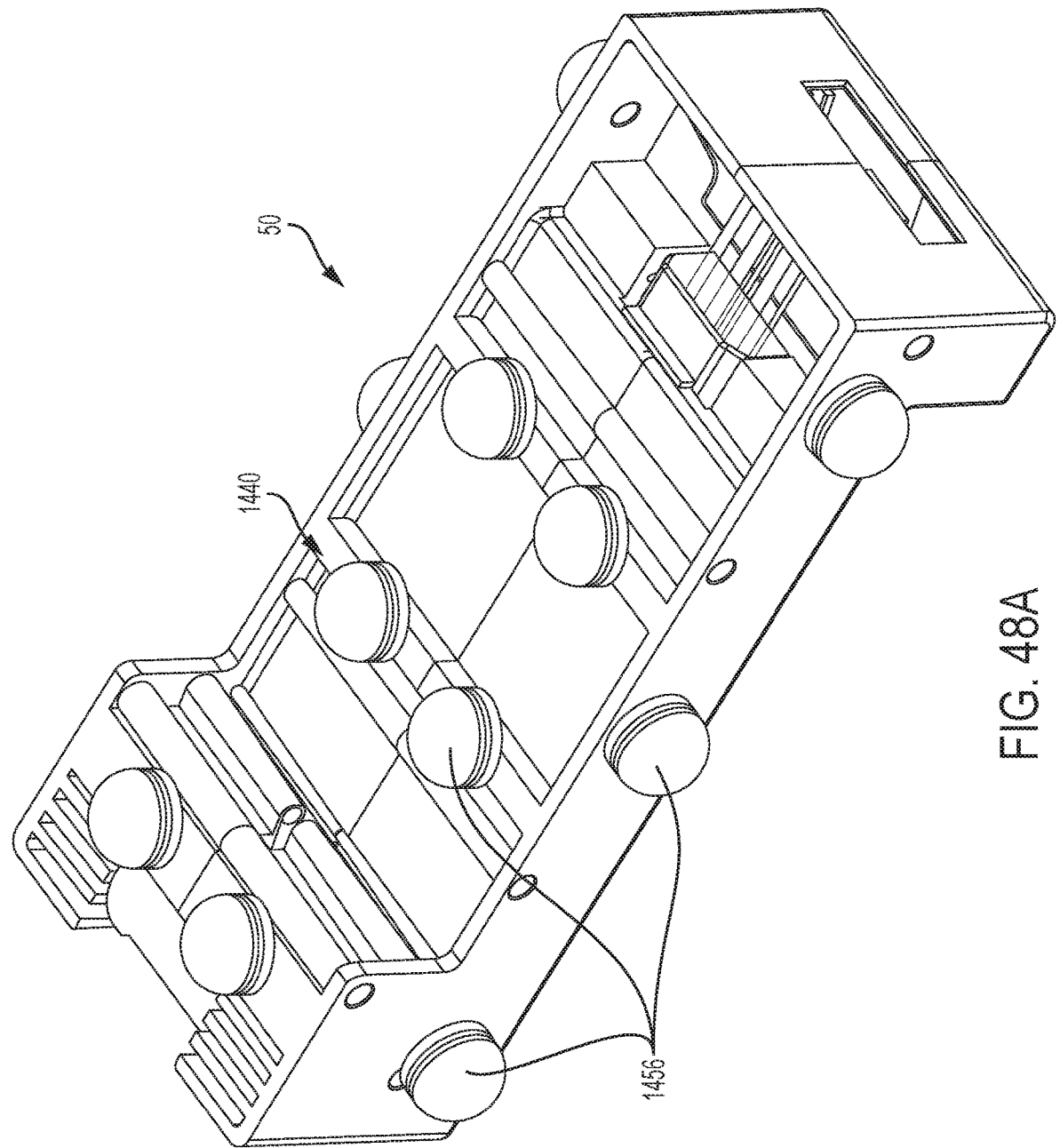
FIGS. 48A-48F are views of a portion of a battery interface illustrating a shock absorption arrangement.
Figure 48B:
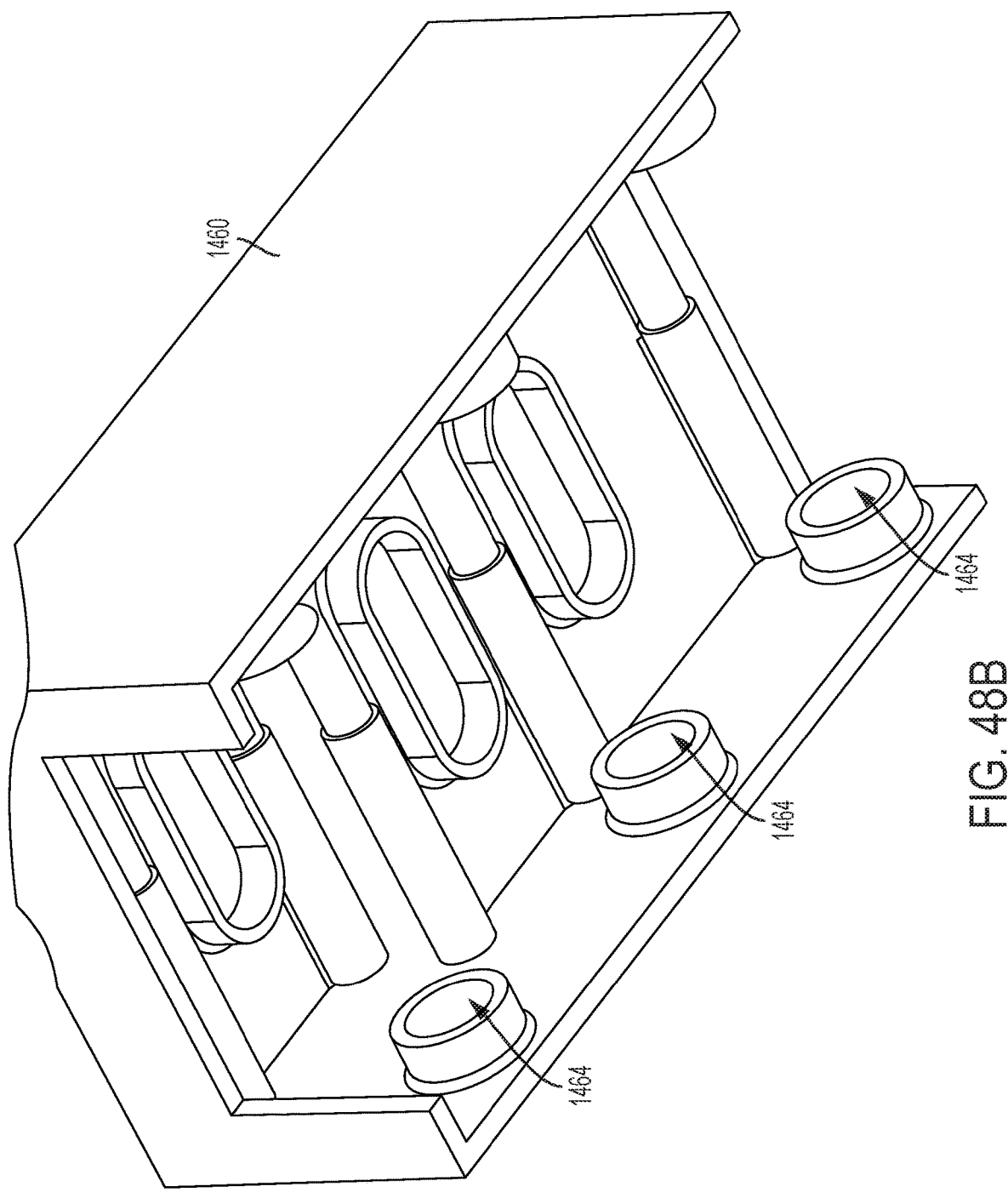
Figure 48C:
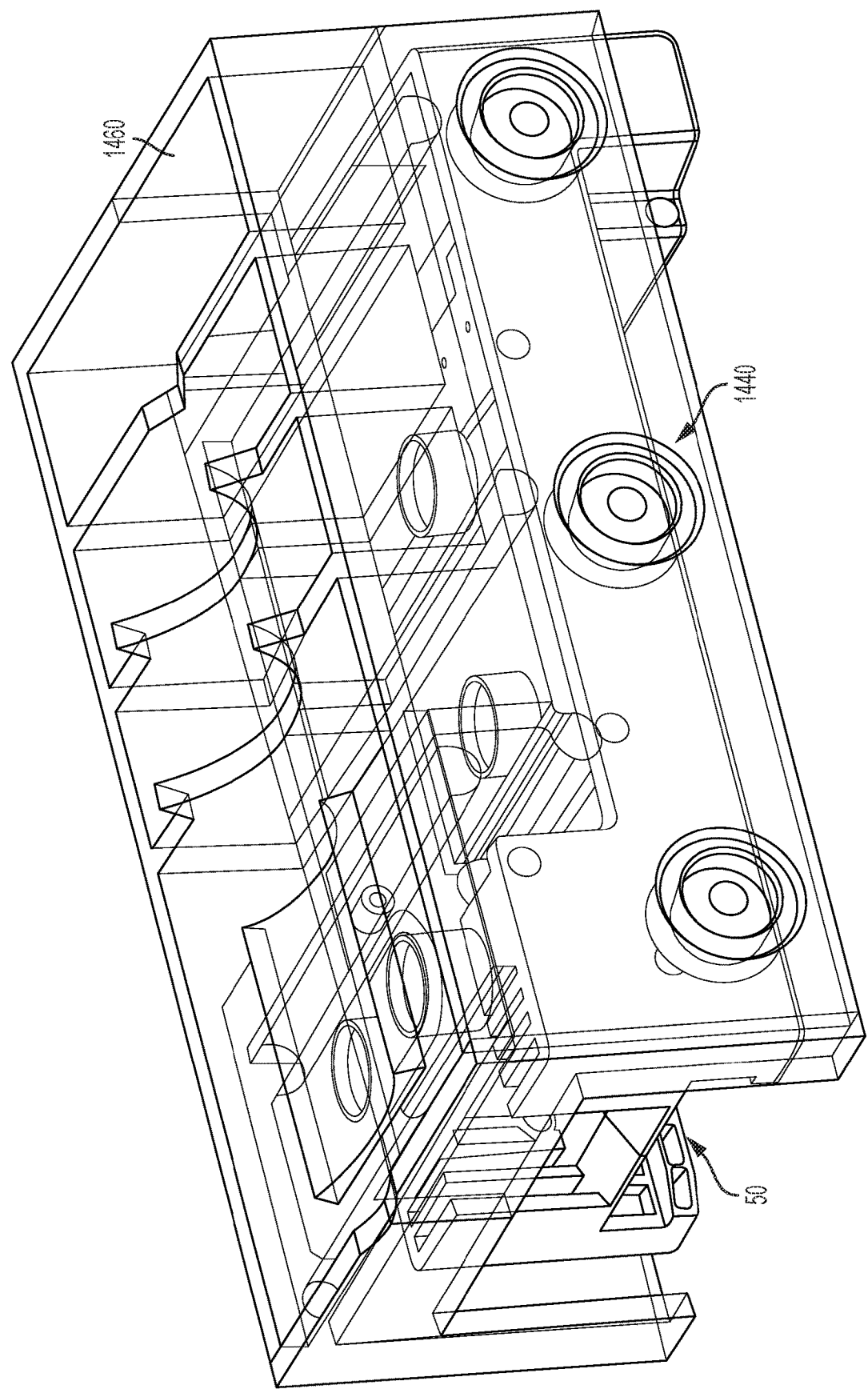
Figure 48D:
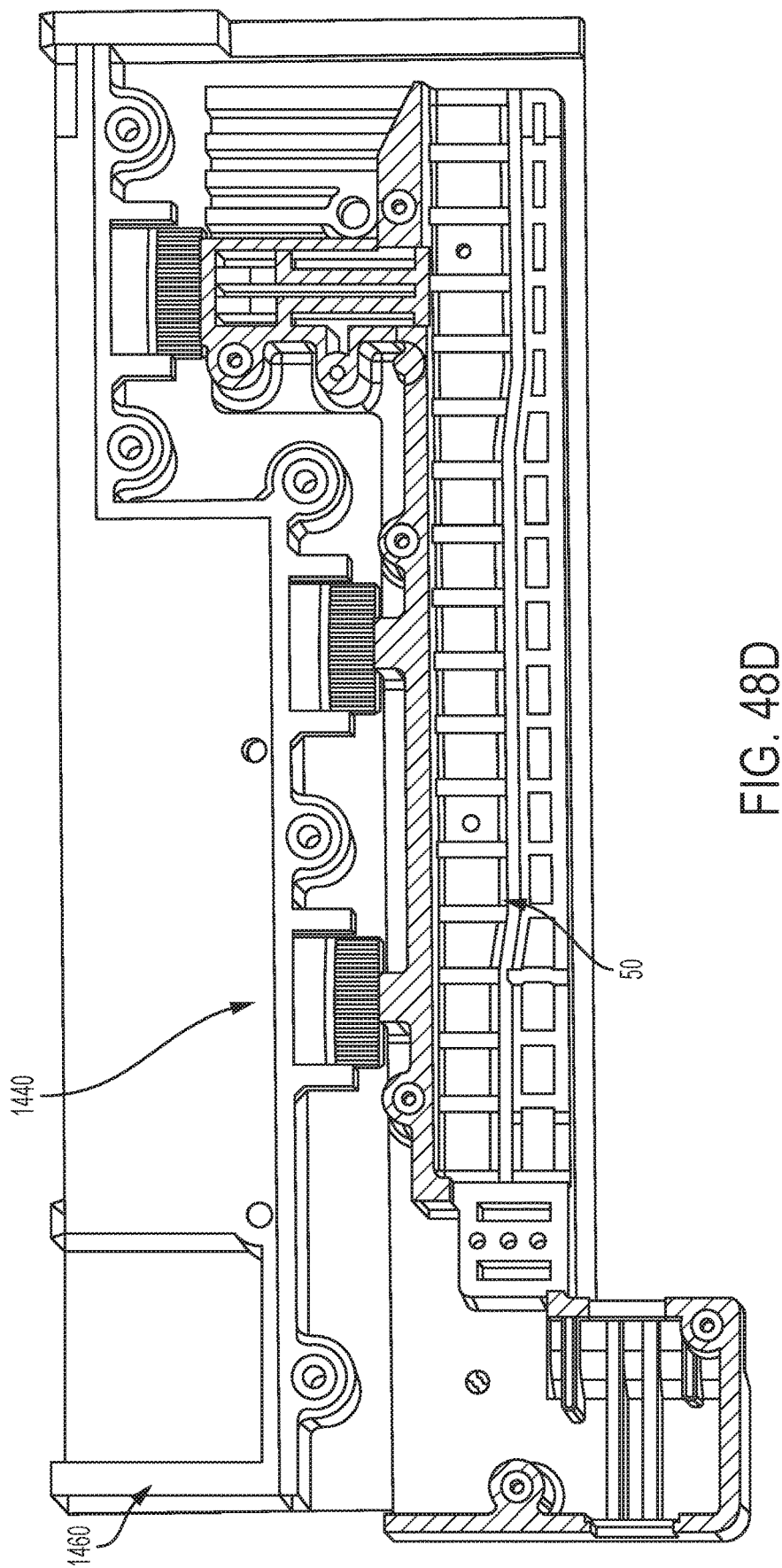
Figure 48E:
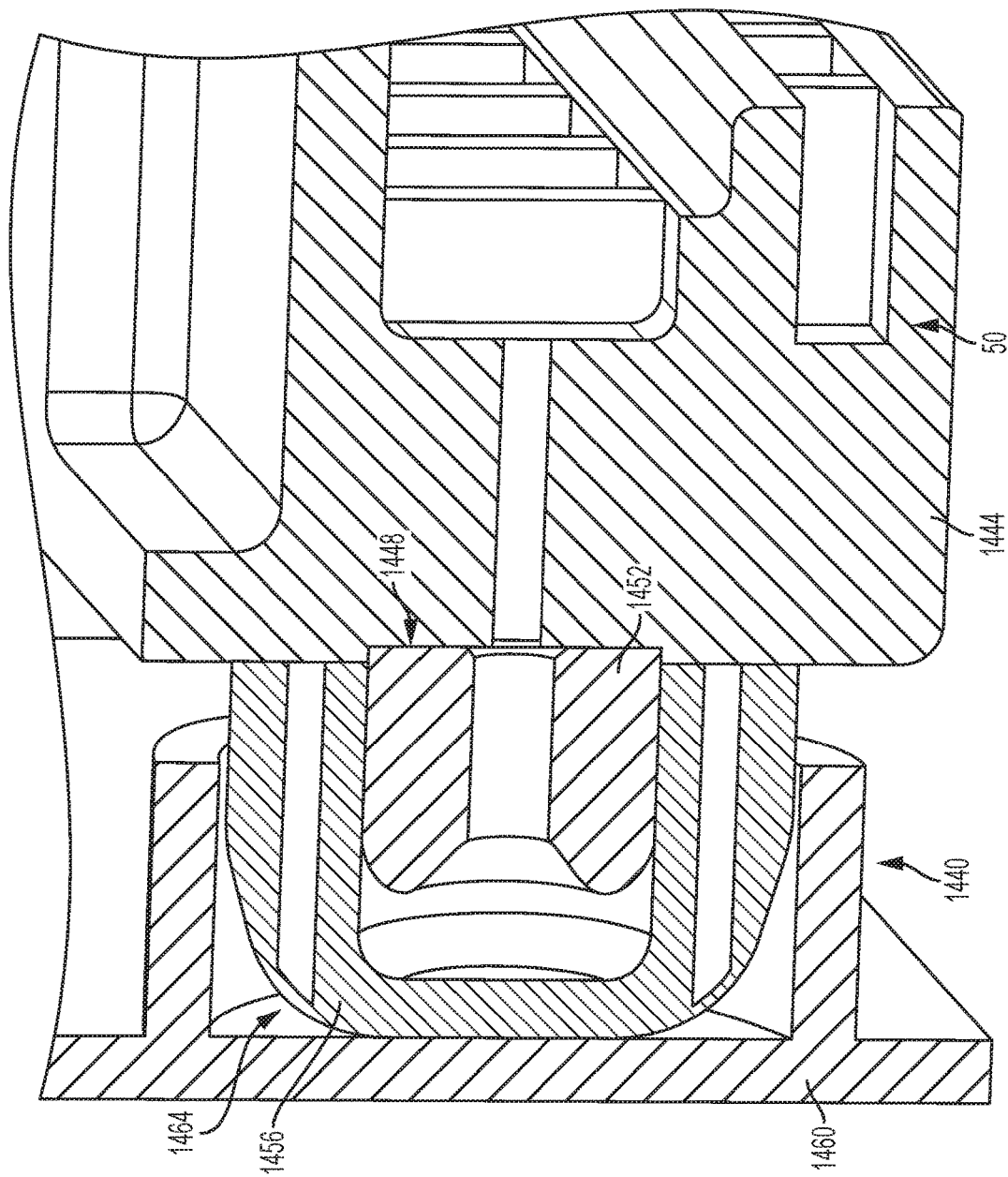

As shown in FIGS. 48A and 48E, the battery-receiving portion 50 is provided by a housing 1444 defining on its outer surface a number of locations (e.g., recesses 1448). A projection or post 1452 is supported at each location (e.g., extends from each recess 1448). A shock absorption member 1456 is supported on each post 1452.

An outer housing 1460 (see FIGS. 48B-48E) and at least partially surrounds the housing 1444. The housing 1460 defines a corresponding number of locations (e.g., recesses 1464), each receiving a shock absorption member 1456.

Figure 48F:
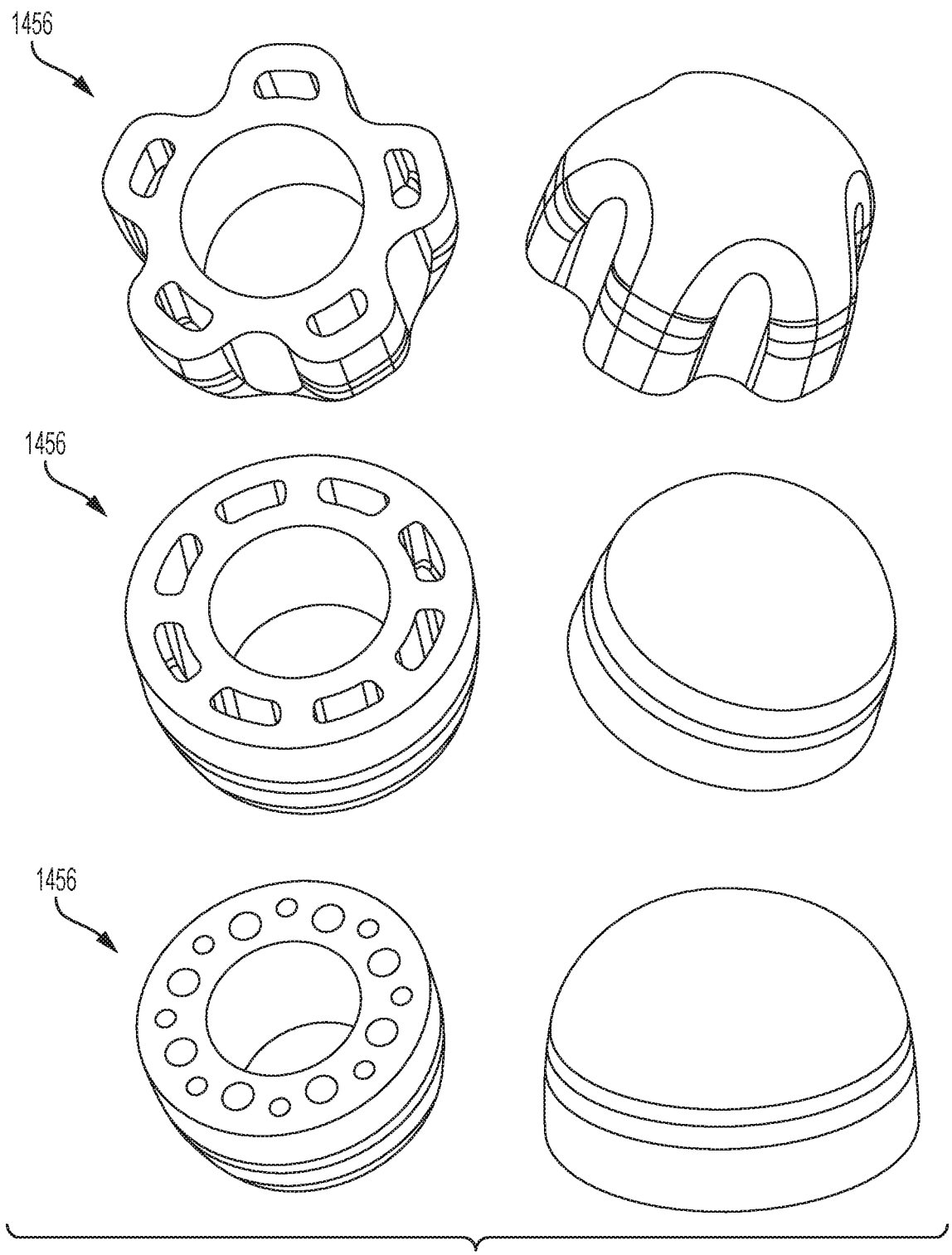
Figure 49A:
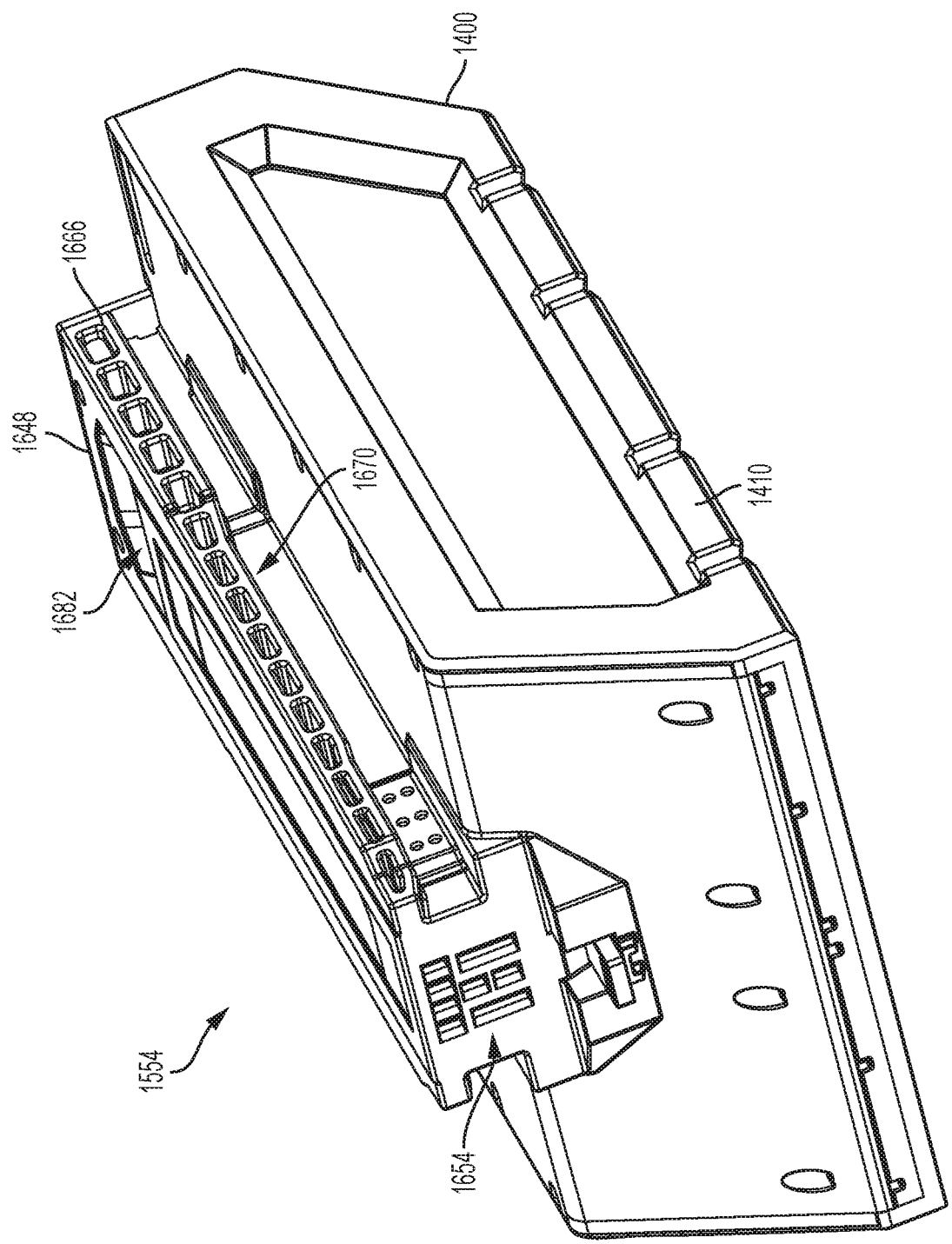
FIGS. 49A-49H are views of another alternative construction of a battery pack.
Figure 49B:
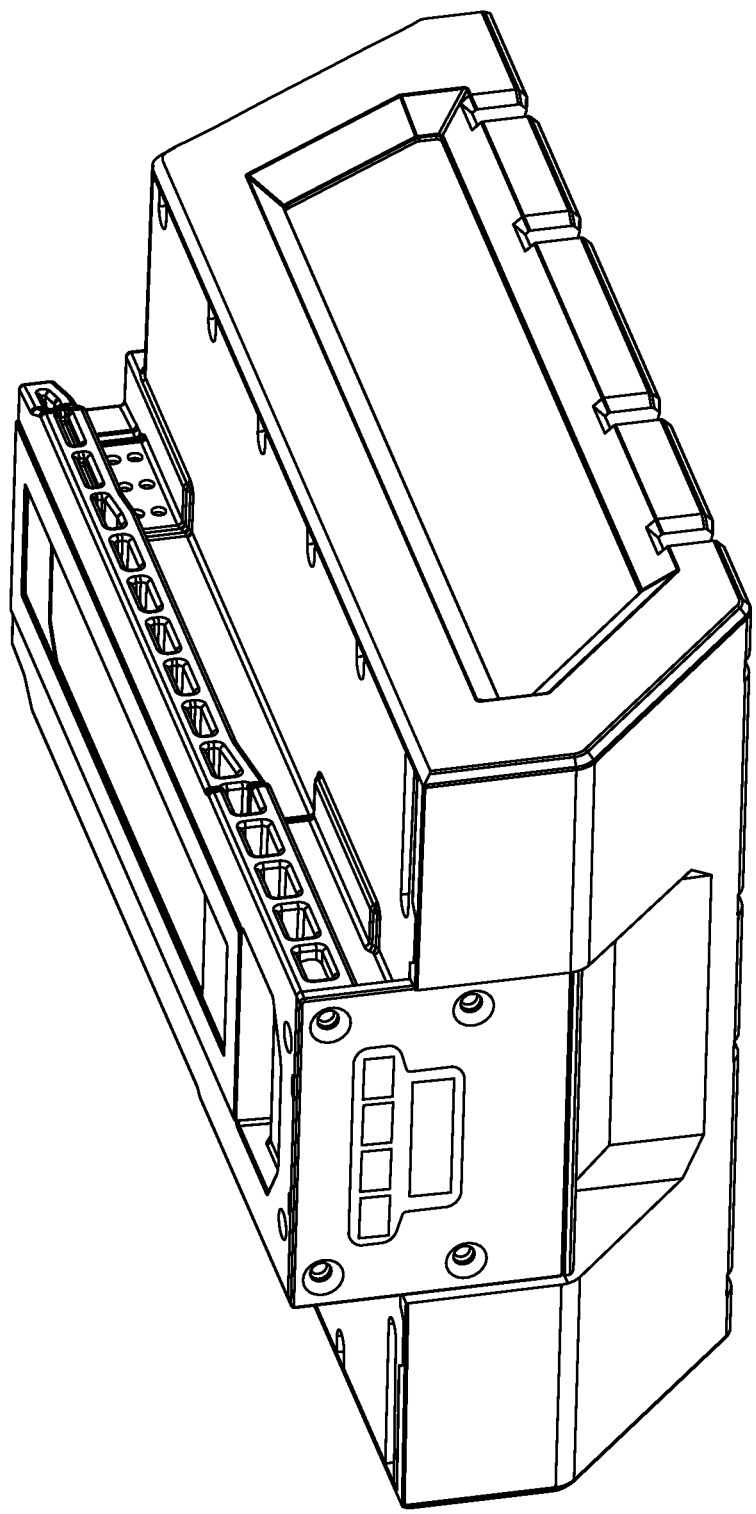
Figure 49C:
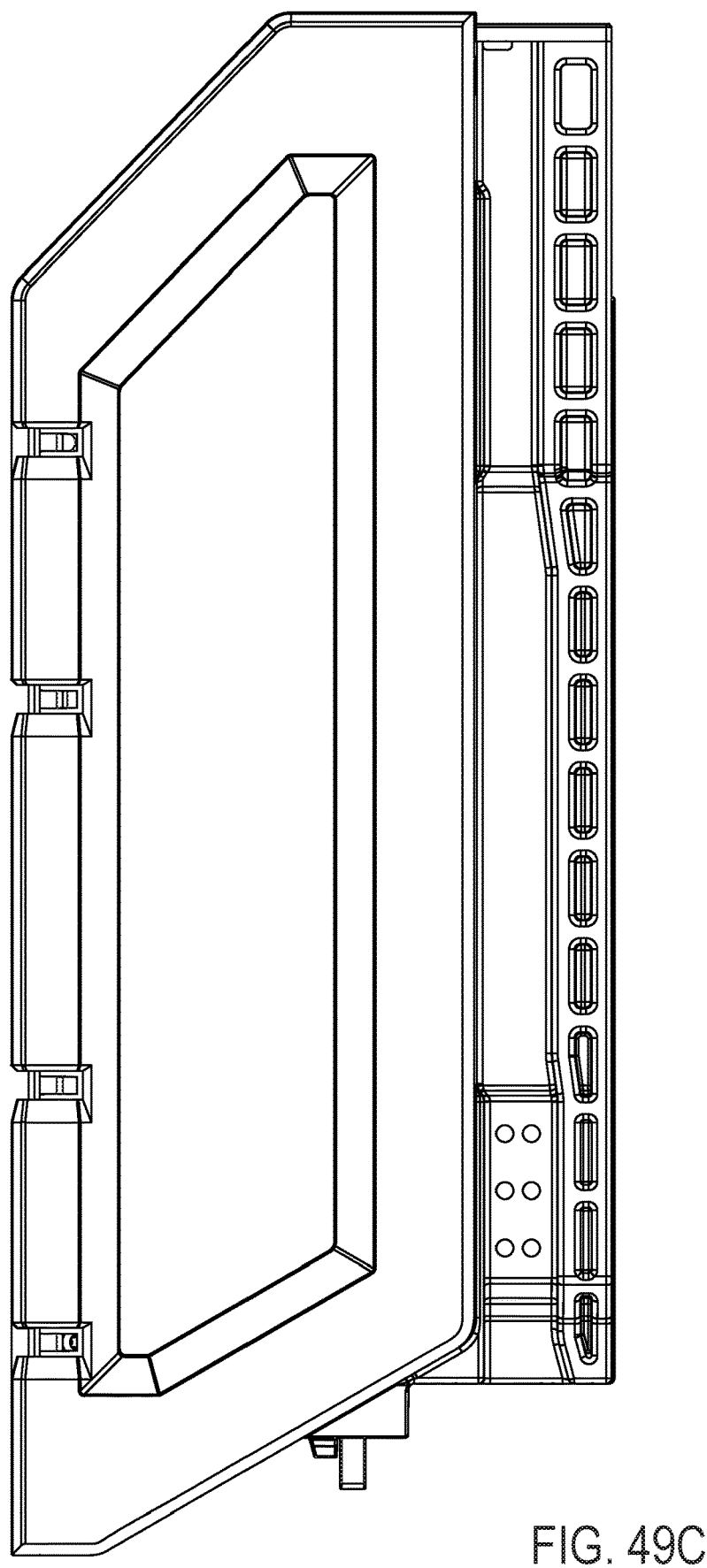
Figure 49D:
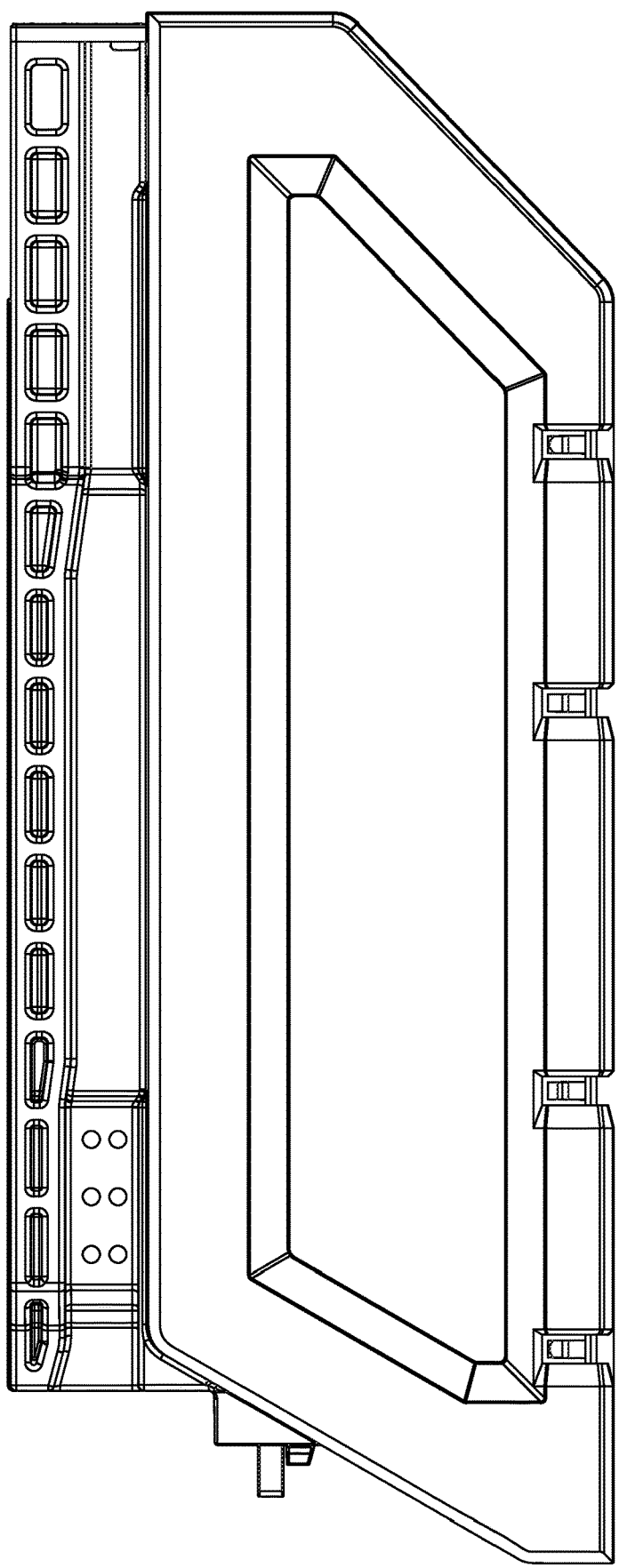
Figure 49E:
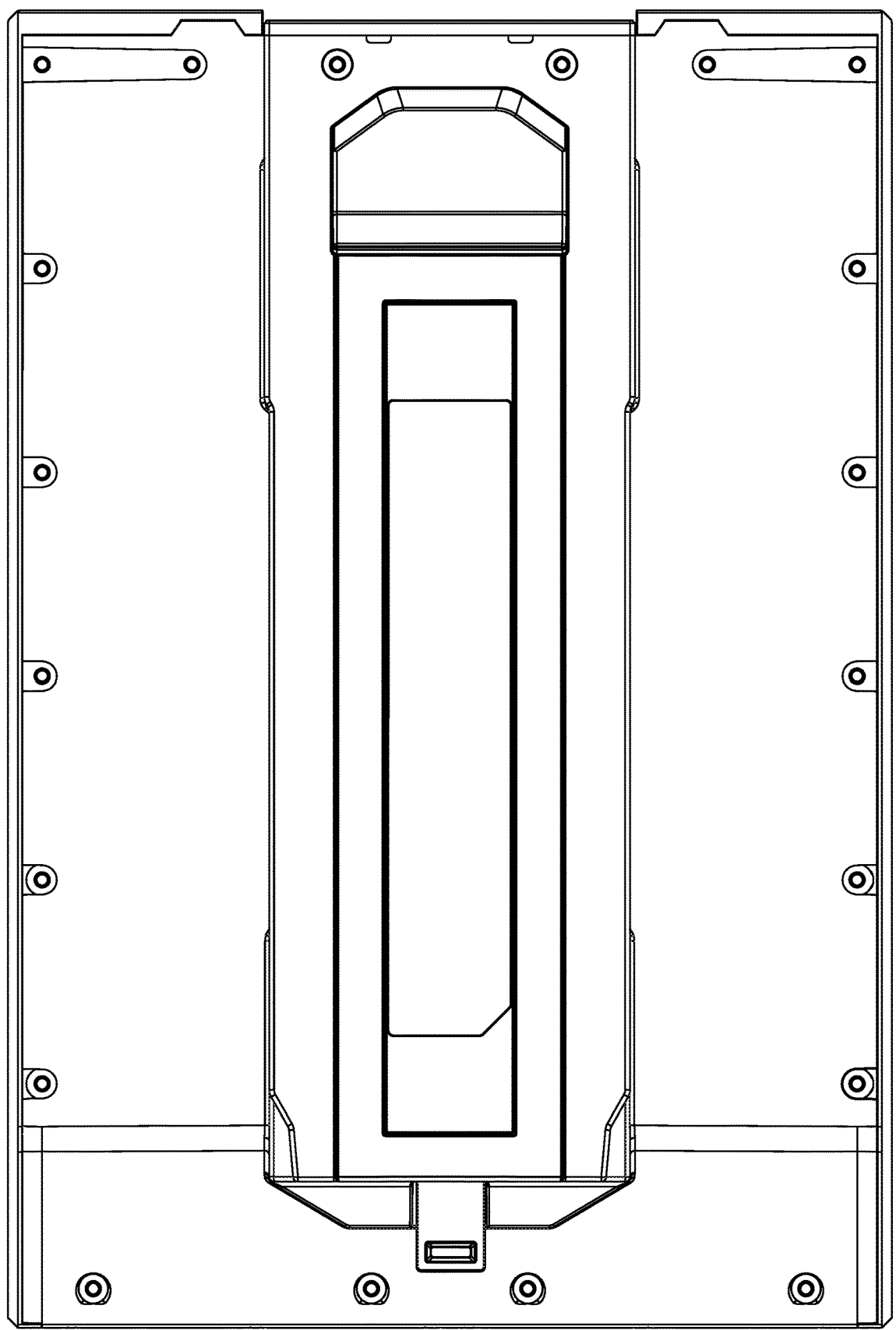
Figure 49F:
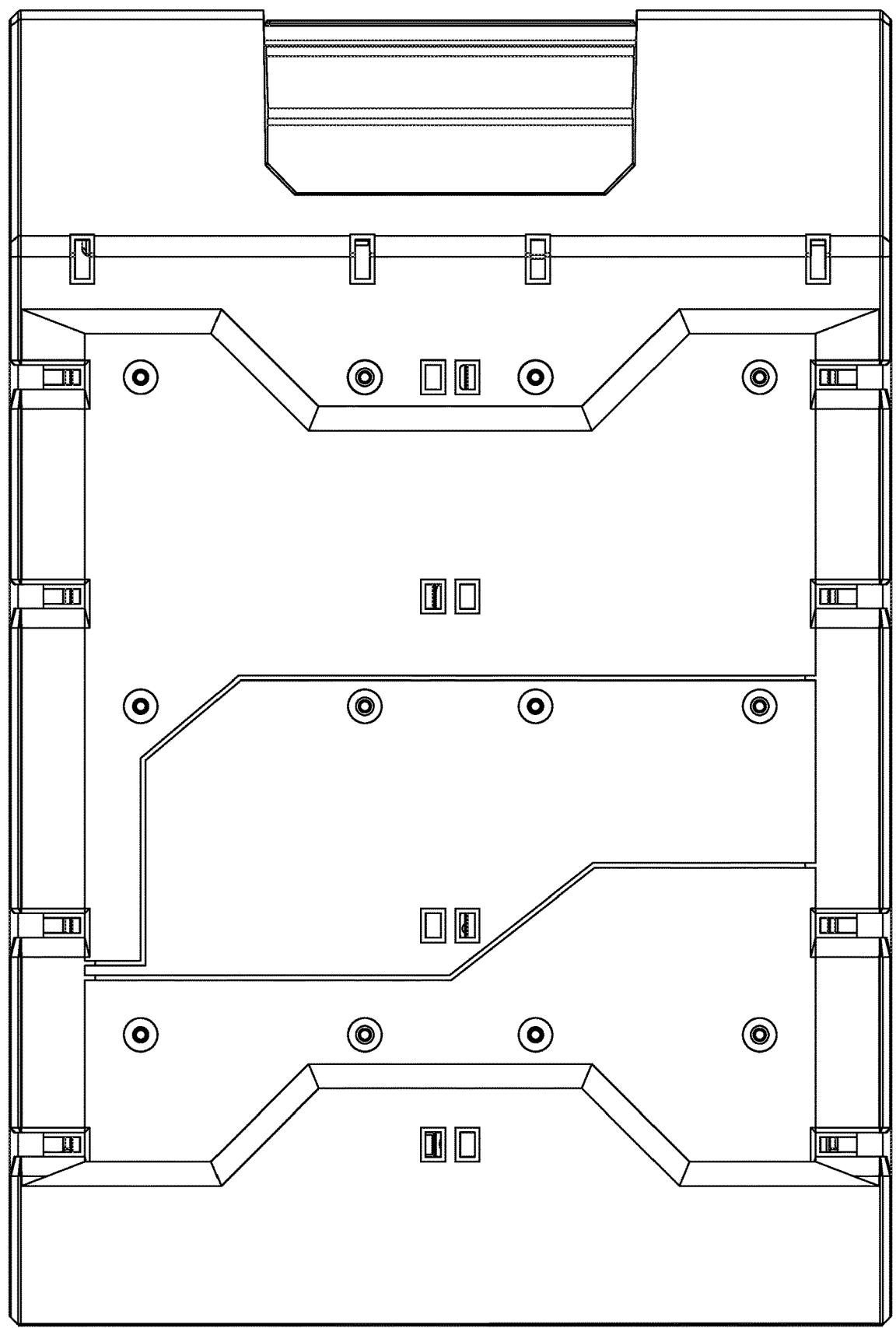
Figure 49G:
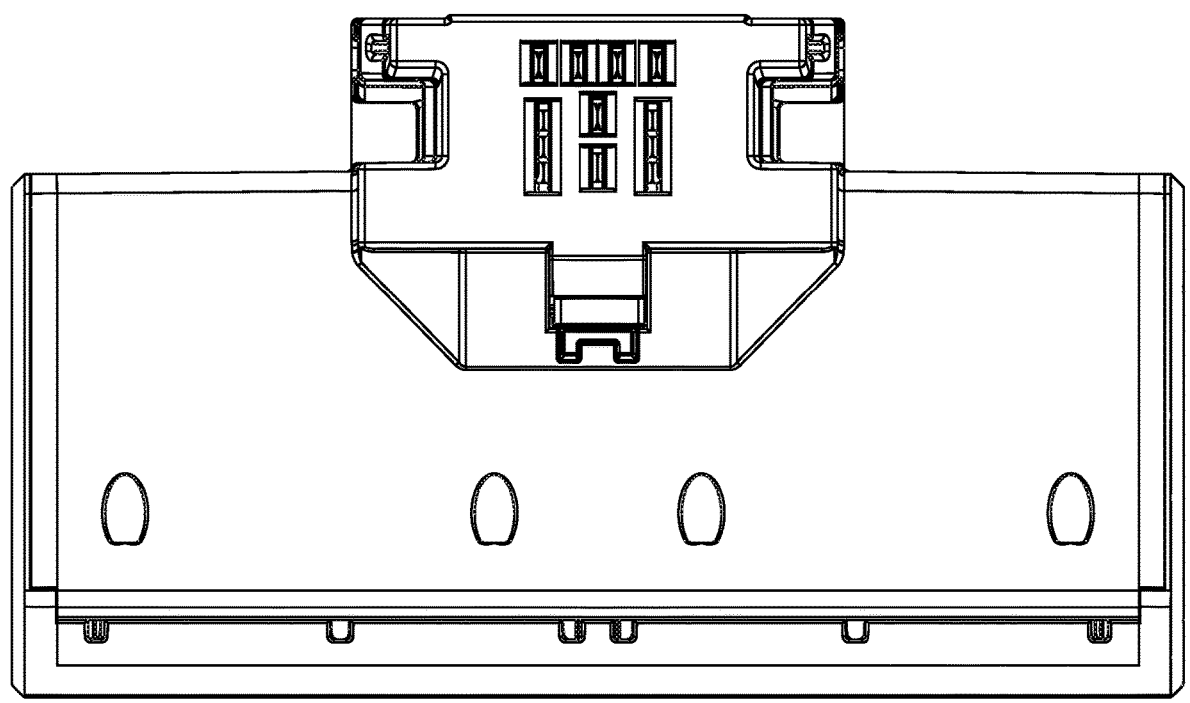
Figure 49H:
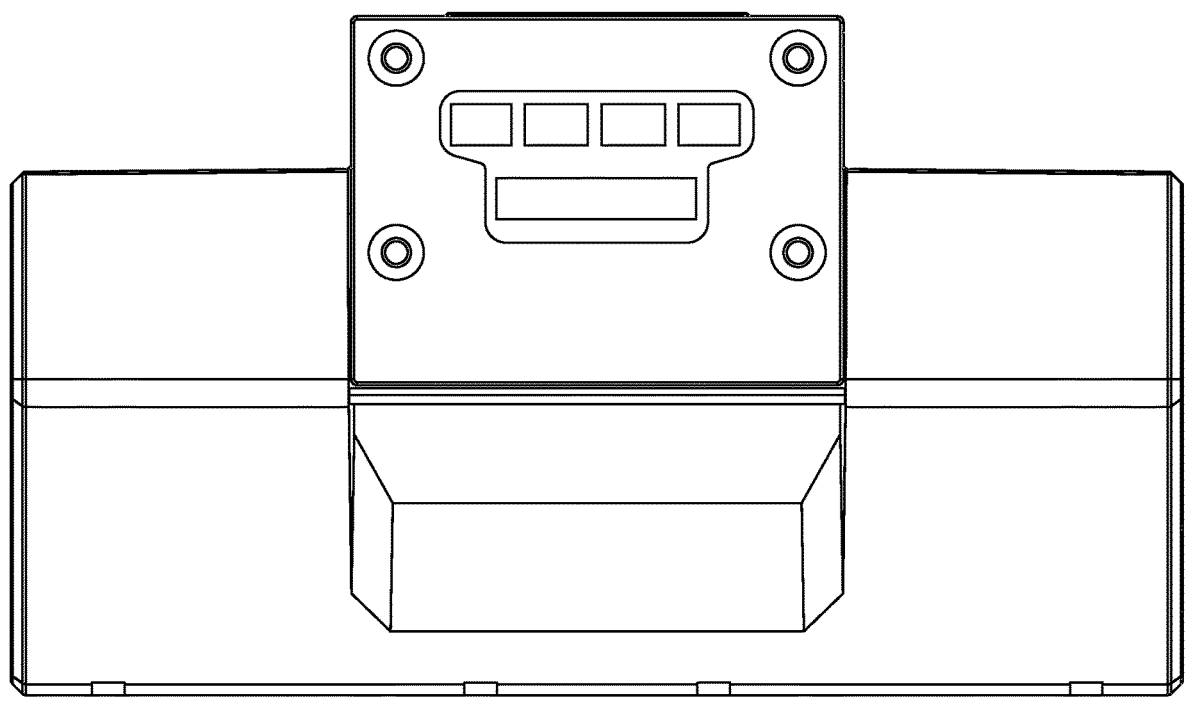

The shock absorption members 1456 are generally puck-shaped and, in the illustrated construction, are formed of an elastomeric material, such as polyurethane. As shown in FIG. 48F, the shock absorption members 1456 may have different constructions, depending on the electrical device, the location in the arrangement 1440.

Thus, the invention may provide, among other things, an interface for a battery pack including a stepped arrangement or a drop and slide configuration. A latching mechanism with a switch to selectively electrically couple and decouple the battery pack and the electrical device may be provided. An ejection mechanism with a switch to selectively activate and deactivate a portion of the electrical device may be provided.

Although the invention has been described in detail with reference to certain preferred embodiments, variations and modifications exist within the scope and spirit of one or more independent aspects of the invention as described.

One or more independent features and/or independent advantages may be set forth in the following claims:

What is claimed is:

1. A latch mechanism for an electrical combination, the electrical combination including a battery pack and an electrical device, the electrical device including a device housing having a device support portion configured to receive the battery pack, latch mechanism being operable to connect the battery pack and the electrical device, the latch mechanism comprising:

a latching member movable between a latched position, in which the latching member is engageable between the battery pack and the electrical device to inhibit relative movement, and an unlatched position, in which relative movement is permitted; and a switch operable with the latching member, the switch inhibiting power transfer between the battery pack and the electrical device when the latching member is between the latched position and the unlatched position, wherein each of the latching member and the switch is positioned in the device housing of the electrical device.

2. The latch mechanism of claim 1, wherein the latching member is engageable in a latching recess to inhibit relative movement between the battery pack and the electrical device, and wherein the switch is operable to inhibit power transfer before the latching member disengages the latching recess.

3. The latch mechanism of claim 1, wherein, in the latched position, the switch is operable to facilitate power transfer.

4. The latch mechanism of claim 1, wherein the latching member includes a protrusion engageable with and operating the switch to inhibit power transfer as the latching member moves toward the unlatching position.

5. The latch mechanism of claim 1, wherein the device support portion includes a surface engageable with the battery pack, and wherein the latching member is configured to protrude beyond the surface when the latching member is in the latched position.

6. The latch mechanism of claim 1, further comprising a biasing member configured to bias the latching member toward the latched position.

7. The latch mechanism of claim 1, wherein the device support portion includes a cavity defined by a plurality of walls, wherein the device support portion includes an open end positioned opposite one of the plurality of walls, wherein the open end is in connection with the cavity, and wherein the battery pack is receivable into and removable from the cavity through the open end.

8. The latch mechanism of claim 7, wherein the latch mechanism is positioned closer to the open end than the one of the plurality of walls.

9. The latch mechanism of claim 7, wherein the latching member has an inclined surface facing toward the open end when the latching member is in the latched position.

10. The latch mechanism of claim 7, wherein the latching member has a vertically- extending surface facing toward the one of the plurality of walls when the latching member is in the latched position.

11. The latch mechanism of claim 7, wherein at least a portion of the latching member is positioned in the cavity when the latching member is in the latched position, and wherein the latching member is movable out of the cavity when the latching member is moved from the latched position toward the unlatched position.

12. The latch mechanism of claim 1, further comprising an actuator engageable by a user to move the latching member between the latched position and the unlatched position.

13. The latch mechanism of claim 12, wherein the latching member is formed of a first material and the actuator is formed of a different second material, the first material being harder than the second material.

14. The latch mechanism of claim 12, wherein the actuator includes a cam surface engageable with the latching member, and wherein movement of the actuator causes translational movement of the latching member between the latched position and the unlatched position.

15. The latch mechanism of claim 12, wherein the actuator is a primary actuator, and wherein the latch mechanism further comprises a secondary actuator operatively coupled to the primary actuator and movable between a first position, in which the secondary actuator inhibits operation of the primary actuator, and a second position, in which the secondary actuator allows operation of the primary actuator, and wherein the secondary actuator is engageable with the device housing to maintain the secondary in the first position.

16. The latch mechanism of claim 15, further comprising a biasing member configured to bias the secondary actuator toward the first position to maintain engagement between the secondary actuator and the device housing.

17. A latch mechanism for an electrical combination, the electrical combination including a battery pack and an electrical device, the latch mechanism being operable to connect the battery pack and the electrical device, the latch mechanism comprising:

a latching member movable between a latched position, in which the latching member is engageable between the battery pack and the electrical device to inhibit relative movement, and an unlatched position, in which relative movement is permitted;

a switch operable with the latching member, the switch inhibiting power transfer between the battery pack and the electrical device when the latching member is between the latched position and the unlatched position; and an actuator engageable by a user to move the latching member between the latched position and the unlatched position, the actuator having a cam surface engageable with the latching member, wherein rotational movement of the actuator causes translational movement of the latching member between the latched position and the unlatched position.

18. The latch mechanism of claim 17, wherein the latching member is engageable in a latching recess to inhibit relative movement between the battery pack and the electrical device, and wherein the switch is operable to inhibit power transfer before the latching member disengages the latching recess.

19. The latch mechanism of claim 17, wherein, in the latched position, the switch is operable to facilitate power transfer.

20. The latch mechanism of claim 17, wherein the latching member includes a protrusion engageable with and operating the switch to inhibit power transfer as the latching member moves toward the unlatching position.

* * * * *